United States Patent
Ruedinger

(10) Patent No.: US 12,248,847 B2
(45) Date of Patent: Mar. 11, 2025

(54) COMMUNICATION COORDINATION AND NODE SYNCHRONIZATION FOR ENHANCED QUANTUM CIRCUIT OPERATION EMPLOYING A HYBRID CLASSICAL/QUANTUM SYSTEM

(71) Applicant: International Business Machines Corporation, Armonk, NY (US)

(72) Inventor: Jeffrey Joseph Ruedinger, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 597 days.

(21) Appl. No.: 17/307,270

(22) Filed: May 4, 2021

(65) Prior Publication Data
US 2022/0358390 A1 Nov. 10, 2022

(51) Int. Cl.
*G06N 10/00* (2022.01)
*G06F 8/41* (2018.01)

(52) U.S. Cl.
CPC ............ *G06N 10/00* (2019.01); *G06F 8/41* (2013.01)

(58) Field of Classification Search
CPC .......... G06N 10/00; G06N 10/80; G06F 8/41
USPC ........................................................ 716/100
See application file for complete search history.

(56) References Cited

U.S. PATENT DOCUMENTS

| | | | |
|---|---|---|---|
| 6,782,355 B1 | 8/2004 | Cook et al. | |
| 8,243,714 B1* | 8/2012 | Hilton | H04J 3/0685 370/350 |
| 9,111,229 B2 | 8/2015 | Harrison et al. | |
| 2002/0029255 A1* | 3/2002 | Glynias | G06F 16/25 709/202 |
| 2007/0250741 A1* | 10/2007 | Ehlers | G06F 11/0745 714/43 |

(Continued)

OTHER PUBLICATIONS

International Search Report and Written Opinion received for International PCT Application Serial No. PCT/EP2022/061633 dated Aug. 19, 2022, 12 pages.

(Continued)

*Primary Examiner* — Jack Chiang
*Assistant Examiner* — Aric Lin
(74) *Attorney, Agent, or Firm* — Amin, Turocy & Watson, LLP

(57) ABSTRACT

Systems, computer-implemented methods and/or computer program products are provided for operating a quantum circuit on a set of qubits. According to an embodiment, a system can facilitate control of data transfer between two or more nodes. The system can comprise a memory that stores computer executable components and a processor that executes the computer executable components stored in the memory. The computer executable components can comprise a compilation component that compiles one or more communication paths between two or more nodes for transfer of yet-undetermined data along the one or more compiled communication paths. Alternatively and/or additionally, the computer executable components can comprise an interval boundary implementation component that can commonly set and trigger a successively repeating time point at two or more nodes to align performance at the two or more nodes of one or more quantum gate operations.

20 Claims, 21 Drawing Sheets

(56) References Cited

U.S. PATENT DOCUMENTS

| | | | | |
|---|---|---|---|---|
| 2012/0148237 | A1* | 6/2012 | Harrison | G06N 10/00 |
| | | | | 398/180 |
| 2016/0267032 | A1* | 9/2016 | Rigetti | G06F 13/4068 |
| 2020/0287525 | A1 | 9/2020 | Cohen et al. | |
| 2021/0026162 | A1* | 1/2021 | Apisdorf | G02F 1/017 |
| 2022/0224996 | A1* | 7/2022 | Nickerson | H03K 17/92 |
| 2022/0416907 | A1* | 12/2022 | Hosseini | H04B 10/70 |
| 2024/0085943 | A1* | 3/2024 | Van Oven | G06F 1/10 |

OTHER PUBLICATIONS

Diadamo et al., "Distributed Quantum Computing and Network Control for Accelerated VQE", IEEE Transactions on Quantum Engineering, vol. 2, 2021, 21 pages.

McCaskey et al., "Hybrid Programming for Near-term Quantum Computing Systems", IEEE International Conference on Rebooting Computing, 2018, 12 pages.

Britt et al., "High-Performance Computing with Quantum Processing Units", ACM Journal on Emerging Technologies In Computing Systems, vol. 13, No. 3, Article 39, Mar. 2017, pp. 39.1-39.13.

Karalekas et al., "A Quantum-Classical Cloud Platform Optimized for Variational Hybrid Algorithms", Quantum Science and Technology, 2020, 21 pages.

Sun et al., "Scalable Self-Adaptive Synchronous Triggering System in Superconducting Quantum Computing," IEEE Transactions on Nuclear Science (2020), 7 pages.

Fu et al., "Quingo: A Programming Framework for Heterogeneous Quantum-Classical Computing with NISQ Features," arXiv:2009.01686v1 [quant-ph] Sep. 2, 2020, 28 pages.

Fu et al., "An Experimental Microarchitecture for a Superconducting Quantum Processor," arXiv:1708.07677v1 [quant-ph] Aug. 25, 2017, 13 pages.

Mell et al., "The NIST Definition of Cloud Computing," Recommendations of the National Institute of Standards and Technology, NIST Special Publication 800-145, Sep. 2011, 7 pages.

* cited by examiner

COMMUNICATION COORDINATION AND NODE SYNCHRONIZATION FOR ENHANCED QUANTUM CIRCUIT OPERATION EMPLOYING A HYBRID CLASSICAL/QUANTUM SYSTEM

BACKGROUND

One or more embodiments described herein relate generally to quantum program control and/or scheduling, and more specifically, to enhanced quantum program control and/or scheduling via a hybrid classical/quantum system by employing compiled communication instructions and/or a universal time interval.

Quantum computing is generally the use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, which can entangle multiple quantum bits and can use interference. Quantum computing has the potential to solve problems that, due to computational complexity, cannot be solved or can only be solved slowly on a classical computer.

Quantum computing can utilize specialized controls, such as quantum circuits, to operate on qubits. Quantum circuits are transformations that can perform operations on qubits. Quantum circuits, for instance as part of a quantum program, can be implemented as one or more quantum gates, such as a sequence of quantum gates. The quantum gates can be implemented as one or more physical operations on a set of qubits, such as implementing a sequence of pulses. A pulse is a time-dependent tone (e.g., wave or waveform) that can be applied to a qubit to change a state of the qubit.

On a large scale, quantum computing cloud service providers can execute millions of quantum jobs for users during a year. Each quantum job can include the execution of one or more quantum programs. Where feasible, one or more quantum programs can operate on one or more same qubits. Where qubits only can exist (or can only be coherent) for a limited amount of time, an objective of operation of a quantum circuit can be to reduce the time of the operation and/or increase the speed of the operation. Time spent to operate the quantum circuit can undesirably reduce the available time of operation on one or more qubits. This can be due to the available coherent time of the one or more qubits prior to decoherence of the one or more qubits. For example, a qubit state can be lost in less than 100 to 200 microseconds in some cases. Further, operations on qubits generally introduce some error, such as some level of decoherence and/or some level of quantum noise, further affecting qubit availability. Quantum noise can refer to noise attributable to the discrete and/or probabilistic natures of quantum interactions.

Also on the large scale, a large quantity of quantum jobs can create pressure to execute the respective quantum programs quickly. That is, increased speed of execution can directly and/or indirectly correlate to maximizing system usage, minimizing compiling time to compile quantum programs, minimizing users having to wait for the compiling to be completed, and/or minimizing undesirable consuming of classical computational resources. Pressure also can be created to execute these quantum jobs well, so that a most performance can be extracted from near-term error-prone systems and/or so that a quality of compiling into physical-level pulses can be improved (e.g., related to accuracy, precision and/or efficiency of pulse execution).

Current approaches for controlling and/or scheduling multi-qubit quantum programs, such as those employing seven or more qubits, can employ both classical resources and quantum resources, and thus can employ one or more hybrid classical/quantum systems. Classical resources (e.g., one or more controlling nodes, such as one or more controlling CPUs) can be employed to exercise control over one or more acting nodes. The one or more acting nodes, such as one or more quantum processors, can perform qubit operations, such as qubit measurements and/or operating one or more quantum circuits by implementing one or more quantum pulses.

These current control and/or scheduling approaches can utilize large amounts of overhead (e.g., energy, time and/or processing power) to schedule, pass data for and/or run quantum operations to implement the multi-qubit quantum programs. To transfer data among classical resources and/or quantum resources, such as data related to measurements and and/or quantum program execution instructions, the approaches can rely on a global shared memory. The global shared memory can create one or more central data collection points that can become choke points between the one or more controlling nodes and the one or more acting nodes. Data choke points can undesirably slow down execution of the quantum programs and also can reduce amount and quality of performance of quantum operations able to be performed on the qubits being employed, such as due to decoherence.

Furthermore, classical resources (e.g., the one or more controlling nodes) can be non-deterministic and can take variable amounts of times to analyze data, prepare instructions and/or send instructions. Due to the variable amounts of time, synchronization among the controlling nodes and/or the acting nodes can be lost. This synchronization loss can disrupt, prolong initialization of, cause failure of implementation of and/or introduce error into implementation of multi-qubit actions relying on such synchronization. Similar to the effect of the aforementioned data choke points, the synchronization loss can undesirably slow down execution of quantum programs and/or can reduce amount and/or quality of performance of quantum operations that can be performed on the qubits being employed, such as due to decoherence and/or quantum noise.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, computer-implemented methods, apparatuses and/or computer program products are described that can facilitate compiling communication instructions and/or employing a universal time interval for enhancing operation of a quantum circuit, such as on a hybrid classical/quantum system.

According to an embodiment, a system can comprise a memory that stores computer executable components and a processor that executes the computer executable components stored in the memory. The computer executable components can comprise an interval boundary implementation component that commonly sets and triggers a successively repeating time point at two or more nodes to align performance at the two or more nodes of one or more quantum tasks.

According to another embodiment, a computer-implemented method can comprise commonly setting and triggering, by a system operatively coupled to a processor, a successively repeating time point at two or more nodes of the system to align performance at the two or more nodes of one or more quantum tasks.

According to still another embodiment, a computer program product for facilitating control of quantum tasks at two or more nodes of a system can comprise a computer readable storage medium having program instructions embodied therewith. The program instructions can be executable by a processor to commonly set and trigger, by the processor, a successively repeating time point at two or more nodes of the system to align performance at the two or more nodes of one or more quantum tasks.

An advantage of such system, computer program product and/or method can be enhanced (e.g., improved and/or optimized) performance of such quantum operations by faster and/or synchronized execution of such quantum operations. This synchronization can be facilitated absent transfer of timing instructions with or without data among the two or more nodes during execution of a quantum program including the two or more quantum operations.

In one or more embodiments of the above system, computer program product and/or method, an execution component can employ the successively repeating time point for a plurality of successive executions of one or more portions of a quantum circuit on two or more qubits. Additionally and/or alternatively, the execution component can cause simultaneously-initiated quantum tasks on two or more qubits at two or more instances of the successively repeating time point. An advantage of such systems, computer program products and/or methods can be reduction in overall time to execute such quantum operations. That is, where one or more quantum operations are performed, such as with respect to two or more qubits, speed and/or quality of such quantum operations can be enhanced (e.g., improved and/or optimized). For example, one or more multi-qubit quantum operations can be scheduled with minimum delay due to the pre-implemented common time points.

Additionally and/or alternatively, in one or more embodiments of the above systems, computer program products and/or methods, a compilation component can compile one or more communication paths between the two or more nodes for transfer of yet-undetermined data along the one or more compiled communication paths. A length of a common time interval between successive ones of the successively repeating time point can be at least as long as a maximum data propagation time along the one or more communication paths. An advantage of such systems, computer program products and/or methods can be enhanced (e.g., improved and/or optimized) performance of such quantum operations, not only facilitated by faster and synchronized execution of such quantum operations, but also by faster transfer of data among the two or more nodes. This faster data transfer can be facilitated absent and/or via reduced choke points and/or central data collection points during execution of a quantum program having a plurality of quantum operations.

DESCRIPTION OF THE DRAWINGS

FIG. 6 further illustrates an exemplary compilation algorithm for use in compiling one or more communication instructions for executing a quantum program, such as the quantum program illustrated at the flow diagram of FIG. 6.

DETAILED DESCRIPTION

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

In view of the aforementioned one or more problems with current approaches to controlling and/or scheduling multi-qubit quantum programs it can be desirable to improve the execution time for executing quantum jobs (e.g., including one or more quantum programs) and/or the quality of execution of the quantum jobs. To that end, the described subject matter can employ various techniques that can improve (e.g., enhance, optimize and/or reduce) the execution time for executing quantum jobs and/or improve (e.g., enhance, optimize and/or increase) the quality of execution of such quantum jobs. In one or more cases, the one or more embodiments described herein can allow for increased scaling of execution of the associated quantum programs implementing quantum circuits.

One or more of these embodiments are now described with reference to the figures, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident in one or more cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 100E, 900, 900E and/or 1400 illustrated at FIGS. 1, 2, 9, 10 and 14, and/or systems thereof, can further comprise one or more computer and/or computing-based elements described herein with reference to an operating environment, such as the operating environment 1400 illustrated at FIG. 14. In several described embodiments, computer and/or computing-based elements can be used in connection with implementing one or more of the systems, devices, components and/or computer-implemented operations shown and/or described in connection with FIGS. 1, 2, 9, 10 and 14 and/or with other figures described herein.

Figure 1:
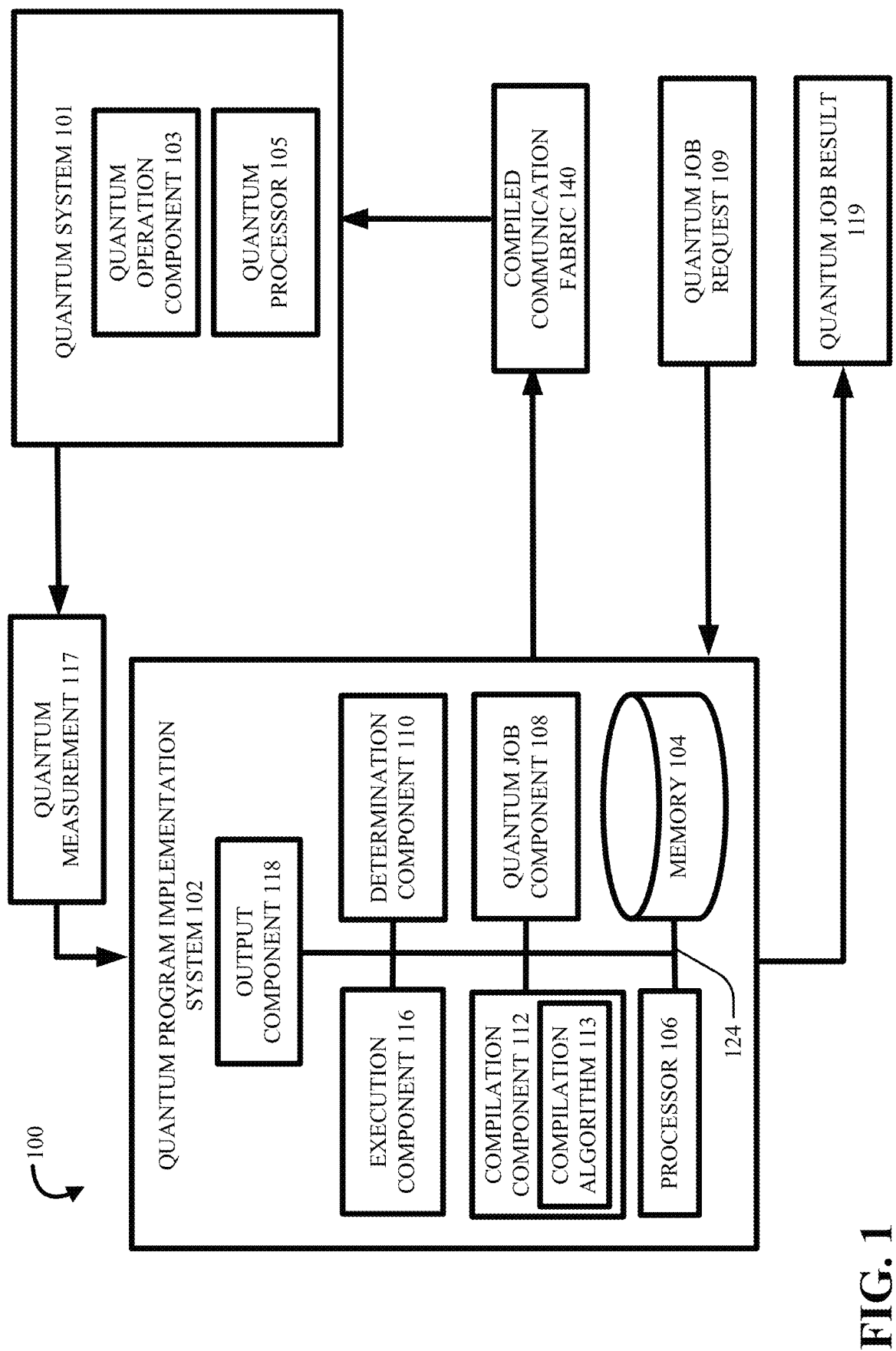
FIG. 1 illustrates a block diagram of an example, non-limiting system that can facilitate operation of a quantum program on a set of qubits via compiling and employing compiled communication instructions, in accordance with one or more embodiments described herein.

Turning first generally to FIG. 1, one or more embodiments described herein can include one or more systems, computer-implemented methods, apparatuses and/or computer program products that can facilitate compiling communication instructions. For example, FIG. 1 illustrates a block diagram of an example, non-limiting system 100 that can facilitate compiling communication instructions to enhance execution of a quantum job. A quantum job component can obtain (e.g., download, receive, search for and/or the like) a quantum job request requesting execution of one or more quantum programs. A determination component can determine one or more quantum circuits having one or more abstraction layers for executing the quantum program. A compilation component can compile one or more communication paths for transfer of yet-undetermined data along the one or more communication paths for executing the quantum program. The compilation component alternatively and/or additionally can compile one or more data parameters for the yet-undetermined data to be transferred.

Generally, the non-limiting system 100 also can facilitate executing the compiled communication instructions to perform execution of the quantum job. An execution component can direct determined data along the one or more communication paths to perform operation of a quantum circuit on two or more qubits. An output component can output one or more quantum job results in response to the quantum job request.

It will be appreciated that the following description(s) refer(s) to the operation of a single quantum program from a single quantum job request. However, it also will be appreciated that one or more of the processes described herein can be scalable. For example, as will be appreciated below, the quantum program implementation system 102 can implement one or more communication fabrics 140 and/or execute one or more quantum programs, to each be described below in detail. These various levels of scaling can enable faster, more efficient, and/or less-error-prone executions of quantum programs, at least in part due to the correlated reduced decoherence and/or decoherence time of one or more qubits being employed to execute the quantum programs.

In one or more embodiments, the non-limiting system 100 can be a hybrid system and thus can include both one or more classical systems, such as a quantum program implementation system 102, and one or more quantum systems, such as a quantum system 101. In one or more other embodiments, the quantum system 101 can be separate from, but function in combination with, the non-limiting system 100.

The quantum system 101 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results can be responsive to the quantum job request and associated input data and can be based at least in part on the input data, quantum functions and/or quantum computations.

In one or more embodiments, the quantum system 101 can comprise one or more quantum components, such as a quantum operation component 103 and a quantum processor 105. The quantum operation component 103 can perform one or more quantum processes, calculations and/or measurements for operating one or more quantum circuits on one or more qubits. For example, the quantum operation component 103 can operate one or more qubit effectors, such as qubit oscillators, harmonic oscillators, pulse generators and/or the like to cause one or more pulses to stimulate and/or manipulate the state(s) of one or more qubits existing in the quantum system 101. The quantum processor 105 can be any suitable processor, such as being capable of controlling qubit generation and the like. The quantum processor 105 can generate one or more instructions for controlling the one or more processes of the quantum operation component 103.

Turning to the classical portion of the non-limiting system 100, the quantum program implementation system 102 can comprise any type of component, machine, device, facility, apparatus and/or instrument that comprises a processor and/or can be capable of effective and/or operative communication with a wired and/or wireless network. All such embodiments are envisioned. For example, quantum program implementation system 102 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device.

In one or more embodiments, the quantum program implementation system 102 can comprise a processor 106 (e.g., computer processing unit, microprocessor, classical processor, quantum processor and/or like processor). In one or more embodiments, any component associated with quantum program implementation system 102, as described herein with or without reference to the one or more figures of the one or more embodiments, can comprise one or more computer and/or machine readable, writable and/or executable components and/or instructions that can be executed by processor 106 to facilitate performance of one or more processes defined by such component(s) and/or instruction(s).

In one or more embodiments, the quantum program implementation system 102 can comprise a computer-readable memory 104 that is operably connected to the processor 106. The memory 104 can store computer-executable instructions that, upon execution by the processor 106, can cause the processor 106 and/or other components of the quantum program implementation system 102 (e.g., quantum job component 108, determination component 110, compilation component 112, execution component 116 and/or output component 118) to perform one or more acts. In one or more embodiments, the memory 104 can store computer-executable components (e.g., quantum job component 108, determination component 110, compilation component 112, execution component 116 and/or output component 118).

Quantum program implementation system 102 and/or a component thereof as described herein, can be communicatively, electrically, operatively, optically and/or otherwise coupled to one another via a bus 124 to perform functions of non-limiting system 100, quantum program implementation system 102 and/or any components thereof and/or coupled therewith. Bus 124 can comprise one or more of a memory bus, memory controller, peripheral bus, external bus, local bus, quantum bus and/or another type of bus that can employ one or more bus architectures. One or more of these examples of bus 124 can be employed to implement any one or more embodiments described herein.

In one or more embodiments, quantum program implementation system 102 can be coupled (e.g., communicatively, electrically, operatively, optically and/or like function) to one or more external systems, sources and/or devices (e.g., classical and/or quantum computing devices, communication devices and/or like devices), such as via a network. In one or more embodiments, one or more of the components of the non-limiting system 100 can reside in the cloud, and/or can reside locally in a local computing environment (e.g., at a desired location(s)).

In addition to the processor 106 and/or memory 104 described above, quantum program implementation system 102 can comprise one or more computer and/or machine readable, writable and/or executable components and/or instructions that, when executed by processor 106, can facilitate performance of one or more operations defined by such component(s) and/or instruction(s). For example, in one or more embodiments, quantum program implementation system 102 can comprise a quantum job component 108, determination component 110, compilation component 112, execution component 116 and/or output component 118.

The quantum job component 108 can obtain, such as receive, download, stream and/or otherwise obtain, a quantum job request 109 from a requesting entity. Employing the quantum program implementation system 102 and the quantum system 101, the non-limiting system 100 can execute one or more quantum programs requested to be implemented in the quantum job request 109. In one or more cases the quantum job request 109 can include one or more instructions pertaining to one or more particular quantum circuits to employ.

Relative to the one or more quantum programs requested, the determination component 110 can determine one or more quantum circuits for implementing the one or more quantum programs. The determination can include searching one or more databases internal and/or external to the quantum program implementation system 102 and/or the non-limiting system 100. In one or more cases, the determination component 110 can include a database portion for storing one or more compiled quantum circuits.

Referring now to the compilation component 112, description herein turns first to one or more general descriptions of one or more functions that can be performed by the compilation component 112, prior to describing in detail the one or more functions.

Generally, the compilation component 112 can compile communication instructions for scheduled transfer of yet-undetermined data among one or more control nodes and/or one or more action nodes, to be described below in detail. The compiling can include identifying of one or more communication paths and/or of one or more data parameters, to be discussed below in detail. The compiling additionally and/or alternatively can include scheduling one or more data transfers along the one or more identified communication paths. The scheduling can be based at least in part on the one or more data parameters identified.

The data can be yet-undetermined in that one or more quantum program aspects, such as particular instructions, measurement results, variational quantum parameters and/or the like, have not yet been determined, such as calculated, when the one or more communication paths are identified, generated and/or scheduled. Indeed these quantum program aspects can be determined during execution of a quantum program. In one example, instructions cannot be pre-established for operating one or more physical actions, such as a physical pulse, on one or more qubits, until previous quantum measurements can be analyzed and subsequent instructions and/or quantum parameters (e.g., variational quantum parameters) can be determined for continuing the quantum program. That is, while actual data bits cannot be determined by the compilation component 112, information including data transfer path (communication path), number of data units, total quantity of data per transfer and/or schedule of transfers can be determined by the compilation component 112, to be described below.

Figure 2:
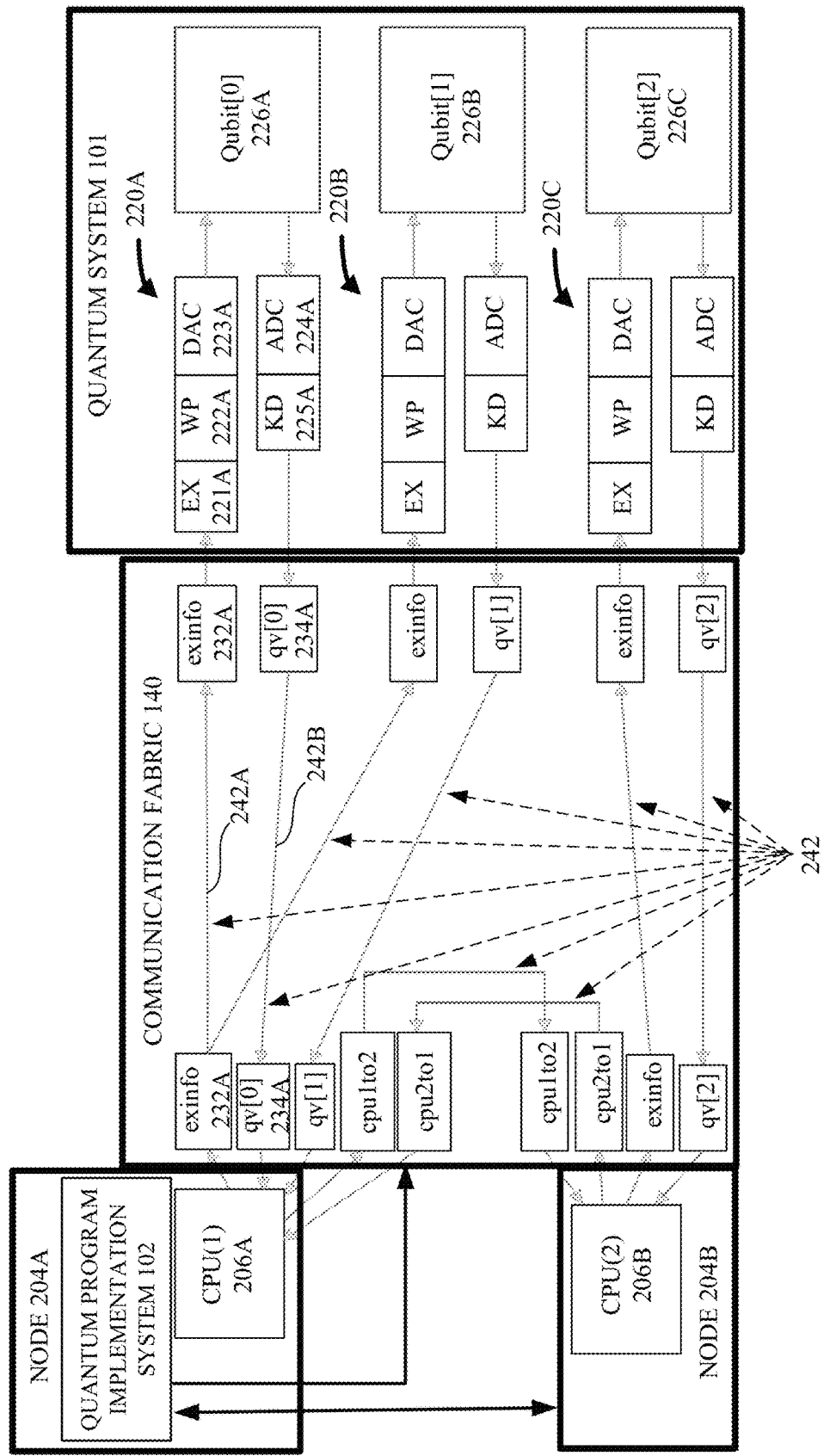
FIG. 2 illustrates another diagram of an expanded non-limiting system that can employ the non-limiting system of FIG. 1, which expanded non-limiting system also can facilitate operation of a quantum program on a set of qubits via compiling and employing compiled communication instructions, in accordance with one or more embodiments described herein.

Referring now to FIG. 2 in addition to FIG. 1, FIG. 2 includes an illustration of an expanded non-limiting system 100E. The non-limiting system 100E can be employed in place of the non-limiting system 100 illustrated at FIG. 1. That is, for one or more discussions that have been (or will be) provided herein, the non-limiting systems 100 and 100E can be interchangeable with one another. Discussion and/or disclosed aspects of one of the non-limiting systems 100 and 100E can apply herein to the other of the non-limiting systems 100 and 100E.

As used herein, a node (e.g., control or action node) can include one or more machines. The one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

As shown, the quantum program implementation system 102 can be included in a classical system of a control node 204A. Control nodes can be classical resources that can provide scheduling, instructions, data analysis, measurement analysis, quantum parameter optimization and/or the like. These control nodes can be locally and/or non-centrally distributed relative to one another, and/or any two or more control nodes can be communicatively connected with one another. It will be appreciated that one or more control nodes can be quantum resources and/or can include one or more quantum components in one or more other embodiments.

The illustrated classical control node 204A can include a central processing unit 206A, although in one or more other embodiments, the CPU 206A and the processor 106 can be the same and/or share one or more aspects of hardware and/or software. The expanded non-limiting system 100E at FIG. 2 also can include another control node 204B having a CPU 206B. It will be appreciated that any suitable number of control nodes can be included. In one or more embodiments, the quantum program implementation system 102 can be disposed apart from any of the control nodes (not shown). In one or more embodiments, two or more control nodes can include a quantum program implementation system 102. In such case, the two or more quantum program implementation systems 102 can function jointly to compile the one or more communication paths and/or data parameters, and/or only one of the quantum program implementation system 102 can facilitate one or more such functions.

Action nodes can be quantum resources that can perform one or more quantum tasks such as pulse generation, waveform generation, quantum measurement and/or other function related and/or involving one or more qubits. These action nodes can be locally and/or non-centrally distributed relative to one another, and/or any two or more action nodes can be communicatively connected with one another. It will be appreciated that one or more action nodes can be quantum resources and/or can include one or more quantum components in one or more other embodiments. Additionally and/or alternatively, it will be appreciated that one or more action nodes can provide one or more of the above-listed control node functions and/or one or more control nodes can provide one or more of the above-listed action node functions.

Additionally and/or alternatively, other node types beyond action and control nodes can be possible. For example, a pass through node can be employed to aide in physical distribution and/or connectivity, an interface node cam be employed between quantum systems and/or a qubit group controller can be employed to manage a collection of imperfect qubits, for instance as a single error protected qubit.

The expanded non-limiting system 100E illustrated at FIG. 2, and also the non-limiting system 100 at FIG. 1 (although not shown) can include the quantum system 101 having three action nodes 220A, 220B and 220C distributed locally relative to one another. Each of these action nodes 220A, 220B and 220C can include one or more action node components, such as an expander (EX), waveform player (WP), digital to analog converter (DAC) device, analog to digital converter (ADC) device and/or kernel/discriminator (KD). In one or more embodiments, one or more functions of one or more action node components can be performed by another one or more of the action node components. In one or more embodiments, one or more of the action node components can be combined and/or omitted.

Each of these action nodes 220A, 220B and 220C can act on at least one qubit 226A, 226B and 226C, respectively. Additionally, it will be appreciated that while only three qubits are shown, qubit(0) 226A, qubit(1) 226B and qubit(2) 226C, additional action nodes can be included to act on additional qubits, such as 7 or more qubits, 10 or more qubits and/or 100 or more qubits, for example.

Referring now to the action node 220A, but applicable to any of the action nodes 220A, 220B or 220C, one or more aspects of the action node 220A will be described in detail.

The action node 220A can include an expander (EX) 221A, waveform player (WP) 222A, digital to analog converter (DAC) device 223A, analog to digital converter (ADC) device 224A and kernel/discriminator (KD) 225A and can act on qubit(0) 226A. The expander 221A can convert condensed information about quantum gates (e.g., example information or exinfo 232A) into a sequence of one or more quantum gates. At least a portion of the sequence can be compiled at a database external and/or internal to the non-limiting system 100/100E. The waveform player 222A can convert the sequence of two or more quantum gates into code points for utilization by the DAC device 223A. For example, the waveform player 222A can reference a library of code points representing one or more quantum gates with which to build a sequence of code points. The library of code points can be stored at a database external and/or internal to the expanded non-limiting system 100E. The DAC device 223A can convert the sequence of code points to one or more analog signals, such as an analog control signal and/or an analog measurement signal. During a time window of measurement of a state of a qubit, such as of the qubit(0) 226A, the ADC device 224A can sample one or more of the analog signals to produce one or more digital codes representing voltage.

The kernel/discriminator 225A can convert one or more samples of measurement into binary representing a state of the qubit. In one or more other embodiments, the kernel/discriminator 225A can convert one or more samples of measurement into one or more binary states, such as where a binary string can be employed and/or passed around to represent one or more of the states (e.g., four distinct quantum states defined as 00, 01, 10 and 11). The kernel/discriminator 225A can output a qubit value, such as qv(0) 234A for the qubit(0) 226A. Furthermore, although not particularly shown at FIG. 2, in one or more embodiments, a qubit measurement output from a kernel/discriminator can feed into the respective expander, into a different expander and/or be broadcast to two or more nodes in a respective system.

In current systems, delay of transfer of the example information (e.g., exinfo 232A) between the control nodes and action nodes (e.g., from control node 204A to action node 220A) and/or transfer of the resultant measured qubit values (e.g., qv(0) 234) between the action nodes and the control nodes (e.g., from action node 220A to control node 204A) can be typical. This is particularly the case when many data aspects, such as the example information and qubit vales, are being passed back and forth to implement control of a plurality of qubits. Bottlenecks, choke points and/or data collection points (e.g., via software and/or hardware) between nodes (e.g., control and/or action nodes) can limit speed of data transfer. That is, traditional multi-CPU communication and management techniques can fail to transfer, analyze and/or determine data on a scale that can account for typical qubit decoherence. This problem can be exacerbated when scaling to quantum programs acting on large numbers of qubits.

In view of the one or more delays, transfer of data regarding one or more quantum tasks operating on multiple qubits can be delayed to at least one action node, such as where coordination between multiple action nodes is utilized to implement a multi-qubit gate. These one or more delays can in turn cause further delays at action nodes that are ready to implement the multi-qubit gates but instead are delayed until all such action nodes also are ready (e.g., affecting one or more downstream execution times). This can further compound decoherence and/or other errors (e.g., quantum noise) present in the quantum system during execution of a quantum program. Furthermore, it is to be appreciated that a plurality of quantum tasks can be performed in sequence to execute the quantum program. This can even further compound the aforementioned delay, decoherence and/or error introduced into the respective quantum, classical and/or hybrid system.

To account for one or more of these problems, one or more embodiments herein (e.g., via the quantum program implementation system 102 and/or the compilation component 112) can compile a communication infrastructure of communication paths 242, collectively referred to herein as a compiled communication fabric 140, for scheduling of data transfer between the various control nodes and action nodes of a system, such as the non-limiting system 100/100E. That is, the compilation component 112 can compile, including identifying and scheduling data transfers relative to, one or more communication paths for transfer of data throughout the non-limiting system 100/100E. Via the compiled communication fabric 140, the compilation component 112 can facilitate communication of the control nodes 204A with one another and of the control nodes 104A and 104B with one or more of the action nodes 220A, 220B and 220C, via the one or more communication paths 242. This compilation (e.g., identification and/or scheduling) is described below in detail.

A communication fabric 140 can, in one or more instances, be specifically compiled for execution of one or more particular quantum programs. Relative to one or more other quantum programs, the same communication fabric 140 and/or a different communication fabric can be compiled.

First, generally, the compilation component 112 can identify the one or more communication paths prior to execution of a quantum program, such as after the non-limiting system 100/100E receives a respective quantum job request (e.g., the quantum job request 109). Additionally and/or alternatively, one or more communication paths 242, and/or segments thereof, can be identified by the compilation component 112 after initialization of execution of a respective quantum program, but before execution of a particular quantum task (of the quantum program) employing the one or more communication paths 242.

The compilation component 112 can identify one or more communication paths, such as by searching for one or more such paths identified through and/or utilized by one or more other programs, databases, applications and/or the like communicatively coupled to the compilation component 112. In one or more embodiments, the compilation component 112 can trigger one or more signals, such as pings, among the various control nodes and/or action nodes of the non-limiting system 100/100E. Based on one or more signals, pings, metadata and/or other results received, the compilation component 112 can identify communication paths and/or path delays. For example, worst case propagation delays can be useful to the compilation component 112, when planning operations among nodes. Likewise, the compilation component 112 can identify communication paths that minimize and/or avoid data concentration and/or congestion points among the various control nodes and/or action nodes. For example, in one embodiment, the compilation component 112 can employ a calibration program to record back-end structure and worst case propagation latencies, which recorded information can be employed by the non-limiting system 100 to plan one or more gate operations among nodes.

Looking still to FIG. 2, a plurality of communication paths 242 of the communication fabric 140 are identified as schematically connecting the one or more control nodes 204A and 204B and one or more action nodes 220A, 220B and 220C. It will be appreciated that although a particular communication path 242A has been illustrated for communication from the control node 204A to the action node 220A, and a different communication path 242B has been compiled for communication from the action node 220A to the control node 204A, one or more communication paths 242 can be used for communication between any nodes. That is, the compilation component 112 can identify one or more paths between one or more pairs of nodes (e.g., control and/or action nodes and/or at least a segment of a communication path 242 can be utilized for transfer among more than two nodes (e.g., control nodes and/or action nodes). Use of the communication paths 242 can thus be dynamic during execution of a quantum program. However, such dynamic use can remain scheduled by the compilation component 112 prior to the execution of the quantum program.

Further, as illustrated, separate communication paths 242 can be identified for transfer of data in each of the opposite directions (e.g., relative sending and relative receiving) between each control node and each action node. This can facilitate avoidance of data transfer overlap along a common communication path at a same instant and/or can allow for concurrent data transfer in both respective receipt and sending directions between a pair of nodes. In view of this compiling strategy facilitated by the compilation component 112, data transfer congestion can be minimized and/or avoided during one or more instants during execution of the quantum program.

Additionally, it will be appreciated that the particular communication paths 242 and number of communication paths 242 shown at FIG. 2 are merely an exemplary illustration of the communication fabric 140. Greater or fewer communication paths 242 can be identified where suitable.

Figure 3:
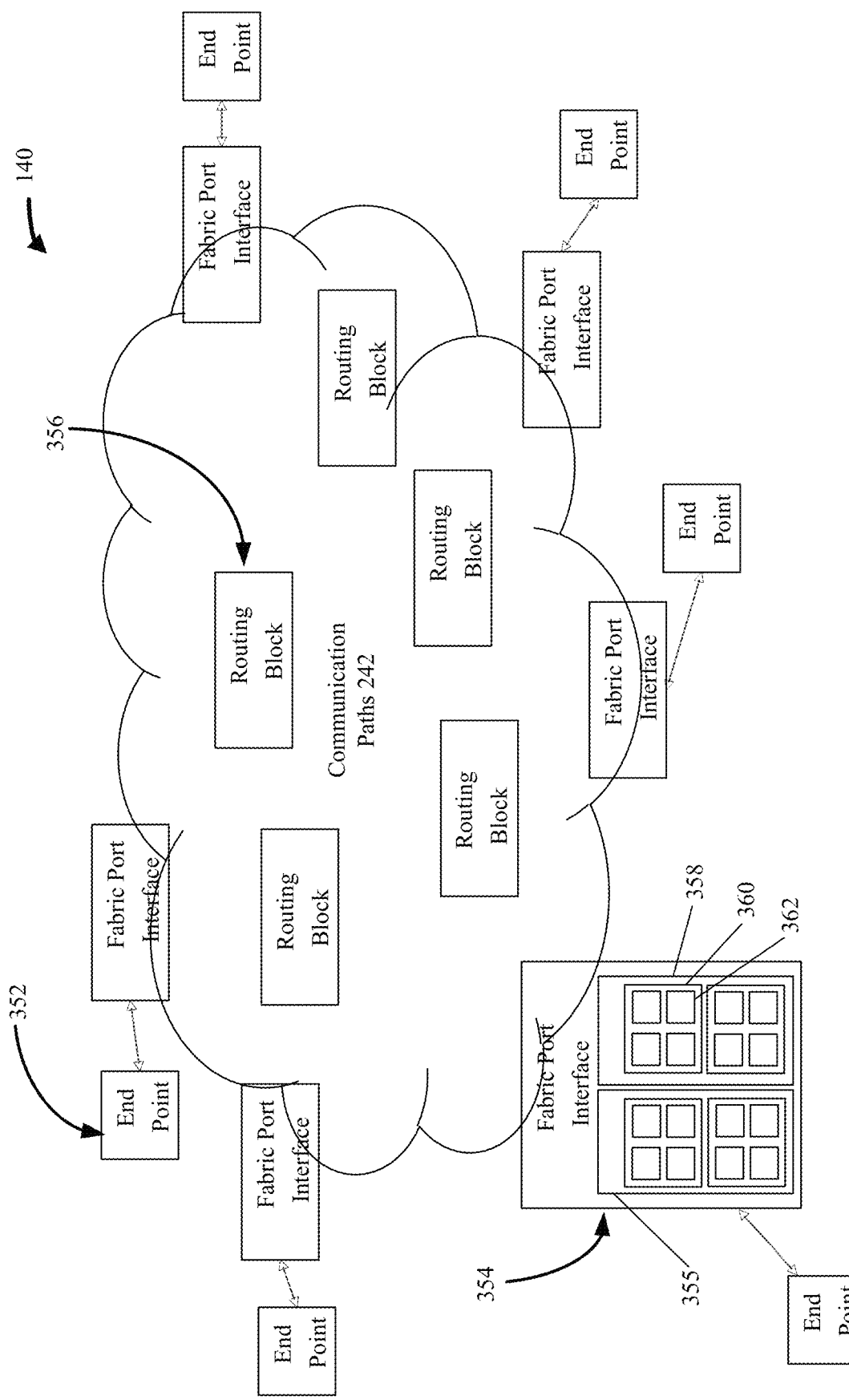
FIG. 3 illustrates a diagram of a plurality of communication paths that can be employed in the non-limiting system of FIG. 1 and/or in the expanded non-limiting system of FIG. 2, in accordance with one or more embodiments described herein.

Turning now to FIG. 3, it also will be appreciated that in one or more embodiments, the compilation component 112 can identify and/or can generate one or more path aspects of one or more communication paths. These path aspects can include one or more end points 352, one or more fabric port interfaces 354 and/or one or more routing blocks 356. Generally, the compilation component 112 can identify the one or more path aspects prior to execution of a quantum program, such as after the non-limiting system 100/100E receives a respective quantum job request (e.g., the quantum job request 109). Additionally and/or alternatively, one or more path aspects and/or portions thereof can be identified by the compilation component 112 after initialization of execution of a respective quantum program, but before execution of a particular quantum task (of the quantum program) employing the one or more path aspects and/or portions thereof.

The compilation component 112 can identify as at least a part of a path aspect one or more physical aspects, such as any suitable hardware, such as including a server, router, cabling and/or physical communication nexus. For example, with respect to quantum applications, at least a part of a path aspect can be implemented as a custom-designed interface having lightweight and/or non-existent protocols to minimize propagation latency. Additionally and/or alternatively, the compilation component 112 can identify as at least a part of a path aspect one or more software aspects and/or can generate one or more software aspects. In one or more embodiments, a software aspect can include or be a part of a cloud network.

Accordingly, it will be appreciated that the communication fabric 140 (e.g., including one or more compiled communication instructions) as compiled by the compilation component 112, and as provided for by the non-limiting system 100/100E, can be realized by software, hardware and/or a combination of hardware and software.

Turning to the various path aspects, one or more end points 352 can be connected to and/or be an aspect of (whether hardware, software and/or a combination thereof) the respective control nodes and/or action nodes, such as those control nodes and/or action nodes illustrated at FIG. 2. For example, each end point 352 can be communicatively connected to a respective node, such as to a CPU of a control node or to an expander and/or respective quantum processor of an action node. The end points 352 can be identified and/or generated for registering, receiving and/or outputting data transfers.

One or more end points 352 each can be connected to at least one fabric port interface (FPI) 354. The one or more FPIs 354 of the communication fabric 140 can serve as the interface connections with the end points 352 for the hardware and/or software comprised by the one or more communication paths 242 of the communication fabric 140. An FPI 354 can be identified and/or generated for interfacing with one or more communication paths and/or for driving data transfers. For example, an FPI can be a block of registers used to hold, send and/or receive data loaded and/or transferred under software control. In another example, and FPI can be a more complex hardware controller that can form, inject, receive and/or extract data encapsulated in a transfer packet, such as along with routing information.

An FPI 354 can include at least one send data block 355 and at least one receive data block 358. The send data blocks 355 and receive data blocks 358 can be figurative blocks (e.g., software generated) and/or literal hardware (e.g., identified by the compilation component 112). In one embodiment, such as illustrated, each send data block 355 and each receive data block 358 can comprise one or more destination blocks 360. The destination blocks 360 can be figurative blocks (e.g., software generated) and/or literal hardware (e.g., identified by the compilation component 112). The destination blocks 360 can be concatenated to form a contiguous, indexable array.

In one embodiment, each destination block 360 can be dedicated to transfer of data to a particular FPI 354. Accordingly, it will be appreciated that the number of destination blocks 360 comprised by the send data block 355 and the receive data block 358 can be different than as illustrated at FIG. 3. That is, only two destination blocks 360 are illustrated at each of the send data block 355 and the receive data block 358 of FIG. 3 for illustrative purposes of reduced clutter. However, in one or more embodiments, an FPI can include a bank of registers for destination blocks. That is, the data blocks 355 and 358 can each be a portion or section of the registers, with each of the data blocks 355 and 358 including a number of destination blocks 360 equal to a number of FPIs 354 of the respective communication fabric 140.

Each destination block 360 can comprise one or more data units 362. Each data unit 362 can contain and/or comprise one or more contiguous bits. The data units 362 can be figurative units (e.g., software generated) and/or literal hardware (e.g., identified by the compilation component 112). In one or more embodiments, the amount of contiguous bits that can be contained by a destination block 360 can be equal to an amount of data that can be sent to and/or received from another FPI 354, such as during one clock cycle while a quantum program is executing.

As used herein, "amount of data" is a concept separate from a "number of data units". That is, a single data unit can comprise a first amount of a data, and a number of data units can together comprise a larger and second amount of data. For example, a "data unit" can be a bit, nibble, or byte depending on how the communication fabric 140 is implemented.

As illustrated at FIG. 3, one or more segments of the communication paths 242 of the communication fabric 140 can be generally represented as a "cloud". It will be appreciated that one or more communication paths 242 can be at least partially wireless (e.g., extend through a network, such as a LAN and/or WAN). That is, at least a segment of one or more communication paths 242 can be non-tangible.

In addition to the end points 352 and FPIs 354, one or more communication paths 242 also can include one or more routing blocks 356, such as the routing blocks 356 disposed within the "cloud" at FIG. 3. That is, one or more, such as each, communication path 242 can extend from one end point 352 to another end point 352. One or more communication paths 242 can include a pair of FPIs 354 and zero or more routing blocks 356. The routing blocks 356 can be figurative blocks (e.g., software generated) and/or literal hardware (e.g., identified by the compilation component 112). A routing block 356 can be identified and/or generated for driving and/or routing data transfers between end points 352.

In one or more embodiments, a routing block can include a set of input and output registers, such as interconnected by multiplexers. Multiplexer control and/or selection can be managed by an array of hardware control words (e.g., a program) read from an array. The array can be configured when a quantum job request is received.

As illustrated, the communication fabric 140 can include fewer routing blocks 356 than FPIs 354 and/or end points 352. That is, a single routing block 356 can serve any one or more FPIs 354 during execution of a quantum program. Additionally and/or alternatively, a communication path 242 can include more than one routing block 356. Further, any suitable number of routing blocks 356 can be included in a compiled communication fabric 140. Alternatively, one or more, and in one or more cases, all, routing blocks 356 can be omitted.

It will be appreciated that the number of end points 352, fabric port interfaces 354 and/or routing blocks 356 included in the communication fabric 140 can be greater or less than illustrated in FIG. 3, as is suitable, for execution of different quantum programs.

Further, where large quantities and/or amounts of hardware and/or software aspects are included in the non-limiting system 100/100E, the number of any of end points 352, fabric port interfaces 354 and/or routing blocks 356 present can be scalable. This scalability can account for an increased number of control nodes (e.g., of CPUs), of action nodes (e.g., correlating to an increased number of qubits employed in a quantum program) and/or of data transfers to be scheduled by the compilation component 112 during any particular time interval during execution of a quantum program (e.g., due to any of increased control nodes, action nodes and/or qubits employed). It will be appreciated that the scheduling will be discussed below in detail.

Referring again briefly to FIGS. 1 and 2, to facilitate an identification and/or generation of one or more software aspects of the communication fabric 140 by the compilation component 112, one or more software applications, programs and/or code can be installed and/or otherwise input relative to one or more control nodes, action nodes, quantum program implementation systems 102 and/or other classical and/or quantum systems communicatively coupled to the non-limiting system 100/100E. That is, an entity can facilitate compilation of the communication fabric 140 by providing one or more software applications, programs and/or code to be employed by the compilation component 112. Alternatively and/or additionally, the quantum program implementation system 102 and/or compilation component 112 can facilitate the provision of one or more software applications, programs and/or code to be employed by the compilation component 112.

Additionally and/or alternatively, to facilitate an identification and/or generation of one or more hardware aspects of the communication fabric 140 by the compilation component 112, one or more physical hardware components, such as routers, servers, cables, routing boxes, custom hardware interfaces and/or the like can be provided and/or installed disposed between one or more control nodes, action nodes, quantum program implementation systems 102 and/or other classical and/or quantum systems communicatively coupled to the non-limiting system 100/100E. That is, an entity can facilitate compilation of the communication fabric 140 by providing and/or installing the one or more hardware components to be employed by the compilation component 112. Additionally and/or alternatively, the quantum program implementation system 102 and/or the compilation component 112 can facilitate the provision and/or installation of one or more hardware components to be employed by the compilation component 112.

Figure 4:
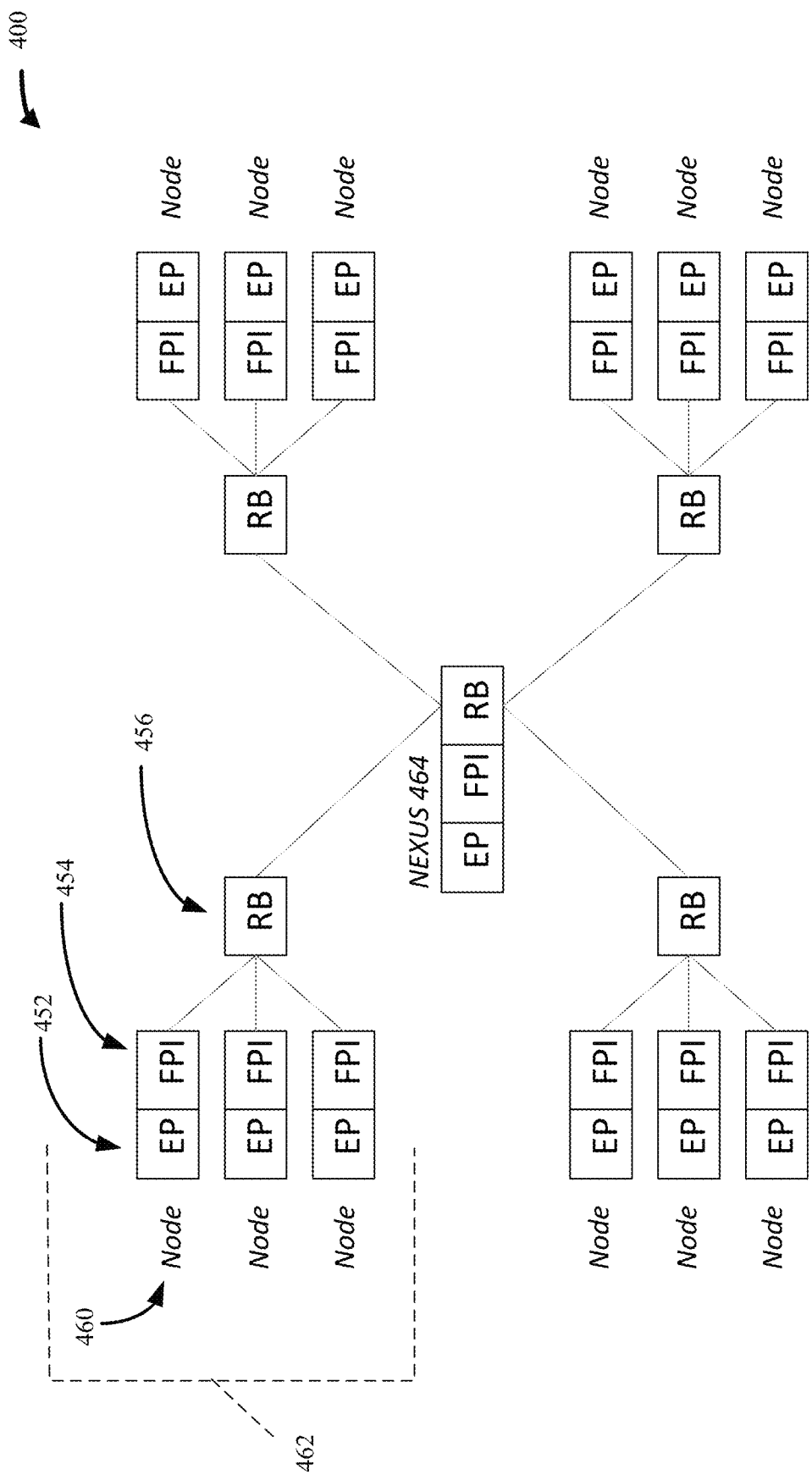
FIG. 4 illustrates a diagram of an exemplary configuration that can provide the communication fabric illustrated at FIG. 3, in accordance with one or more embodiments described herein.
Figure 5:
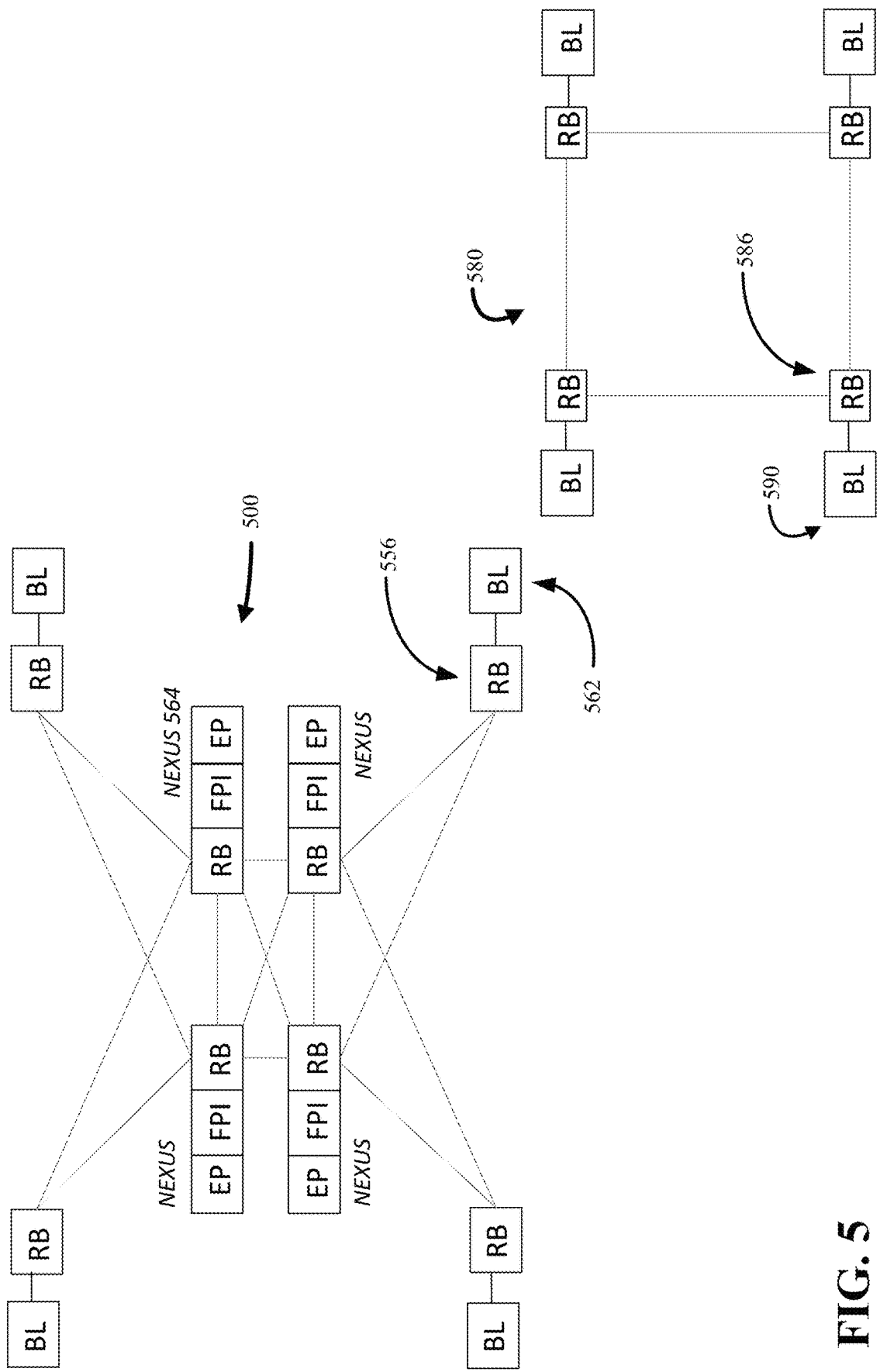
FIG. 5 illustrates two alternative diagrams of exemplary configurations of the communication fabric illustrated at FIG. 3, in accordance with one or more embodiments described herein.

Referring now to FIGS. 4 and 5, a connection topology of the aforementioned software and/or hardware path aspects can take various different forms. As discussed above, a connection topology for a compiled communication fabric can be realized as hardware and/or software. For example, a connection topology can depend on the quantum program to be executed and/or the hardware and/or software aspects accessible to the control nodes and/or action nodes (e.g., connecting the one or more control nodes and the one or more action nodes). One or more connection topologies can be intertwined in a single communication fabric and/or different communication fabrics can include different connection topologies.

As illustrated at FIG. 4, an exemplary connection topology 400 can include a plurality of node blocks 462 each connected to each other node block 462 by a common nexus 464. It will be appreciated that a nexus 464 can have a plurality of communication paths therethrough. Each node block 462 (e.g., each including an end point 452 and an FPI 454) can include a plurality of nodes 460 each connected to a common routing block 456. Each common routing block 456 of the node blocks 462 can be connected to the common nexus 464 at a routing block of the common nexus 464. The common nexus 464 can include a respective end point, FPI and routing block.

Alternatively, as illustrated at FIG. 5, an exemplary connection topology 500 can include a plurality of node blocks 562 each having one or more nodes. Each node block 562 can have and/or can be connected to a respective routing block 556 for the node block 562. A plurality of nexuses 564 can be included in the connection topology 500. One or more nexuses 564 can be connected to one or more other nexuses 564 such as at the respective routing blocks. In the depiction at 500 at FIG. 5, each nexus 464 is connected directly to a pair of node blocks 562 and indirectly to other node blocks 562 via one or more other nexuses 564.

Differently, as also illustrated at FIG. 5, an exemplary connection topology 580 can omit nexuses. Instead, a plurality of node blocks 590 can be included each having a routing block 586. The plurality of node blocks 590 can be connected in a ring shape. That is, each routing block 586 can be directly connected to two adjacent routing blocks 586.

Referring briefly to FIGS. 2 to 5 generally, the interconnected function of the combined architecture aspects (e.g., end points, fabric port interfaces and/or routing blocks) will be described. Upon receipt of a data transfer (e.g., one or more data units) at an end point (e.g., as an input or output from a CPU, expander and/or respective quantum processor), the data transfer can be registered. The compilation component 112 can verify that timing of the registration comports with the quantum program run schedule and/or with the clock cycle of the quantum program. The quantum program implementation system 102, execution component 118 and/or quantum system 101 can drive the data transfer in the proper direction (e.g., to a CPU, expander, quantum processor, fabric port interface, routing block and/or the like) from one end point to an end point of the next destination according to the quantum program run schedule.

Figure 6:
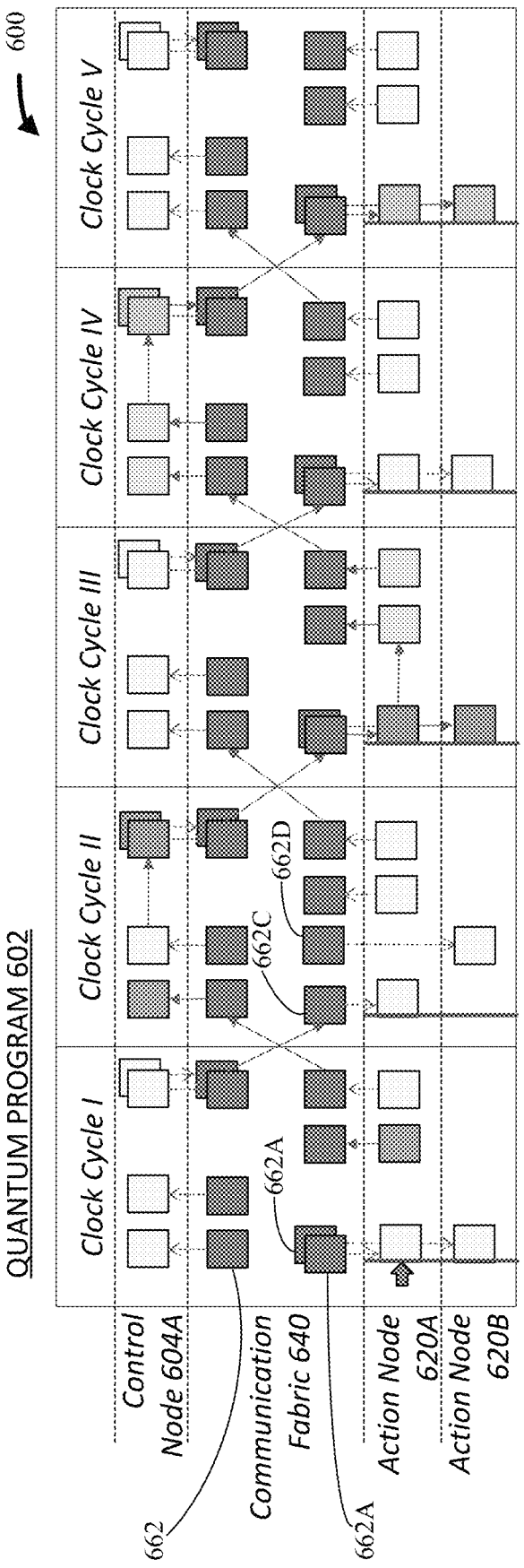
FIG. 6 provides a schematic illustration of a portion of a schedule for execution of a quantum program.

Turning now to FIG. 6, a quantum program run schedule 600 can be compiled by the compilation component 112. That is, to provide a communication fabric 140 that is even more efficient, the compilation component 112 also can compile one or more data parameters for the yet-undetermined data to be transferred along the identified communication paths. The compiled one or more data parameters can include a particular quantity of data units (e.g., per data transfer), a maximum size of data (e.g., sum of the bits or other unit comprised by the quantity of data units) to be moved between node pairs (e.g., control nodes and/or action nodes) and/or a combination thereof. The maximum size of data can be determined as the maximum that is transferred at each communication path at any one instant, at any one clock cycle and/or per any one quantum task during the full execution of the quantum program. The compilation component 112 can compile the one or more data parameters for different quantum tasks and/or clock cycles of a quantum program.

Indeed, in view of the one or more data parameters, the number of data units does not change during execution of a quantum program, but rather only the values (e.g., comprised by the bits) held in the data units vary, depending on what data is to be transferred. For example, data values can be determined during a run of the quantum program, such as by qubit measurements and/or decision information from the control nodes, such as regarding quantum gate implementations.

The compilation component 112 also can compile scheduling instructions as to the destination of the yet-undetermined data that will have the data unit quantities and maximum data sizes (e.g., utilizing the one or more data parameters). Put another way, the compilation component 112 can compile one or more data parameters for data movement including data unit quantity, maximum data size and/or data transfer destinations which can all thus be static during execution of a quantum program while only data contents can change during the execution. That is, what information to pass, where the information is to go, and how to pass the data can be determined prior to execution of a quantum program, but the contents (e.g., values) of the data (e.g., data bits) to be transferred can change dynamically as the quantum program is being executed.

For example, a quantum program, such as the quantum program 602 can comprise a plurality of quantum tasks performed at a plurality of action nodes. The quantum tasks can have a particular order in which the quantum tasks are to be performed. One or more quantum tasks can take longer than others. One or more quantum tasks can be performed in parallel with others. One or more quantum tasks cannot be performed until one or more other quantum tasks are first performed and/or initiated. This order of the quantum tasks to be performed at each action node can be scheduled by the compilation component 112 prior to execution of a quantum program 602, such as after the non-limiting system 100/100E receives a respective quantum job request (e.g., the quantum job request 109). Additionally and/or alternatively, one or more quantum tasks can be scheduled by the compilation component 112 after initialization of execution of a respective quantum program, but before execution of the one or more particular quantum tasks.

It will be understood that scheduling of one or more quantum tasks can include scheduling, by the compilation component 112, of one or more data routes (e.g., along the one or more communication paths) for the yet-undetermined data to be employed by the one or more quantum tasks. Scheduling of one or more quantum tasks also can include scheduling one or more data parameters for the yet-undetermined data to be transferred along the one or more data routes. These operations can be completed jointly and or concurrently. It will be appreciated that the one or more data parameters can be utilized by the compilation component 112 to schedule the one or more data routes and/or vice versa.

Looking to FIG. 6, a representation of a portion of a schedule 600 that can be compiled by a compilation component, such as the compilation component 112, is schematically depicted for a quantum program 602. A respective communication fabric 640 can communicatively connect a control node 604A, action node 620A and action node 620B. For a plurality of clock cycles I through V, data block quantities, maximum data sizes, transfer destinations and communication paths (not specifically shown) can be compiled, such as prior to execution of the quantum program 602. It will be appreciated that the quantum program 602 can include a plurality of quantum tasks that each can take one or more clock cycles to be performed, different action nodes can perform different quantum tasks at different times, and/or action nodes can jointly perform one or more quantum tasks.

For example, at clock cycle I, communication paths can be compiled (e.g., via the communication fabric 640) for transfer of a total of eight data units 662 (e.g., akin to the data units 362 at FIG. 3). A maximum data size can be determined per data transfer per communication path and compiled by a respective compilation component, such as the compilation component 112.

In one example, relative to clock cycle I, a maximum data size of data units 662A and 662B (e.g., akin to the data units 362 at FIG. 3) can be determined for transfer along a common communication path (or segment thereof) that can extend from the control node 604A to a routing block (not shown) of the communication fabric 640. In the one example, separate maximum data sizes can be determined for transfer along separate communication paths (or segments thereof) that can extend from the routing block (not shown) to each of the action nodes 602A and 602B.

In another example, relative to clock cycle II, separate maximum data sizes of data units 662C and 662D (e.g., akin to the data units 362 at FIG. 3) can be determined for transfer along separate communication paths (or segments thereof) that can extend from the control node 604A to each of the action nodes 602A and 602B, such as absent at least one routing block common to the separate communication paths.

To realize the schematic schedule 600 shown at FIG. 6, and or another schedule, and thus to determine the send data block (e.g., akin to the send data block 355 at FIG. 3) and receive data block (e.g., akin to the receive data block 358 at FIG. 3) for each quantity of data transferred during each quantum task and/or clock cycle of a quantum program (e.g., quantum program 602), the respective compilation component (e.g., compilation component 112) can compile a data transfer list. The data transfer list can comprise a list of destination blocks (e.g., destination blocks 360 at FIG. 3), with representative data for fabric number (FN), length of transfer (LEN) in number of data units (e.g., data units 362 at FIG. 3), source identifier (SID) and source offset (SOFF) into the FPI send data block array of the respective communication fabric, and destination identifier (DID) and destination offset (DOFF) into the FPI receive data block array of the respective communication fabric.

As used herein, the send data block array can include all send data blocks of all FPIs of a respective communication fabric. Likewise, as used herein, the receive data block array can include all receive data blocks of all FPIs of the respective communication fabric. In one or more other embodiments, the send data block array and/or receive data block array can include less than all send data blocks and/or receive data blocks, respectively, of all FPIs of a respective communication fabric.

An exemplary data transfer list is provided below at Table I for a single quantum task and/or clock cycle. With respect to Table I, four data transfers are included relative to a pair of respective communication fabrics FN-0 and FN-1 compiled by a respective compilation component (e.g., compilation component 112). Send FPIs are individually identified by the combination of FN and SID (e.g., (FN, SID)). In that send FPI (1, 12) is sourced twice, three send FPIs are included. In the case of send FPI (1, 12), because LEN and SOFF are the same, the same data can be broadcast to two different destinations. Where the underlying implementation can support broadcast, these two transfers can be performed in the same operation, where suitable. Receive FPIs also are individually identified by the combination of FN and DID (e.g., (FN, DID)). Three receive FPIs are included: (0,1), (1,0) and (1,1). Receive FPI (1,0) is targeted twice, but different data can be loaded into different destination blocks because LEN and DOFF fields differ.

TABLE I

Exemplary Data Transfer List

| FN | LEN | SID | SOFF | DID | DOFF |
|----|-----|-----|------|-----|------|
| 0  | 6   | 0   | 10   | 1   | 0    |
| 1  | 1   | 1   | 3    | 0   | 8    |
| 1  | 3   | 12  | 5    | 0   | 9    |
| 1  | 3   | 12  | 5    | 1   | 6    |

Referring again briefly to FIG. 1 and also to FIG. 6, in one or more embodiments, the compilation component 112 can employ a compilation algorithm 113 including one or more instructions for compiling the one or more communication instructions discussed above (e.g., to compile the communication fabric). Operations performed, instructed and/or directed via the compilation algorithm 113 can include compiling the one or more communication paths, compiling the one or more data parameters and/or scheduling the one or more data movements for the one or more quantum tasks. It will be appreciated that the compilation algorithm 113 and/or instructions for implementing the compilation algorithm 113 can be stored at the compilation component 112, memory 104 and/or an external memory/storage and/or can be accessible to the compilation component 112 and/or the non-limiting system 100 via an associated cloud computing environment, WAN, LAN and/or the like.

At FIG. 6, an exemplary partial compilation algorithm 113A is illustrated. In one or more embodiments of the non-limiting system 100/100E, the compilation algorithm 113A can be employed in place of the compilation algorithm 113 illustrated at FIG. 1. That is, for one or more discussions that have been (or will be) provided herein, the compilation algorithms 113 and 113A can be interchangeable with one another. Discussion and/or disclosed aspects of one of the compilation algorithms 113 and 113A can apply herein to the other of the compilation algorithms 113 and 113A.

The compilation algorithm 113A can include one or more instructions for generating and/or filling path arrays using one or more respective data transfer lists, which can be based on the one or more data parameters. That is, the compiled communication paths 242 employed by the non-limiting system 100 can be at least partially identified, and/or particular data transfers can be scheduled to occur along the compiled communication paths 242, based on the one or more data parameters. As indicated above, the compilation component 112 can trigger one or more signals, such as pings, among the various control nodes and/or action nodes of the non-limiting system 100/100E, such as to discover which paths and latencies are available through the respective communication fabric. Based on one or more signals, pings, metadata and/or other results received, the compilation component 112 can identify communication paths that can minimize and/or avoid data concentration and/or congestion points, between the various control nodes and/or action nodes.

To fill the path arrays (e.g., instruction sequencer or ISEQ array), the compilation algorithm 113A can include one or more instructions for identifying communication path segments between sources (e.g., control nodes and/or action nodes) and destinations (e.g., control nodes and/or action nodes) for the various quantum tasks that comprise the respective quantum program (e.g., a quantum program based upon quantum job request 109 and/or the quantum program 602). The compilation algorithm 113A further can include scheduling of one or more routes along the identified communication paths for the one or more data transfers (e.g., steps) comprised by the various quantum tasks). That is, the communication instructions and communication paths utilized can be compiled by the compilation component 112 employing the compilation algorithm (e.g., compilation algorithm 113 or 113A).

In addition, to fill the path (ISEQ) arrays, the compilation algorithm 113A can include one or more metrics, and/or one or more instructions for following the one or more metrics, for scheduling of the one or more data transfers. That is, to gauge the how well the routing resources are utilized, one or more can be created to inspect the scheduled output. One example can be to check the ratio of unused vs. used time slots for each routing resource and to compare the ratio to an ideal case. Because hardware latencies can create gaps in the routing resource instruction sequence, "ideal" does not necessarily mean each time slot for a routing resource is used. Rather "ideal" can be defined as calculating the minimum time it takes to route one path from a group of longest routes through an empty system, and then adding to it the number of paths in the longest route group. In an ideal case, all other paths (i.e., those being shorter) can be scheduled in the gaps left by the longest path group so no extra time is needed for them. The ratio of unused slots in an ideal case vs. the actual case can be considered during the packing of each ISEQ array.

In a different implementation, for example employing a hardware packet switch, different metrics can be developed. As an example, a different metric could include a comparison of a ratio of a perfect route of packets against a real transfer of data which can include packet stalls, such as when contention for an input or output port of a routing element occurs.

As indicated above with respect to the metrics, it is noted that longest communication paths identified can be routed first to enable gaps from propagation latency to be filled by routing of shorter paths, for example. In one or more embodiments, a longest routed data transfer (e.g., step) and/or a longest communication path, can be employed to determine a clock cycle employed by the compilation component 112 and/or by the non-limiting system 100. That is, the communication fabric 140 can be compiled by the compilation component 112 to operate on a single clock source. That is, a same frequency can be used, but different clock phases can be allowed. This can avoid latency of asynchronous data transfer crossings. In other embodiments, asynchronous transfers between routing resources can be implemented and supported but may increase scheduling complexity.

As also can be included in performance of the compilation algorithm 113A, the compilation component 112 can further employ the one or more data parameters and the one or more aforementioned signals, metadata and/or other results received (e.g., during identification of the one or more communication paths). The compilation component 112 further can, via one or more instructions provided via the compilation algorithm 113A, determine transfer times for one or more different quantities of data in one or both directions along one or more communication paths.

Description turns now to one or more additional functions of the compilation component 112, which can be instructed by the compilation algorithm 113/113A and/or not instructed by the compilation algorithm 113/113A. For example, in one or more instances, broadcast capability can be added to the communication fabric 140. As used herein, broadcasting can include sending copies of a same source data to multiple destinations, such as to multiple nodes or to multiple endpoints. That is, in such instances, where entries of a respective data transfer list include identical FPNs, LENs SIDs and SOFFs, such identical entries can be lumped together as broadcast operations.

In one or more embodiments, if the communication fabric implementation supports broadcast capability, the respective data transfer list format can be expanded to support describing one source and multiple destinations. Alternatively, the data transfer list can describe single source to single destination routes, and processing of the data transfer list can enable collection and combination of routes with the same source but different destinations into a broadcasted path. If the communication fabric does not support broadcast capability, a path with one source and multiple destinations appearing in the data transfer list can be decomposed into individual path routes each with a single source and destination. That is, broadcast capability can be considered an enhancement to the data transfer list and/or to the communication fabric implementation, such as to reduce overall propagation latency while employing the communication fabric during execution of a quantum program.

The compilation component 112 can provide the compiled communication fabric 140 to the execution component 116 for implementation of the determined quantum circuit over the one or more compiled communication paths by the execution component 116. The compiled communication fabric 140 can include the aforementioned one or more communication paths, data parameters and or data movement scheduling. The compilation component 112 can be communicatively coupled, directly and/or indirectly, with the execution component 116 for facilitating the provision of the compiled communication fabric 140.

Turning now to one or more additional components of the non-limiting systems 100/100E, the execution component 116 can direct initialization, instruction and/or implementation of the quantum job request 109 employing the compiled communication fabric 140 at the quantum system 101.

The quantum system 101 can execute the quantum job request 109, based at least in part on the compiled communication fabric 140. That is, the quantum system 101 (e.g., the one or more action nodes) can execute the quantum job request 109 on qubits at the quantum system 101 based upon one or more compiled communication instructions of the communication fabric 140, as compiled by the non-limiting system 100 and/or the compilation component 112. The quantum system 101 can provide one or more quantum measurements 117 to the quantum program implementation system 102 and/or to the classical portion of the non-limiting system 100 (e.g., to one or more control nodes). After operation of a complete quantum program, the non-limiting system 100 can receive, download, stream and/or otherwise obtain one or more final quantum measurements 117 from the quantum system 101.

The quantum program implementation system 102 also can comprise an output component 118. One or more quantum job results 119 can be output from the non-limiting system 100 via the output component 118. The one or more quantum job results 119 can comprise and/or can be based at least in part on the one or more quantum measurements 117, and/or can be responsive to the quantum job request 109 from the requesting entity.

Figure 7:
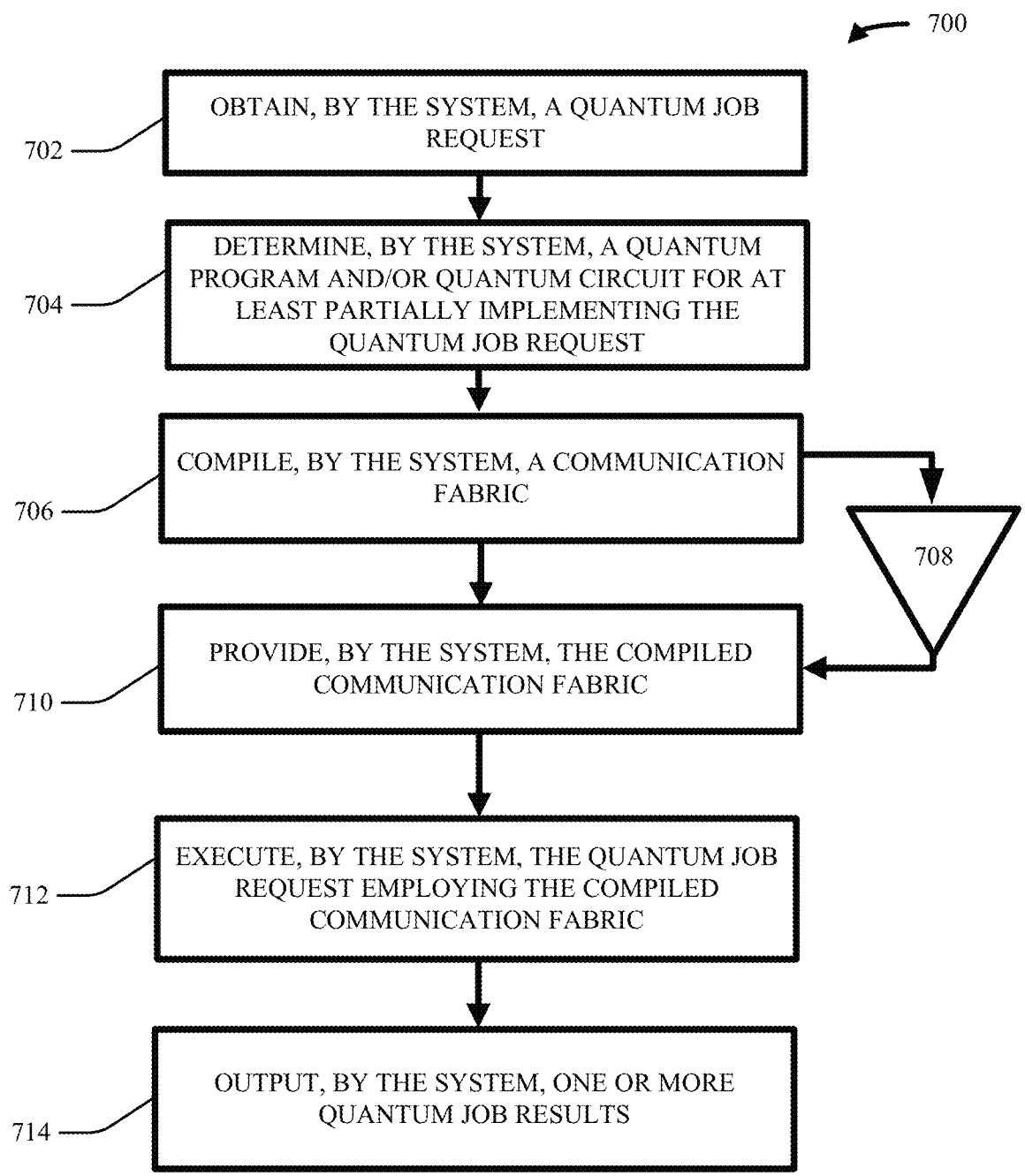
FIG. 7 illustrates a flow diagram of an example, non-limiting computer-implemented method that can facilitate operation of a quantum program on a set of qubits via compiling and employing compiled communication instructions, in accordance with one or more embodiments described herein.
Figure 8:
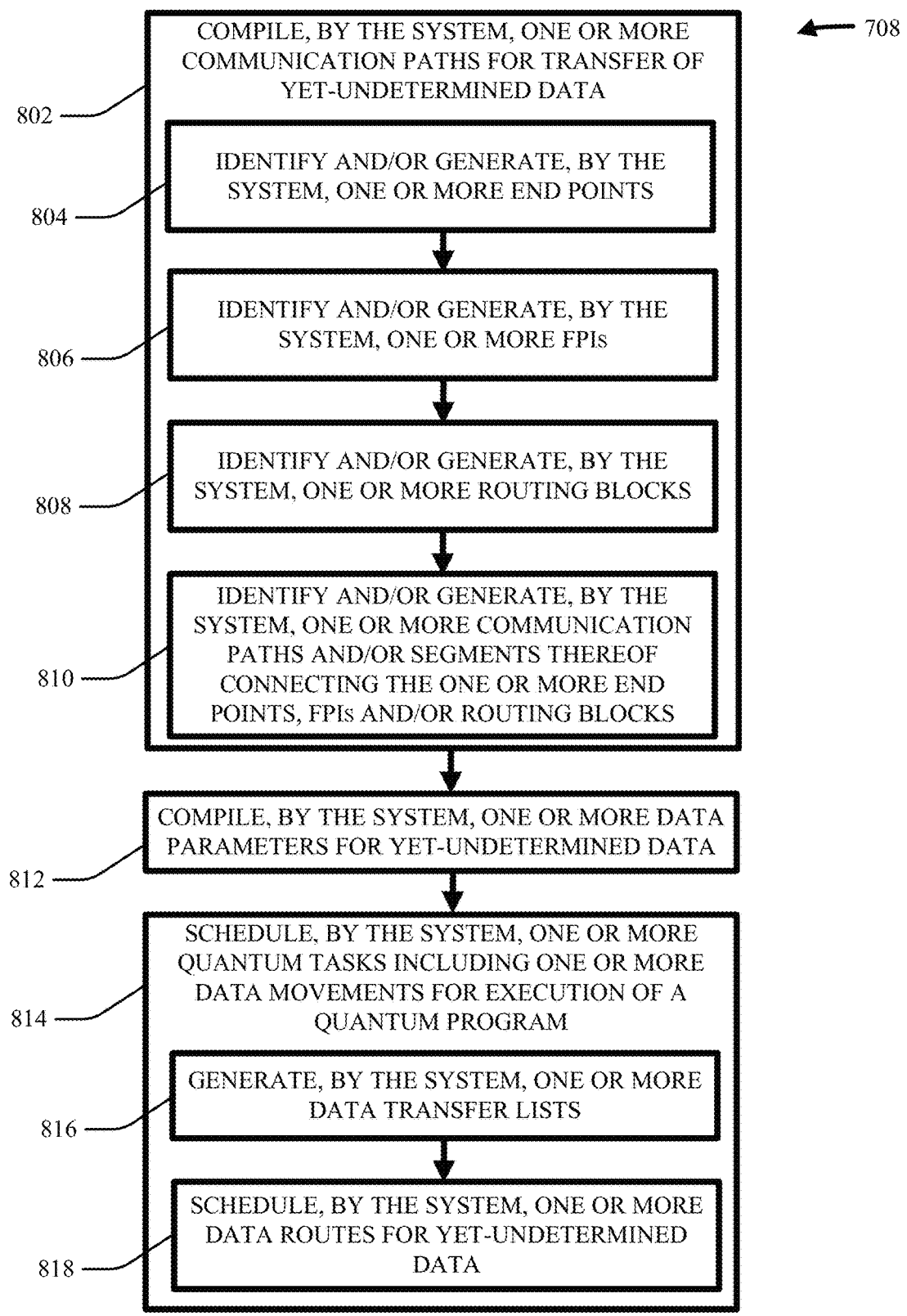
FIG. 8 illustrates a continuation of the flow diagram of FIG. 7, of an example, non-limiting computer-implemented method that can facilitate operation of a quantum program on a set of qubits via compiling and employing compiled communication instructions, in accordance with one or more embodiments described herein.

Turning now to FIGS. 7 and 8, these figures together illustrate a flow diagram of an example, non-limiting computer-implemented method 700 that can facilitate operation of a quantum circuit on a set of qubits via compiling one or more communication instructions, in accordance with one or more embodiments described herein. Repetitive description of like elements and/or processes employed in respective embodiments is omitted for sake of brevity.

Looking first to 702 at FIG. 7, the computer-implemented method 700 can comprise obtaining, by a system (e.g., via non-limiting system 100, 100E, quantum program implementation system 102 and/or quantum job component 108) operatively coupled to a processor (e.g., processor 106, a quantum processor and/or like processor), a quantum job request (e.g., quantum job request 109).

At 704, the computer-implemented method 700 can comprise determining, by the system (e.g., via non-limiting system 100, 100E, quantum program implementation system 102 and/or determination component 110), a quantum program (e.g., quantum program 602) and/or a quantum circuit for at least partially implementing the quantum job request (e.g., quantum job request 109).

At 706, the computer-implemented method 700 can comprise determining, by the system (e.g., via non-limiting system 100, 100E, quantum program implementation system 102 and/or compilation component 112), a communication fabric (e.g., communication fabric 140), such as including one or more communication instructions. This compilation can include employing a compilation algorithm (e.g., compilation algorithm 113 and/or 113A).

Particular processes comprised by this compilation are denoted as occurring at continuation triangle 708 and are more particularly illustrated at FIG. 8. In one or more embodiments, all processes embodied by continuation triangle 708 (e.g., as illustrated at FIG. 8) can be performed. In one or more other embodiments, one or more of the processes embodied by continuation triangle 708 can be bypassed and/or omitted.

At 710, the computer-implemented method 700 can comprise providing, by the system (e.g., via non-limiting system 100, 100E, quantum program implementation system 102 and/or compilation component 112), the communication fabric (e.g., communication fabric 140), such as for execution (e.g., such as to the non-limiting system 100, 100E, quantum program implementation system 102 and/or execution component 116) of the quantum program (e.g., quantum program 602).

At 712, the computer-implemented method 700 can comprise executing, by the system (e.g., via non-limiting system 100, 100E, quantum program implementation system 102, execution component 116, quantum system 101, quantum operation component 103 and/or quantum processor 105), a quantum job request (e.g., quantum job request 109) employing a communication fabric (e.g., communication fabric 140).

In one or more embodiments, execution can include one or more of the following operations: data transfer (e.g., communication instructions, quantum measurements, quantum gate parameters and/or the like) can be received at an end point (e.g., an end point 352); the end point (e.g., an end point 352) can register the data transfer; the data transfer can be driven in the proper direction (e.g., by the quantum program implementation system 102, execution component 118 and/or quantum system 101); one or more quantum gates can be implemented on one or more qubits, such as by operating one or more physical level pulses (such as via quantum system 101, quantum operation component 103 and/or quantum processor 105); and/or one or more quantum measurements (e.g., quantum measurements 117) can be output by the quantum system (e.g., quantum system 101, quantum operation component 103 and/or quantum processor 105). One or more of these operations can be repeated, such as according to one or more iterations of execution of one or more portions of a quantum circuit (such as via quantum system 101, quantum operation component 103 and/or quantum processor 105).

At 714, the computer-implemented method 700 can comprise outputting, by the system (e.g., via non-limiting system 100, 100E, quantum program implementation system 102 and/or output component 118), one or more quantum job results (e.g., quantum job results 119), such as to an entity, such as to a user entity.

Turning to FIG. 8, this figure illustrates an extension of the computer-implemented method 700 of FIG. 7, and particularly illustrates aspects that can occur at continuation triangle 708 of FIG. 7. These aspects can include particular processes of the compilation of a communication fabric (e.g., communication fabric 140), such as including compilation of one or more communication instructions. One or more communication instructions can include one or more communication paths (e.g., communication paths 242), one or more data transfer schedulings and/or one or more quantum task schedulings.

At 802, the computer-implemented method 700 can comprise compiling, by the system (e.g., via non-limiting system 100, 100E, quantum program implementation system 102 and/or compilation component 112) one or more communication paths (e.g., communication paths 242) for transfer of yet-undetermined data. For example, as illustrated at FIGS. 2 and 3, the communication fabric 140 can comprise one or more, such as a plurality of, communication paths 242. The compiling at 802 can comprise one or more operations, such as provided next at blocks 804, 806, 808, and 810. The data can be yet-undetermined in that one or more quantum program aspects, such as particular instructions, measurement results, variational quantum parameters and/or the like, have not yet been determined, such as calculated, when the one or more communication paths are identified, generated and/or scheduled.

At 804, the computer-implemented method 700 can comprise identifying and/or generating, by the system (e.g., via non-limiting system 100, 100E, quantum program implementation system 102 and/or compilation component 112) one or more end points (e.g., end points 352). The end points can be realized via hardware and/or software.

At 806, the computer-implemented method 700 can comprise identifying and/or generating, by the system (e.g., via non-limiting system 100, 100E, quantum program implementation system 102 and/or compilation component 112) one or more FPIs (e.g., FPIs 354). The FPIs can be realized via hardware and/or software.

At 808, the computer-implemented method 700 can comprise identifying and/or generating, by the system (e.g., via non-limiting system 100, 100E, quantum program implementation system 102 and/or compilation component 112) one or more routing blocks (e.g., routing blocks 356). The routing blocks can be realized via hardware and/or software.

At 810, the computer-implemented method 700 can comprise identifying and/or generating, by the system (e.g., via non-limiting system 100, 100E, quantum program implementation system 102 and/or compilation component 112) one or more communication paths (e.g., communication paths 242), such as employing and/or connecting the one or more end points, FPIs and/or routing blocks (e.g., end points 352, FPIs 354 and/or routing blocks 356). The communication paths can be realized via hardware and/or software.

At 812, the computer-implemented method 700 can comprise compiling, by the system (e.g., via non-limiting system 100, 100E, quantum program implementation system 102 and/or compilation component 112) one or more data parameters (e.g., one or more data parameters for data movement including data unit quantity, maximum data size and/or data transfer destinations) for the yet-undetermined data. The data can be yet-undetermined in that one or more quantum program aspects, such as particular instructions, measurement results, variational quantum parameters and/or the like, have not yet been determined, such as calculated, when the one or more communication paths are identified, generated and/or scheduled.

At 814, the computer-implemented method 700 can comprise scheduling, by the system (e.g., via non-limiting system 100, 100E, quantum program implementation system 102 and/or compilation component 112) one or more quantum tasks (e.g., of an associated quantum program) including one or more data movements for execution of the quantum program. The scheduling at 814 can comprise one or more operations, such as provided next at blocks 816 and 818.

At 816, the computer-implemented method 700 can comprise generating, by the system (e.g., via non-limiting system 100, 100E, quantum program implementation system 102 and/or compilation component 112) one or more data transfer lists (e.g., the data transfer list illustrated at Table I).

At 818, the computer-implemented method 700 can comprise scheduling, by the system (e.g., via non-limiting system 100, 100E, quantum program implementation system 102 and/or compilation component 112) one or more data routes (e.g., along the one or more communication paths and/or one or more segments thereof) for the yet-undetermined data.

Turning now to the FIGS. 1-8 in combination, one or more embodiments as described herein can integrate the disclosed teachings into a practical application. Indeed, as described herein, one or more embodiments, which can take the form of systems, computer-implemented methods, and/or computer program products can be considered as a computerized tool that can facilitate enhanced operation of a quantum circuit on one or more qubits. In general, the one or more embodiments described herein can reduce the time and/or error incurred by execution of a quantum program employing the quantum circuit. This is a useful and practical application of computers, especially in view of the effect of time and error on decoherence of employed qubits, and thus can facilitate enhanced (e.g., improved and/or optimized) operation of the employed qubits. These enhancements can include increased accuracy of quantum results and/or increased availability of the employed qubits. Overall, such computerized tools can constitute a concrete and tangible technical improvement in the field of quantum computing.

Furthermore, one or more embodiments described herein can control real-world devices based on the disclosed teachings. For example, one or more embodiments described herein can receive as input a quantum job request and can generate as a first output a compiled communication fabric including one or more compiled communication instructions for controlling implementation of a quantum program as one or more physical operations, such as real-world physical pulses, on one or more qubits of a quantum system. The one or more embodiments described herein can generate as a second output one or more quantum results in response to the performance of the one or more physical operations on the real-world qubits of the quantum system.

In one or more embodiments, the non-limiting system 100/100E, employing the quantum program implementation system 102 and compilation component 112, can enhance (e.g., improve and/or optimize) execution of a quantum program by compiling communication instructions. Thus, fast data transfer during execution of the quantum program can be facilitated. That is, the compilation component 112 can minimize and/or avoid a complex and/or time-consuming quantum program implementation problem of collection and distribution of data to/from a single concentrated point and/or global shared memory. In this way, the compilation component 112 can facilitate a hybrid classical/quantum system to minimize and/or avoid latencies that can accompany such single concentrated point and/or global shared memory, even in instances of overlapping and/or parallel transfers of data. This is at least in part due to the compilation component 112 compiling one or more communication paths, data parameters and/or quantum task schedulings, prior to execution of a quantum program.

Accordingly, the described subject matter, by employing the compilation component 112, can create an improvement in speed of execution of jobs by the hybrid classical/quantum non-limiting system 100/100E. For example, where there is high demand for execution of an increased quantity of quantum programs employing the quantum system 101, it can follow that use of the non-limiting system 100/100E (e.g., including the quantum program implementation system 102 and/or compilation component 112) can facilitate scaled execution of quantum programs. That is, by reducing time and/or error incurred during performance of one or more quantum tasks to operate a quantum circuit on one or more qubits, slower occurrence of decoherence of the one or more qubits can allow for additional quantum programs to be executed on the qubits.

Further, it will be appreciated that reduction in operation time and/or incurred error can facilitate enhanced (e.g., improved and/or optimized) function of the quantum system 101 and/or enhanced (e.g., improved and/or optimized) quantum results provided by operation via the compiled communication fabric 140 on the quantum system 101. In one or more cases, these one or more enhancements can be at least partially due to lower occurrence of decoherence of qubits during such execution, due to the reduced time and/or error incurred. This in turn can lead to a related reduction in provision of new qubits by a quantum system comprising the one or more qubits, and consequently, increased availability of processing capabilities of a quantum processor of a quantum system due, at least in part, to the decreased provision of new qubits.

Additionally, processing speed of both classical and quantum resources of the respective hybrid classical/quantum system (e.g., non-limiting system 100/100E) can further be improved absent interleaving and scheduling of cycle-to-cycle data movement with transfer and analysis of quantum results, quantum gate instructions and/or quantum parameters, for example. As such, the non-limiting system 100/100E (e.g., including the quantum program implementation system 102 and/or compilation component 112) can thereby facilitate improved performance, improved efficiency and/or reduced computational cost associated with a quantum processing unit (e.g., quantum processor 105 of the quantum system 101) performing one or more quantum tasks according to a compiled communication fabric (e.g., compiled communication fabric 140).

In summary, one or more embodiments described above can provide a system, comprising: a memory that stores computer executable components; and a processor that executes the computer executable components stored in the memory, wherein the computer executable components comprise: a compilation component that compiles one or more communication paths between two or more nodes for transfer of yet-undetermined data along the one or more compiled communication paths.

The system can comprise one or more of the following aspects: a) wherein the compilation component further compiles one or more data parameters for the yet-undetermined data to be transferred along the compiled communication paths, wherein the compiled one or more data parameters include a quantity of data units, a maximum size of data or a combination thereof; b) wherein the compilation component further employs the compiled one or more data parameters of the data to compile the one or more communication paths; c) wherein the computer executable components further comprise an execution component that directs determined data along the one or more communication paths to perform operation of a quantum circuit on two or more qubits; d) wherein the computer executable components further comprise an interval setting component that commonly sets and triggers a same successively repeating interval of time at two or more of the plurality of nodes to align performance at the two or more nodes the plurality of nodes of one or more quantum gate operations; e) wherein the compilation component further determines a maximum predicted transfer time for data sending and subsequent receipt along the one or more communication paths, and wherein the interval setting component employs the maximum predicted transfer time as a time length of the interval of time; and/or f) wherein the compilation component compiles the one or more communication paths absent one or more central data collection points therealong.

In summary, one or more embodiments described above can provide a computer-implemented method, comprising: compiling, by a system operatively coupled to a processor, one or more communication paths between two or more nodes for transfer of yet-undetermined data along the one or more compiled communication paths.

The method can comprise one or more of the following aspects: a) compiling, by the system, one or more data parameters for the yet-undetermined data to be transferred along the compiled communication paths, wherein the compiled one or more data parameters include a quantity of data units, a maximum size of data or a combination thereof; b) employing, by the system, the compiled one or more data parameters of the data to compile the one or more communication paths; c) directing, by the system, determined data along the one or more communication paths to perform operation of a quantum circuit on two or more qubits; d) commonly setting and triggering, by the system, a same successively repeating interval of time at two or more of the plurality of nodes to align performance at the two or more nodes the plurality of nodes of one or more quantum gate operations; e) determining, by the system, a maximum predicted transfer time for data sending and subsequent receipt along the one or more communication paths, and employing, by the system the maximum predicted transfer time as a time length of the interval of time; and/or f) compiling, by the system, the one or more communication paths absent one or more central data collection points therealong.

In summary, one or more embodiments described above can provide a computer program product facilitating control of data transfer between two or more nodes, the computer program product comprising a computer readable storage medium having program instructions embodied therewith, the program instructions executable by a processor to cause the processor to: compile, by the processor, one or more communication paths between the two or more nodes for transfer of yet-undetermined data along the one or more compiled communication paths.

The computer program product can comprise one or more of the following aspects: a) wherein the program instructions are further executable by the processor to cause the processor to compile, by the processor, one or more data parameters for the yet-undetermined data to be transferred along the compiled communication paths, wherein the compiled one or more data parameters include a quantity of data units, a maximum size of data or a combination thereof; b) wherein the program instructions are further executable by the processor to cause the processor to employ, by the processor, the compiled one or more data parameters of the data to compile the one or more communication paths; c) wherein the program instructions are further executable by the processor to cause the processor to direct, by the processor, determined data along the one or more communication paths to perform operation of a quantum circuit on two or more qubits; d) wherein the program instructions are further executable by the processor to cause the processor to commonly set and trigger, by the processor, a same successively repeating interval of time at two or more of the plurality of nodes to align performance at the two or more nodes the plurality of nodes of one or more quantum gate operations; and/or e) wherein the program instructions are further executable by the processor to cause the processor to determine, by the processor, a maximum predicted transfer time for data sending and subsequent receipt along the one or more communication paths, and employ, by the processor, the maximum predicted transfer time as a time length of the interval of time.

An advantage of such systems, computer program products and/or methods can be an improvement in speed and/or of execution of quantum jobs, which can be directly correlated to a reduction in time and/or reduction in incurred error for operation of one or more associated quantum circuits implemented during such quantum jobs. That is, the reduction in operation time and/or reduction in incurred error can facilitate enhanced (e.g., improved and/or optimized) function of an associated quantum system and/or enhanced (e.g., improved and/or optimized) quantum results provided by operation on the associated quantum system. In one or more cases, these enhancements can be at least partially due to lower occurrence of decoherence of qubits during such operation, due to the reduced time and/or reduced error incurred.

Additionally and/or alternatively, an advantage of such systems, computer program products and/or methods can be an ability to reduce and/or to avoid choke points and/or central data collection points during execution of a quantum program including a plurality of quantum operations to be performed. That is, where one or more iterations of operating instructions, measurements and/or results, and subsequent operating instructions are performed with data being transferred among a plurality of nodes, execution of the plurality of quantum operations can be enhanced (e.g., improved and/or optimized). For example, one or more parallel transfers of data can be performed more quickly absent and/or via reduced choke points and/or central data collection points.

Additionally and/or alternatively, an advantage of such system, computer program product and/or method can be enhanced (e.g., improved and/or optimized) performance of such quantum operations, not only facilitated by faster transfer of data, but also by faster and synchronized execution of such quantum operations. The synchronization can be facilitated absent transfer of timing instructions with or without data along the one or more compiled communication paths during execution of a quantum program including the two or more quantum operations.

Figure 9:
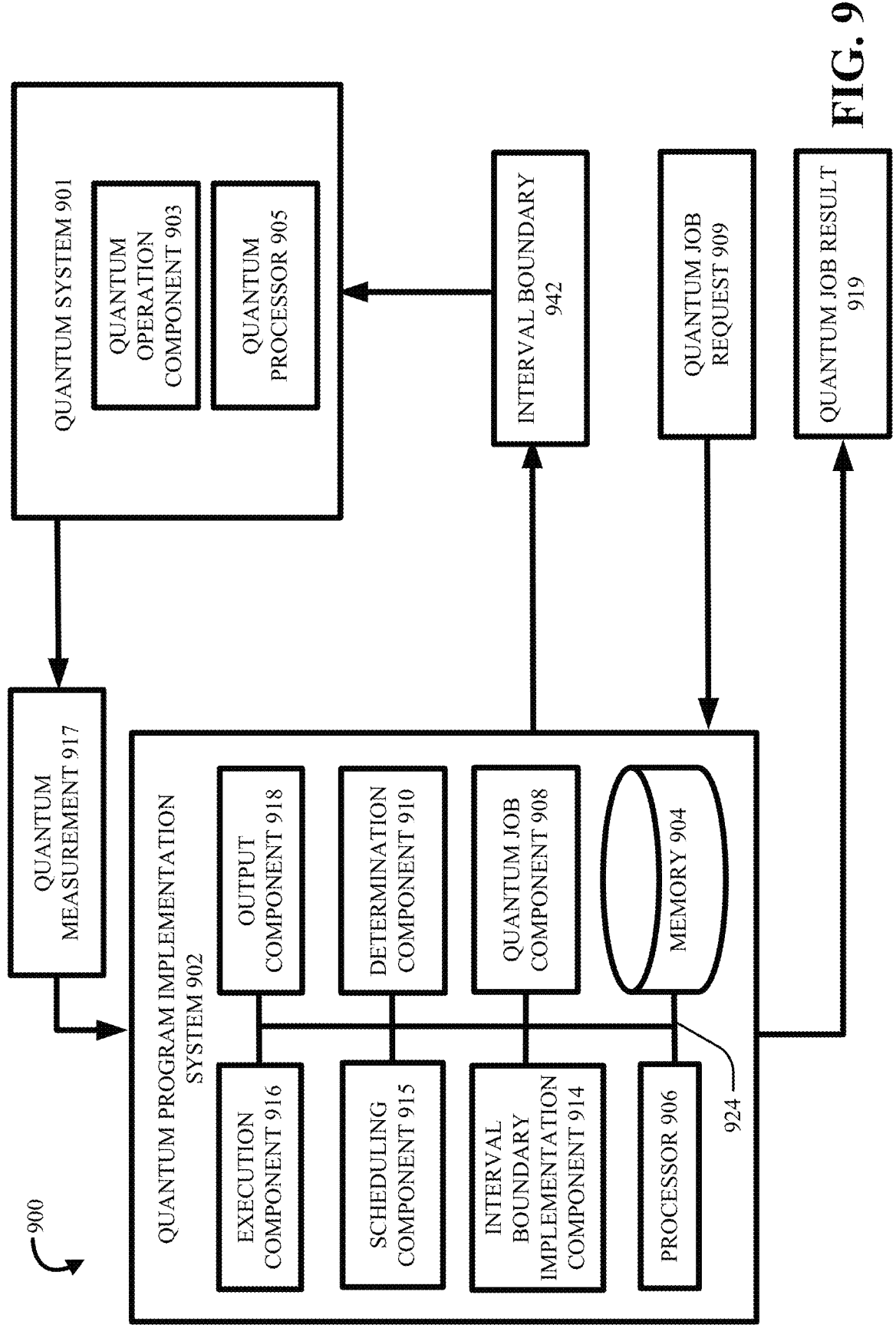
FIG. 9 illustrates a block diagram of an example, non-limiting system that can facilitate operation of a quantum program on a set of qubits via employing a universal time interval, in accordance with one or more embodiments described herein.

Turning now to FIG. 9, another embodiment of a non-limiting system is illustrated at 900. Like numbers are utilized where suitable to refer to like elements of the non-limiting system 100 of FIG. 1. Repetitive description of like elements and/or processes employed in the embodiment of the non-limiting system 100 of FIG. 1 is omitted for sake of brevity.

Referring to FIG. 9 (and also to FIGS. 10-13), one or more embodiments described herein can include one or more systems, computer-implemented methods, apparatuses and/or computer program products that can facilitate implementing a universal time interval to enhance operation of a quantum circuit on one or more qubits. For example, FIG. 9 illustrates a block diagram of an example, non-limiting system 900 that can facilitate implementing a universal time interval to enhance operation of a quantum circuit on one or more qubits.

It will be appreciated that the following description(s) refer(s) to the operation of a single quantum program from a single quantum job request. However, it also will be appreciated that one or more of the processes described herein can be scalable. For example, as will be appreciated below, the quantum program implementation system 102 can implement one or more interval boundaries 942 and/or execute one or more quantum programs, to each be described below in detail. These various levels of scaling can enable faster, more efficient, and/or less-error-prone executions of quantum programs, at least in part due to the correlated reduced decoherence and/or decoherence time of one or more qubits being employed to execute the quantum programs. As used herein, an interval boundary refers to a successively repeating universal interval of time implemented at two or more nodes (e.g., control nodes and/or action nodes).

In one or more embodiments, the non-limiting system 900 can be a hybrid system and thus can include one or more classical systems, such as a quantum program implementation system 902, and one or more quantum systems, such as a quantum system 901. In one or more other embodiments, the quantum system 901 can be separate from, but function in combination with, the non-limiting system 900. In one or more embodiments, the quantum system 901 can comprise one or more quantum components, such as a quantum operation component 903 and a quantum processor 905. Description provided above with respect to the quantum system 101 also can apply to the quantum system 901. Likewise, description provided above with respect to the quantum operation component 103 and the quantum processor 105 also can apply, respectively, to the quantum operation component 903 and the quantum processor 905.

Turning to the classical portion of the non-limiting system 900, description provided above with respect to general aspects of the quantum program implementation system 102 also can apply to the quantum program implementation system 902. In one or more embodiments, the quantum program implementation system 902 can comprise a processor 906 and/or a computer-readable memory 904 that is operably connected to the processor 906. Description provided above with respect to the processor 106 and computer-readable memory 104 also can apply, respectively, to the processor 906 and computer-readable memory 904. Quantum program implementation system 902 and/or a component thereof as described herein, can be communicatively, electrically, operatively, optically and/or otherwise coupled to one another via a bus 924 to perform functions of non-limiting system 900, quantum program implementation system 902 and/or any components thereof and/or coupled therewith.

Generally, the quantum program implementation system 902 can facilitate synchronization during execution of a quantum program on two or more qubits via implementation of a universal interval boundary. Generally, the quantum program implementation system 902 also can facilitate executing a quantum job request. That is, an execution component can direct data transfers and operations of quantum tasks relative to a quantum circuit on two or more qubits according to the universal interval boundary. An output component can output one or more quantum job results in response to the quantum job request.

Turning now to the quantum program implementation system 902 in greater detail, in one or more embodiments, quantum program implementation system 902 can comprise a quantum job component 908, determination component 910, interval boundary implementation component 914, execution component 916 and/or output component 918.

The quantum job component 908 can obtain, such as receive, download, stream and/or otherwise obtain, a quantum job request 909 from a requesting entity. Employing the quantum program implementation system 902 and the quantum system 901, the non-limiting system 900 can execute one or more quantum programs requested to be implemented in the quantum job request 909. In one or more cases, the quantum job request 909 can include one or more instructions pertaining to one or more particular quantum circuits to employ.

Relative to the one or more quantum programs requested, the determination component 910 can determine one or more quantum circuits for implementing the one or more quantum programs. The determination can include searching one or more databases internal and/or external to the quantum program implementation system 902 and/or to the non-limiting system 900. In one or more cases, the determination component 910 can include a database portion for storing one or more compiled quantum circuits.

The quantum program implementation system 902 further can include a scheduler/compiler, not shown. The scheduler/compiler can function to schedule data transfers and/or quantum tasks, such as performing piecemeal scheduling during execution of the quantum program.

In current systems executing a quantum program, such as hybrid classical/quantum systems, a plurality of such data transfers and/or quantum tasks typically can be initiated and/or performed during operation of one or more quantum circuits. These data transfers and/or quantum tasks each can take a variable and/or different amount of time to complete. Accordingly, delay of completion of one quantum task and/or transfer of data relative to one or more other quantum task completions and/or data transfers can reduce and/or altogether cause synchronization loss between two or more nodes (e.g., classical and/or action nodes). In one or more cases, synchronization loss can be caused by bottlenecks, choke points and/or data collection points (e.g., via software and/or hardware) between nodes (e.g., control and/or action nodes), thereby limiting speed of data transfer.

Indeed, in that CPUs typically can be classical resources, data transfers can happen at varying times, employing complicated scheduling during execution of a quantum program. Further, traditional multi-CPU communication and management techniques can fail to transfer, analyze and/or determine data on a scale that can account for typical qubit decoherence. Additionally, when current systems schedule one or more data transfers and/or quantum tasks during execution of a quantum program, data and/or metadata related to the scheduling can be provided along with a transfer of data and/or communication instructions, complicating matters. That is, the timing data and/or meta data can increase data transfer size and/or can slow down an associated data transfer. Moreover, where synchronization is lost between nodes and timing is not aligned, quantum tasks can fail to be implemented properly, such as introducing error and/or failing or causing experiment collapse altogether. These problems can be compounded when scaling to quantum programs acting on large numbers of qubits.

To account for one or more of these problems, one or more embodiments herein (e.g., via the quantum program implementation system 902 and/or the interval boundary implementation component 914) can implement an interval boundary 942 that can enable alignment of data transfers, quantum tasks and/or multi-card operations (e.g., DAC measurement tone, ADC capture window and/or the like) to the implemented interval boundary 942. That is, the interval boundary 942 can be employed by the non-limiting system 900 (e.g., by the execution component 916) for scheduling transfer of data and/or for implementing such data, such as implementing a multi-qubit gate at more than one action node.

Indeed, synchronization points (e.g., at successive and repeating interval boundary iterations) for the control nodes and/or the action nodes can thus be provided, such as absent employing overhead during execution of the associated quantum program. Further, one or more imprecisions can be allowed in CPU execution within an interval (e.g., between a pair of interval boundary iterations) in that the next interval boundary iteration can provide for alignment. With respect to initial scheduling of quantum tasks of a respective program, the interval boundary iterations can provide "natural" locations for a scheduler/compiler to align "barrier" gates. As used herein, "barrier" gates are time instances where the quantum program can entail alignment between individual or sub-sequences of quantum operations so that the individual or sub-sequences can be executed in a time-coordinated manner across two or more different qubit controllers. In addition, in one or more embodiments, an expanded non-limiting system 900E (FIG. 10) can include one or more processors having a hardware sequencer instead of a programmable CPU to control quantum gate operation.

Relative to implementing the interval boundary 942, discussion herein first refers only generally to the interval boundary implementation component 914. Initially, the interval boundary implementation component 914 can facilitate determination of one or more time periods that can lapse during transfer of data and/or operation of one or more quantum tasks. Employing this time period information, the interval boundary implementation component 914 can implement a successively repeating universal interval boundary 942 at two or more nodes of the non-limiting system 900 (e.g., control nodes and/or action nodes). Detailed description will be provided below with respect to one or more functions performed by the interval boundary implementation component 914, to the interval boundary 942 that can be implemented, and to the control nodes and/or action nodes with regards to which the interval boundary 942 can be implemented.

Node synchronization can be facilitated by the interval boundary implementation component 914 during execution of a quantum program on two or more qubits. As used herein, a node (e.g., control or action node) can include one or more machines. The one or more machines can include one or more of a computing device, a general-purpose computer, a special-purpose computer, a quantum computing device (e.g., a quantum computer), a hardware sequencer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

In one or more embodiments, the expanded non-limiting system 900E can include one or more classical resources in addition to the quantum program implementation system 902. The quantum program implementation system 902 can be included in and/or be separate from one or more control nodes embodied by and/or embodying such classical resources. That is, control nodes can be classical resources that can provide scheduling, instructions, data analysis, measurement analysis, quantum parameter optimization and/or the like. These control nodes can be locally and/or non-centrally distributed relative to one another, and/or any two or more control nodes can be communicatively connected with one another. It will be appreciated that one or more control nodes can be quantum resources and/or can include one or more quantum components in one or more other embodiments.

Additionally, in one or more embodiments, the expanded non-limiting system 900E can include one or more quantum resources in addition to the quantum system 901. The quantum system 901 can include one or more action nodes. An action node can be a quantum resource that can perform one or more quantum tasks such as pulse generation, waveform generation, quantum measurement and/or other function related and/or involving one or more qubits. Action nodes can be locally and/or non-centrally distributed relative to one another, and/or any two or more action nodes can be communicatively connected with one another. It will be appreciated that one or more action nodes can be quantum resources and/or can include one or more quantum components in one or more other embodiments. Additionally and/or alternatively, it will be appreciated that one or more action nodes can provide one or more of the above-listed control node functions and/or one or more control nodes can provide one or more of the above-listed action node functions.

To implement an interval boundary (e.g., interval boundary 942), the interval boundary implementation component 914 first can determine a probable, estimated and/or calculated longest time period for being successively repeated at two or more nodes. That is, one or more determination parameters can be defaultly and/or selectively implemented at the interval boundary implementation component 914 for determining upon what criteria the longest timer period is to be based. Where one or more determination parameters are selectively implemented, such selective implementation can be provided by an entity. In one embodiment, an entity can implement one or more determination parameters via a communication device and/or any suitable communicative connection to the interval boundary component 914 and/or the quantum program implementation system 902.

As indicated, the longest time period can have one or more various criteria. In one or more embodiments, the longest time period can be based upon a longest data transfer time in any direction between any two (or more) nodes (e.g., classical and/or action nodes). In one or more embodiments, the longest time period can be based upon a longest data transfer and return data transfer between any two (or more) nodes (e.g., classical and/or action nodes). In one or more embodiments, the longest time period can be based upon a longest task completion time of a control node-based task (e.g., scheduling, instruction provision, data analysis, measurement analysis, quantum parameter optimization and/or the like). In one or more embodiments, the longest time period can be based upon a longest task completion time of an action node-based task (e.g., pulse generation, waveform generation, quantum measurement and/or other function related and/or involving one or more qubits). In one or more embodiments, the longest time period can be based upon two or more of these criteria, such as being based upon a longest time period over any combination of two or more of these criteria.

When basing the longest time period upon one or more of the aforementioned various criteria, the "basing" performed by the interval boundary implementation component 914 can include one or more of calculating and/or estimating an actual time period, estimated time period, and/or a time period having one or more probabilities of accuracy provided therewith.

Upon determining the longest time period, the interval boundary implementation component 914 can commonly set and trigger an interval boundary 942 having the determined longest time period at two or more nodes (e.g., control nodes and/or action nodes) of the non-limiting system 900 (and/or of the expanded non-limiting system 900E). In this way, performance of a multi-qubit quantum operation and/or a data transfer at the two or more nodes can be aligned.

The interval boundary implementation component 914 can employ a same clock source and/or runtime to implement the interval boundary 942. For example, the interval boundary implementation component 914 can universally set and trigger a same interval boundary 942 at each node to be synchronized with one another. In one or more embodiments, the interval boundary implementation component 914 can set and trigger the interval boundary 942 at more than one node at the same instant. In one or more other embodiments, in view of utilization of the single clock source and/or runtime, the interval boundary 942 can be set and/or triggered at one or more nodes at a different instant from one or more other nodes, though still have the same implemented and synchronized interval boundary 942. In one or more embodiments, this can be the case as long as the different instants have a known and repeatable relationship to each other that does not change during run time.

Figure 10:
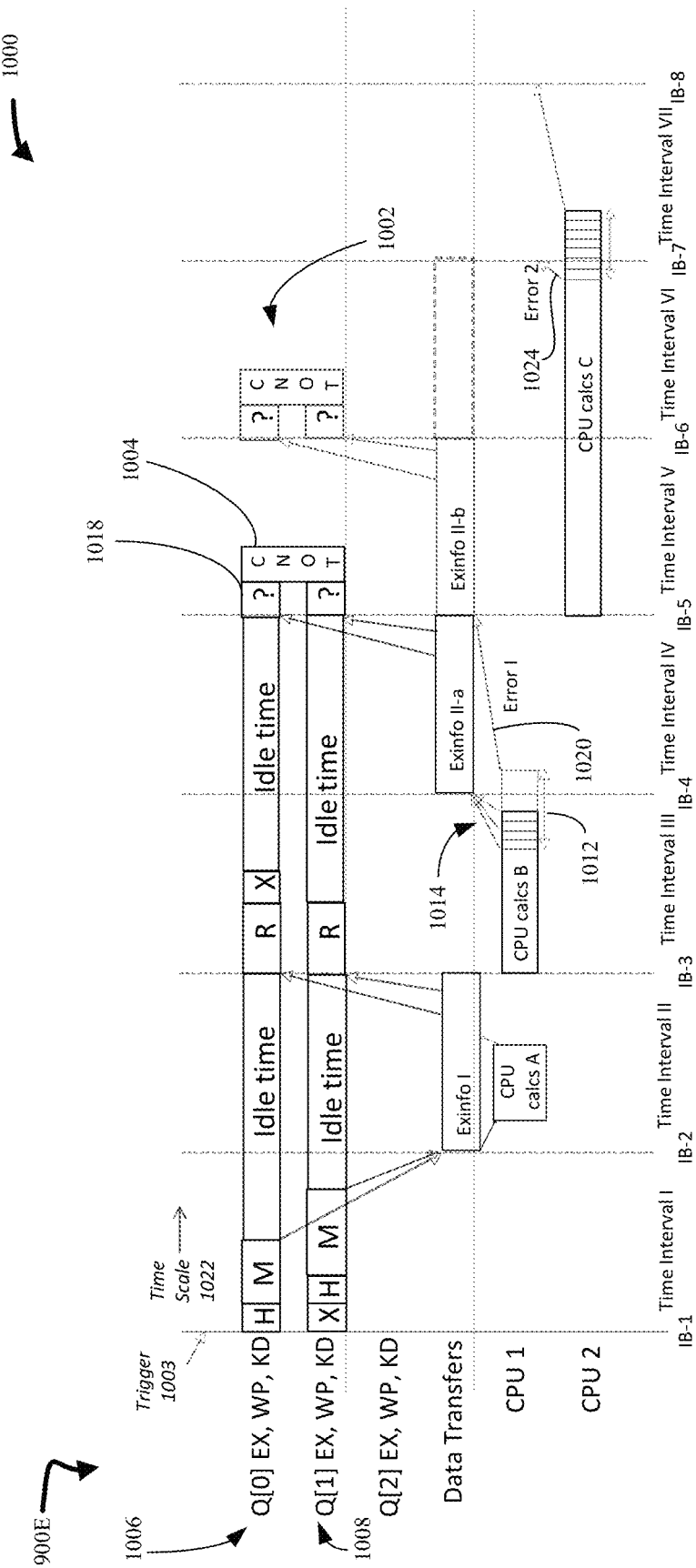
FIG. 10 illustrates a block diagram of an exemplary implementation of the universal time interval, in accordance with one or more embodiments described herein.

Looking now to FIG. 10, the interval boundary 942 will be further discussed relative to an exemplary implementation. At FIG. 10 a quantum program schedule 1000 is shown relative to the expanded version of the non-limiting system 900, e.g., the expanded non-limiting system 900E, on which a quantum program having a quantum circuit 1002 is to be implemented. The non-limiting system 900E can be employed in place of the non-limiting system 900 illustrated at FIG. 9. That is, for one or more discussions that have been (or will be) provided herein, the non-limiting systems 900 and 900E can be interchangeable with one another. Discussion and/or disclosed aspects of one of the non-limiting systems 900 and 900E can apply herein to the other of the non-limiting systems 900 and 900E.

The expanded non-limiting system 900E is illustrated as including a first control node having a first CPU 1 and a second control node having a second CPU 2. The expanded non-limiting system 900E also is illustrated as including three action nodes, each for directing one or more physical operations, such as pulses, for acting on a respective qubit (e.g., Q[0], Q[1] and Q[2]). Each action node can comprise an expander (EX), waveform player (WP) and kernel/discriminator (KD). As will be appreciated, the quantum program implementation system 902 can be comprised by (and/or can comprise) the first control node or the second control node and/or can be separate therefrom. In one or more such embodiments, the CPU 1 or CPU 2 can be and/or can be included in the processor 906 and/or the processor 906 can be separate from the CPU 1 and the CPU 2.

As illustrated at FIG. 10, the employed interval boundary 942 can be universally implemented at a plurality of nodes, such as at a common trigger 1003 by the interval boundary implementation component 914. The interval boundary 942 can implemented at each of the action and control nodes of the expanded non-limiting system 900E in a plurality of successively repeating and common time points, referred to herein as interval boundary iterations. FIG. 10 illustrates interval boundary iterations IB-1 through IB-8. Additional or fewer iterations can be employed in one or more other embodiments. Each adjacent pair of interval boundary iterations can bound a single time interval absent one or more other latencies, intercessions and/or other time periods. That is, one time interval can start where the next time interval begins (e.g., at a common interval boundary iteration or time point) with each time interval having the same time length.

The same time length can be determined by the interval boundary implementation component 914 as provided above, such as relative to a longest time period of data transfer and/or quantum task operation. As indicated above, this longest time period can be utilized as a minimum time length between interval boundary iterations. Where suitable for a quantum program to be executed, the quantum program implementation system 902 and/or the interval boundary implementation component 914 can employ a time length between interval boundary iterations that is longer than the longest time period. For example, a longer time interval can better fit a quantum program to be executed based on prior history of executing the quantum program and/or one or more quantum tasks comprised by the quantum program.

Still looking to FIG. 10, the quantum program schedule 1000 can include a plurality of quantum tasks, such as quantum gate operations, to be executed by the action nodes at qubits Q[0] and Q[1]. One or more of these quantum gate operations can be multi-gate operations, such as a CNOT gate 1004. It will be appreciated that the execution of quantum gates is exemplified by examples only at FIG. 10. For instance, X gates (inversion), H gates (Hadamard), R gates (reset), ? gates (conditional reset), CNOT gates (controlled not), M gates (measurement), and Z, S and T gates (other conditional rotations) represent an exemplary collection of quantum gates specified from or created to implement a user test case. As illustrative gates, these examples are place holders for an actual quantum gate sequence, are illustrated in no particular order and are not intended to imply any particular qubit behavior.

Starting at IB-1, quantum gate operations (e.g., Hadamard, X and M gates) are performed on qubits Q[0] and Q[1], for example as physical pulse operations. Measurement values qv[0] and qv[1] (included in exinfo I) can be provided by the respective action nodes 1006 and 1008 (operating on and/or controlling qubits Q[0] and Q[1]) as data transfers to CPU 1. During Time Interval II, CPU calculations A are performed by CPU1 and transferred to action nodes 1006 and 1008 as additional example information I (exinfo I) to direct joint performance of R gates at each of qubits Q[0] and Q[1]. That is, multi-qubit gates and/or jointly performed gates can be precisely synchronized between the qubits involved by utilizing the interval boundary 942. Employing the interval boundary 942, the action nodes 1006 and 1008 can align joint performance of the R gates at the next available interval boundary iteration, which is IB-3.

More generally, the interval boundary 942 can provide system-wide alignment points that can be used to align such gate execution. Because the associated interval boundary iterations occur/re-occur regularly, an interval boundary iteration can be available throughout the quantum program execution for being employed by action nodes near a multi-gate and/or joint gate execution. This can be the case even if the control flow path to reach the multi-qubit gate execution wanders through the system and/or involves non-deterministic elements such as CPU calculations. Accordingly, coordinated activity can be established, lost, and/or regained many times during execution of the respective quantum program.

Turning to Time Intervals III-VII, an advantage of implementing the interval boundary 942 to account for one or more quantum program execution errors is described in detail. For example, because CPU execution time length can naturally vary (e.g. changes in instruction execution pipeline or code branches of different lengths selected based on qubit measurement results), node synchronization can be affected if CPU execution ends during a different time interval than scheduled, such as by a scheduler/compiler. However, the interval boundary implementation component 914 can at least partially account for such problem by implementing an interval boundary, such as the interval boundary 942. Indeed, use of the interval boundary 942 can account for quantum program execution errors caused by variance during CPU execution and/or data transfer and can allow for continued operation of one or more quantum tasks and/or data transfers at a next interval boundary iteration. This is because the interval boundary iterations can bound the indeterminate functions of the CPU. This bounding can allow synchronized execution of multiple quantum nodes to be re-established precisely by predicting and/or communicating, such as by the scheduler/compiler, which upcoming interval boundary iteration to use as the next re-synchronization point.

It will be appreciated that without use of the interval boundary 942, quantum program execution errors instead can introduce unwanted error into the quantum task executions and/or can cause complete and/or partial failure of execution of the associated quantum program.

In one or more embodiments, to account for such an error, the non-limiting system 900E (e.g., quantum program implementation system 902, execution component 916 and/or quantum system 901) can implement one or more checks to determine one or more errors prior to and/or during quantum program execution. That is, the aforementioned bounded indeterminism can be error checked by predicting which interval boundary iteration should and/or will resume and by confirming the prediction in hardware. For example, with respect to CPU calculations B, a hardware check can be run prior to execution of the associated quantum program. A quantum program execution error can be detected when execution takes too long and extends into the next interval boundary iteration (e.g., Error I at FIG. 10), or if it ends too early when the execution is expected to span an additional time interval (e.g., Error II at FIG. 10). It is noted that the error check can be performed in parallel with and/or after a CPU result/calculation transfer. For example, a deviation from the expected time window can be logged and reported with the experiment result such that the quantum program recognizes and can address the execution failure accordingly, such as by discarding a bad iteration from overall results.

Turning now to the particular illustrations of FIG. 10, discussion regarding Error I and Error II is provided.

For example, regarding the first type of error (e.g., Error I), CPU calculations B are illustrated at FIG. 10, which CPU execution can be non-deterministic and can have a variable completion time 1012. In one case, where CPU calculations B can be finalized at any of completion times 1014 during Time Interval III and before IB-4, example information II-a can be transferred, such as according to a scheduler/compiler, at the next interval boundary iteration, IB-4. Further, the example information II-a can be utilized by the action nodes 1006 and 1008, in response to the CPU calculations B for aligned execution of the conditional reset gate 1018 and of the multi-qubit CNOT gate 1004 at IB-5. For example, the example information II-a can include one or more instructions and/or quantum parameters.

In an alternative case, also shown at FIG. 10, CPU calculations B can be finalized at completion time 1020, after IB-4. That is, even where a time interval length can be calculated for the interval boundary 942 based on one or more execution time periods provided by a scheduler/compiler, one or more estimated CPU calculation times can be unknown until actual performance and/or actual CPU calculation times can vary. As indicated above, such error check can raise an experiment error if the variable execution time of the CPU calculations B is estimated by the scheduler/compiler to fall outside of a time interval of the interval boundary 941.

Nonetheless, because the interval boundary iterations occur regularly once implemented, a CPU execution can span more than one time interval (e.g., spanning Time Intervals III and IV in FIG. 10). As shown, transfer of example information relating to CPU calculations B (e.g., exinfo II-b) can be moved to Time Interval V. Likewise, execution of the conditional reset-gates 1018 and of the multi-qubit CNOT gate 1004 can be moved to IB-6. These adjustments can be made possible due to availability of the successively repeating interval boundary iterations. Indeed, use of the interval boundary 942 can account for Error I and can allow for continued operation of such gates 1018 and 1004 at a next interval boundary iteration (e.g., IB-6). It will be appreciated that absent use of the interval boundary 942, the Error I instead can introduce unwanted error into the quantum task executions and/or can cause complete and/or partial failure of execution of the associated quantum program.

Additionally and/or alternatively, as indicated above, a quantum program execution error can be detected if a CPU execution completion time naturally falls near (e.g., soon before) an interval boundary iteration along time scale 1022. In such case, idle and/or no-operation (no-op) code can be added to the quantum program execution, such as by the associated scheduler/compiler, to move the entire affected CPU execution variability range into the next interval, such as where the check can be reliably performed.

For example, looking now to CPU calculations C at Time Intervals V-VII, this concept can be applied. Where the CPU calculations C complete at any completion point 1024 near the IB-7, this can allow only for minimal time to implement a data transfer of data related to the calculation results. That is, natural variability in CPU execution can cause a transfer/calculation to be provided at IB-7 or delayed until IB-8. Since this can cause variation in the application of gates dependent on the CPU result, the respective compilation component or compiler can address this situation. For example, the insertion of no-operation commands or other delay mechanisms can be employed in the CPU calculation such that a calculation result is present only during one time interval even when taking natural variability into account. Absent use of interval boundaries, precise tuning can be employed, down to the granularity of CPU instructions. However, employing the interval boundaries, a compiler can manage execution planning employ the larger precision windows of the time intervals of the interval boundary. For example, Error 2 can be prevented by moving the data transfer subsequent to completion of the CPU calculations C to the next time interval (e.g., Time Interval VII). Like Error I, Error 2 can be discovered by employing one or more checks, such as a hardware check, relative to the interval boundary 942.

Figure 11:
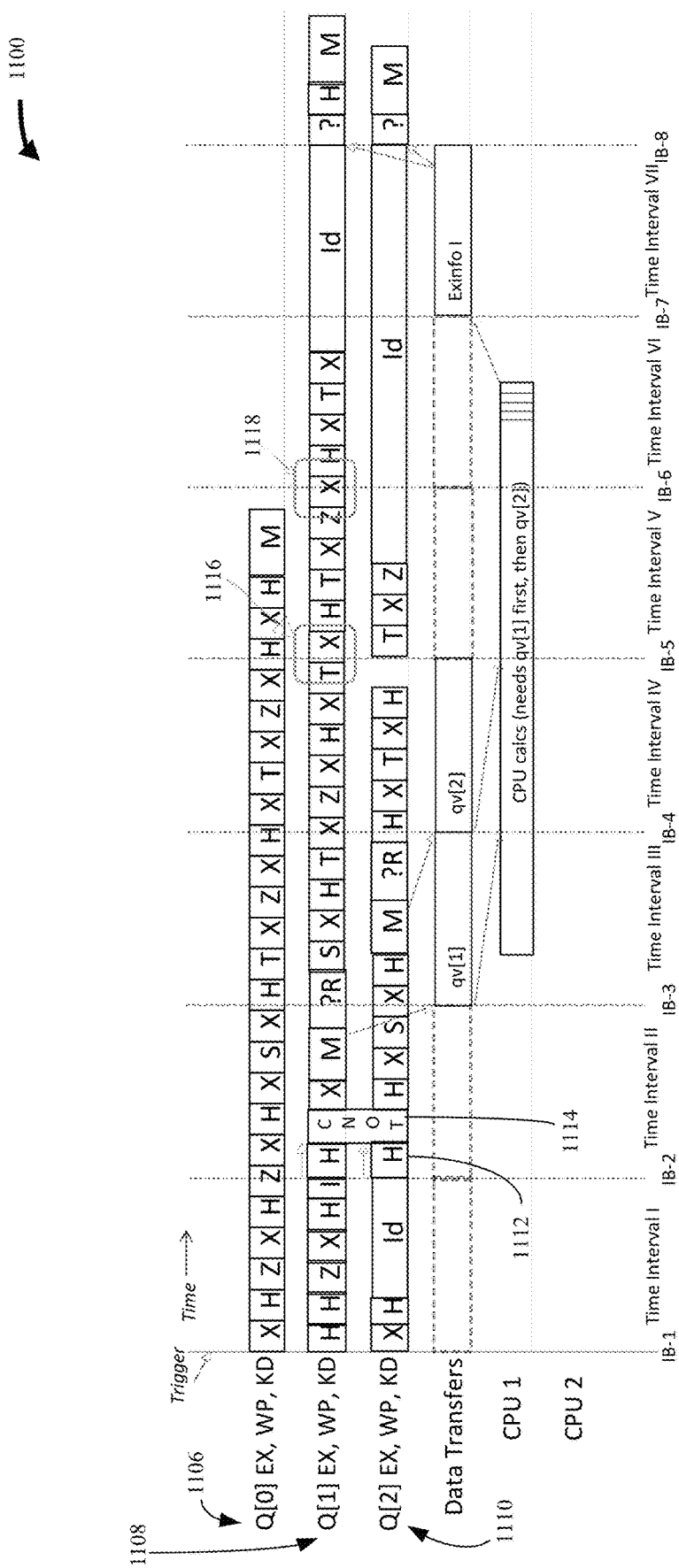
FIG. 11 illustrates another block diagram of an exemplary implementation of the universal time interval, in accordance with one or more embodiments described herein.

Referring next to FIG. 11, one or more additional concepts employing the interval boundary 942 are illustrated.

At IB-2, when synchronization between nodes (e.g., action nodes 1108 and 1110) is employed, such as for multi-gate nodes, one or more of such nodes can advantageously defer acting upon received data until a future (e.g., next) interval boundary iteration is encountered. For example, the Hadamard and CNOT gates 1112 and 1114 to be implemented at Q[2] can be deferred by action node 1110 until IB-2 to allow for joint implementation of Hadamard and CNOT gates at each of Q[1] and Q[2].

Referring to action node 1106, an action node implementing a sequence of quantum gates that do not employ coordination with other nodes can advantageously ignore, and/or function absent employing, the interval boundary 942. For example, the large sequence of quantum gates to be implemented at Time Intervals I to V at qubit Q[0] at FIG. 11 can be implemented without employing the interval boundary 942. That is, qubit Q[0] can be operated independently of other qubits being employed. Additionally and/or alternatively, when gate execution by one action node, such as action node 1106, can operate absent input from other qubits (e.g. measurement results), control nodes (e.g. decision code), and/or other action nodes (e.g., synchronization with another qubit, such as for a multi-qubit gate), the one action node can ignore the interval boundary 942. This concept also can be applied within an execution stream for bursts of gates that do not employ external interaction, such as at locations 1116 and 1118 relative to the quantum circuit being employed by the action node 1108 relative to qubit Q[1].

Turning again briefly to FIG. 9, one or more additional functions of the quantum program implementation system 902 and/or of the non-limiting system 900/900E will be discussed, such as relative to one or more additional components thereof.

Once established, the interval boundary implementation component 914 can provide the interval boundary 942 to the execution component 916 for implementing the determined quantum circuit relative to one or more qubits. The interval boundary implementation component 914 can be communicatively coupled, directly and/or indirectly, with the execution component 916 for facilitating the provision of the interval boundary 942. The execution component 916 can direct initialization, instruction and/or implementation of the quantum job request 909 employing the interval boundary 942 at the quantum system 901 (e.g., at the action nodes thereof). That is, the execution component 916 can employ the successively repeating interval boundary iterations (e.g., successively repeating time points) of the interval boundary 942 for successive executions of quantum tasks on two or more qubits. In one or more cases, one or more of such quantum tasks can be multi-qubit quantum tasks. The execution component 916 can cause simultaneously initiated quantum operations, such as a multi-qubit quantum task, on two or more qubits at numerous instances (e.g., two or more instances) of the successively repeating time point.

The quantum system 901 can execute the quantum job request 909, based at least in part on the interval boundary 942. That is, the quantum system 901 (e.g., the one or more action nodes) can execute the quantum job request 909 on two or more qubits at the quantum system 901. The quantum system 901 can provide one or more quantum measurements 917 to the quantum program implementation system 902 and/or to the classical resources of the non-limiting system 900/900E (e.g., to one or more control nodes). After operation of a quantum program, the non-limiting system 900/900E can receive, download, stream and/or otherwise obtain one or more final quantum measurements 917 from the quantum system 901.

The quantum program implementation system 902 also can comprise an output component 918. One or more quantum job results 919 can be output from the non-limiting system 900/900E via the output component 918. The one or more quantum job results 919 can comprise and/or can be based at least in part on the one or more quantum measurements 917, and/or can be responsive to the quantum job request 909 from the requesting entity.

Figure 12:
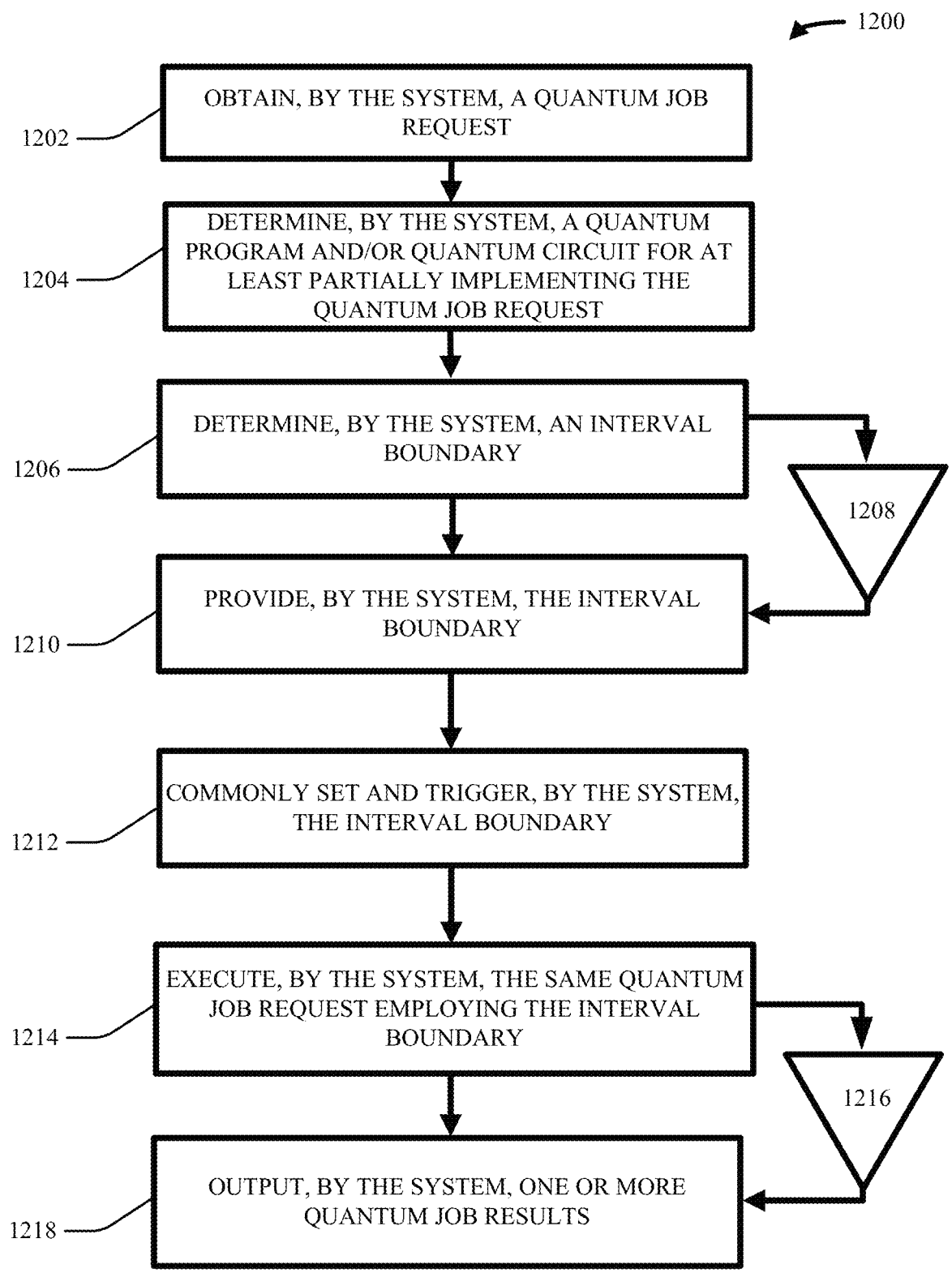
FIG. 12 illustrates a flow diagram of an example, non-limiting computer-implemented method that can facilitate operation of a quantum program on a set of qubits via employing a universal time interval, in accordance with one or more embodiments described herein.
Figure 13:
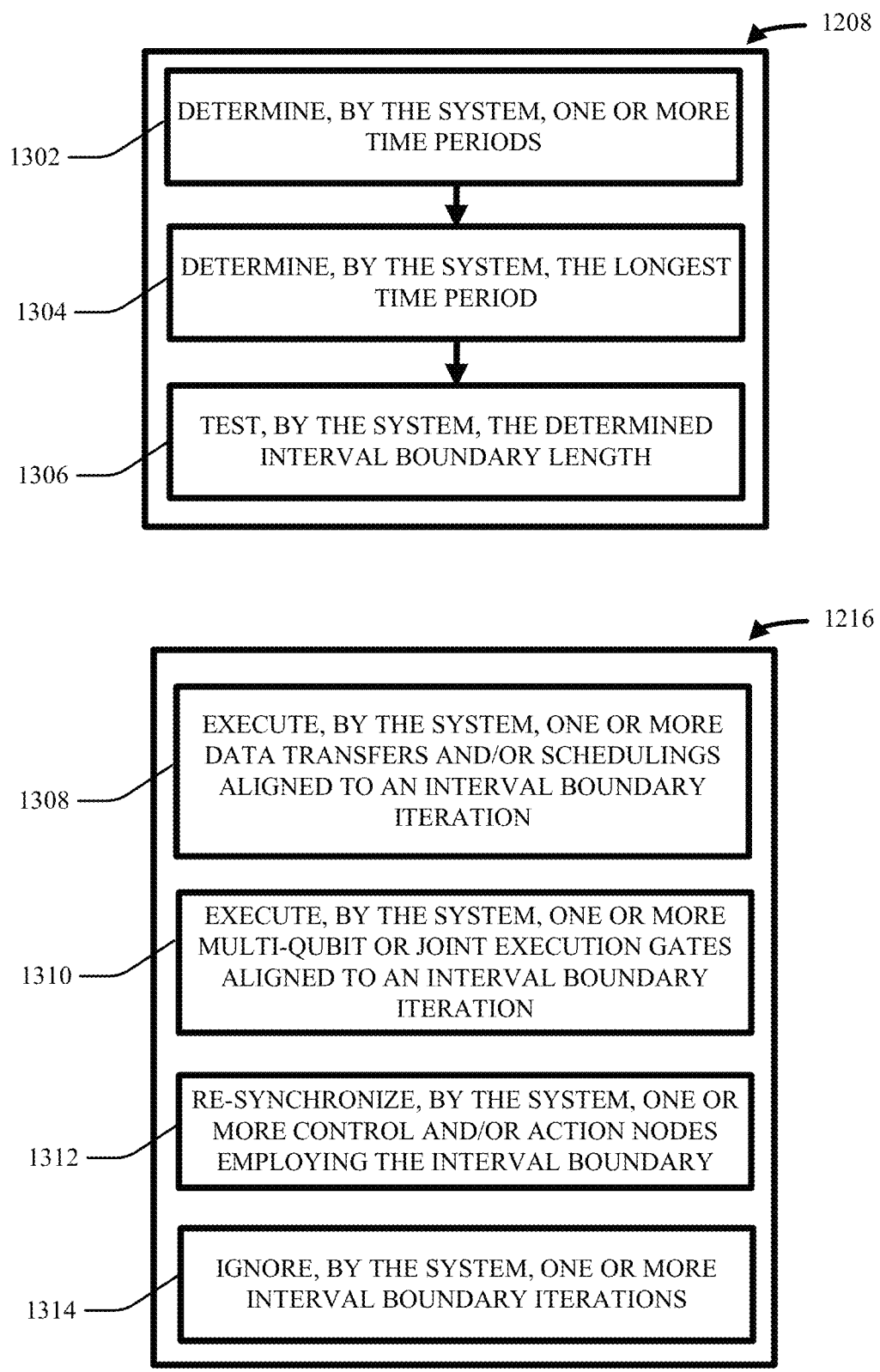
FIG. 13 illustrates a continuation of the flow diagram of FIG. 12, of an example, non-limiting computer-implemented method that can facilitate operation of a quantum program on a set of qubits via employing a universal time interval, in accordance with one or more embodiments described herein.

Turning now to FIGS. 12 and 13, these figures together illustrate a flow diagram of an example, non-limiting computer-implemented method 1200 that can facilitate operation of a quantum circuit on a set of qubits via implementation of an interval boundary, in accordance with one or more embodiments described herein. Repetitive description of like elements and/or processes employed in respective embodiments is omitted for sake of brevity.

Looking first to 1202 at FIG. 12, the computer-implemented method 1200 can comprise obtaining, by a system (e.g., via non-limiting system 900, 900E, quantum program implementation system 902 and/or quantum job request component 908) operatively coupled to a processor (e.g., processor 906, a quantum processor and/or like processor), a quantum job request (e.g., quantum job request 909).

At 1204, the computer-implemented method 1200 can comprise determining, by the system (e.g., via non-limiting system 900, 900E, quantum program implementation system 902 and/or determination component 910), a quantum program and/or a quantum circuit for at least partially implementing the quantum job request (e.g., quantum job request 909).

At 1206, the computer-implemented method 1200 can comprise determining, by the system (e.g., via non-limiting system 900, 900E, quantum program implementation system 902 and/or interval boundary implementation component 914), an interval boundary (e.g., interval boundary 942).

Particular processes comprised by this determination are denoted as occurring at continuation triangle 1208 and are more particularly illustrated at FIG. 13. In one or more embodiments, all processes embodied by continuation triangle 1208 (e.g., as illustrated at FIG. 13) can be performed. In one or more other embodiments, one or more of the processes embodied by continuation triangle 1208 can be bypassed and/or omitted.

At 1210, the computer-implemented method 1200 can comprise providing, by the system (e.g., via non-limiting system 900, 900E, quantum program implementation system 902 and/or interval boundary implementation component 914), the interval boundary (e.g., interval boundary 942), such as for execution (e.g., such as to the non-limiting system 900, 900E, quantum program implementation system 902 and/or execution component 916) of the quantum program.

At 1212, the computer-implemented method 1200 can comprise commonly setting and triggering, by the system (e.g., via non-limiting system 900, 9000E, quantum program implementation system 902, interval boundary implementation component 914 and/or execution component 916), the interval boundary (e.g., interval boundary 942).

At 1214, the computer-implemented method 1200 can comprise executing, by the system (e.g., via non-limiting system 900, 900E, quantum program implementation system 902, execution component 916, quantum system 901, quantum operation component 903 and/or quantum processor 905), a quantum job request (e.g., quantum job request 909) employing the interval boundary (e.g., interval boundary 942).

Particular processes comprised by this execution are denoted as occurring at continuation triangle 1216 and are more particularly illustrated at FIG. 13. In one or more embodiments, all processes embodied by continuation triangle 1216 (e.g., as illustrated at FIG. 13) can be performed. In one or more other embodiments, one or more of the processes embodied by continuation triangle 1216 can be bypassed and/or omitted.

At 1218, the computer-implemented method 1200 can comprise outputting, by the system (e.g., via non-limiting system 900, 900E, quantum program implementation system 902 and/or output component 918), one or more quantum job results (e.g., quantum job results 919), such as to an entity, such as to a user entity.

Turning to FIG. 13, this figure illustrates an extension of the computer-implemented method 1200 of FIG. 12, and particularly illustrates aspects that can occur at continuation triangle 1208 of FIG. 12. This can include particular processes of the determination of an interval boundary (e.g., interval boundary 942), such as including compilation of one or more communication instructions.

At 1302, the computer-implemented method 1200 can comprise determining, by the system (e.g., via non-limiting system 900, 9000E, quantum program implementation system 902 and/or interval boundary implementation component 914), one or more time periods (e.g., that can lapse during transfer of data and/or operation of one or more quantum tasks to be performed during the quantum program execution).

At 1304, the computer-implemented method 1200 can comprise determining, by the system (e.g., via non-limiting system 900, 9000E, quantum program implementation system 902 and/or interval boundary implementation component 914), the longest time period of the one or more time periods. The determination can include implementation, by the system (e.g., via non-limiting system 900, 9000E, quantum program implementation system 902 and/or interval boundary implementation component 914) of the longest time period as the time length of each of the successively repeating interval boundary iterations of the interval boundary (e.g., interval boundary 942) to be implemented.

At 1306, the computer-implemented method 1200 can comprise testing, by the system (e.g., via non-limiting system 900, 9000E, quantum program implementation system 902, interval boundary implementation component 914 and/or quantum system 901), the determined interval boundary length. For example, one or more errors can be detected regarding one or more data transfers and/or quantum tasks to be completed during execution of the quantum program. The one or more errors can relate to variable time for completion of, and/or completion near an interval boundary iteration of, the one or more data transfers and/or quantum tasks to be completed during execution of the quantum program.

Still referring to FIG. 13, this figure illustrates another extension of the computer-implemented method 1200 of FIG. 12, and particularly illustrates aspects that can occur at continuation triangle 1216 of FIG. 12. This can include particular processes of the execution of the quantum job request (e.g., quantum job request 909). It will be appreciated that the processes embodied by the blocks 1308, 1310, 1312 and 1314 can occur in succession. Additionally and/or alternatively, one or more of the processes embodied by the blocks 1308, 1310, 1312 and 1314 can occur at least partially in parallel with others of the processes embodied by the blocks 1308, 1310, 1312 and 1314.

At 1308, the computer-implemented method 1200 can comprise executing, by the system (e.g., via non-limiting system 900, 9000E, quantum program implementation system 902, scheduler/compiler and/or execution component 916), one or more data transfers (e.g., communication instructions, quantum measurements, quantum gate parameters and/or the like) and/or schedulings (e.g., of one or more quantum tasks) aligned to an interval boundary iteration. For example, the one or more data transfers and/or schedulings can be received, sent and/or operated at an interval boundary iteration.

At 1310, the computer-implemented method 1200 can comprise executing, by the system (e.g., via non-limiting system 900, 9000E, quantum program implementation system 902, scheduler/compiler and/or execution component 916), one or more multi-qubit or joint execution gates (e.g., of one or more quantum tasks) aligned to an interval boundary iteration.

At 1312, the computer-implemented method 1200 can comprise re-synchronizing, by the system (e.g., via non-limiting system 900, 9000E, quantum program implementation system 902, scheduler/compiler and/or execution component 916), one or more control and/or action nodes employing the interval boundary (e.g., interval boundary 942).

At 1314, the computer-implemented method 1200 can comprise ignoring, by the system (e.g., via non-limiting system 900, 9000E, quantum program implementation system 902, scheduler/compiler and/or execution component 916), one or more interval boundary iterations of the implemented interval boundary (e.g., interval boundary 942). For example, one or more action nodes having a sequence of single-qubit quantum gates to be operated can ignore one or more interval boundary iterations, such as described with respect to FIG. 11.

In one or more embodiments, execution at block 1216 can additionally and/or alternatively include outputting, by the system (e.g., via quantum system 901, quantum operation component 903 and/or quantum processor 905) one or more quantum measurements (e.g., quantum measurements 917).

Turning now to the FIGS. 9-13 in combination, one or more embodiments as described herein can integrate the disclosed teachings into a practical application. Indeed, as described herein, one or more embodiments, which can take the form of systems, computer-implemented methods, and/or computer program products can be considered as a computerized tool that can facilitate enhanced operation of a quantum circuit on one or more qubits. In general, the one or more embodiments described herein can reduce the processing power employed, and/or the error incurred, by execution of a quantum program employing the quantum circuit. This is a useful and practical application of computers, especially in view of the effect of error on decoherence of employed qubits, and thus can facilitate enhanced (e.g., improved and/or optimized) operation of the employed qubits. These enhancements can include increased accuracy of quantum results and/or increased availability of the employed qubits. Overall, such computerized tools can constitute a concrete and tangible technical improvement in the field of quantum computing.

Furthermore, one or more embodiments described herein can control real-world devices based on the disclosed teachings. For example, one or more embodiments described herein can receive as input a quantum job request and can generate as a first output an interval boundary for guiding implementation of a quantum program as one or more physical operations, such as real-world physical pulses, on one or more qubits of a quantum system. The one or more embodiments described herein can generate as a second output one or more quantum results in response to the performance of the one or more physical operations on the real-world qubits of the quantum system.

In one or more embodiments, the non-limiting system 900/900E, employing the quantum program implementation system 902 and interval boundary implementation component 914, can enhance (e.g., improve and/or optimize) execution of a quantum program by implementing (e.g., commonly setting and triggering at a plurality of control and/or action nodes) an interval boundary 942.

As one result, synchronized data transfer and/or quantum task operation during execution of the quantum program can be facilitated. That is, the interval boundary implementation component 914 can minimize and/or avoid a complex and/or time consuming quantum program implementation problem of synchronization of such data transfers and/or of quantum task operations among a plurality of control nodes and/or action nodes of the respective hybrid classical/quantum system executing the quantum program. Notably, the interval boundary implementation component 914 can enable the hybrid classical/quantum system to implement regular synchronization points across multiple nodes (e.g., control and/or action) spanning large physical distances and/or connected in any configuration.

It is noted that transfer of extra synchronization information between nodes can be avoided. That is, in current systems, communicating extra synchronization information (e.g., an "act at this future time" timestamp can consume time, which can extend a run time duration of a quantum program or of an experiment. Extending execution duration means additional qubit decoherence occurs, which can negatively affect the accuracy of results. Instead, the non-limiting system 900/900E, employing the quantum program implementation system 902 and interval boundary implementation component 914, can avoid these issues.

As another result, because the continued synchronization of the plurality of nodes is enabled throughout the entirety of execution of the respective quantum program by the implementation of the interval boundary 942, loss of synchronization can be allowed. That is, additional processing power, software and/or hardware can be otherwise directed than to maintaining flawless synchronization by each control and/or action node. Instead, variable computation time for classical computation and/or data transfers can be accounted for via the common and successively repeating interval boundaries employed as a part of the interval boundary implementation. Different action nodes can receive data, such as one or more quantum parameters, for operating a multi-qubit gate at different time, and yet each action node facilitating the operation of the multi-qubit gate can be re-synchronized at a next interval boundary iteration for common operation of the multi-qubit gate. Likewise, different control nodes can receive one or more quantum measurements from a plurality of action nodes (e.g., from a plurality of qubits) at varying time and still be able to coordinate (e.g., synchronize) class computations and/or data transfers at a next interval boundary iteration.

As yet another result, communication paths facilitating data transfer can be imprecise with respect to latency. This can be an advantage in a multi-qubit system having packaging and/or cabling constraints and/or variations.

The interval boundary implementation component 914 also can enable the hybrid classical/quantum to employ no, or almost no, overhead for minimizing latency during execution of the quantum program. That is, data transfer, computation times, quantum gate operation times and/or associated compounded latencies can be non-calculated and/or non-estimated during execution of the quantum program. That is, separate timings can be non-implemented during execution of the quantum program to facilitate joint and/or multi-qubit operations. Instead, the interval boundary 942 can be universally set and triggered at least prior to initialization of one or more quantum tasks of the respective quantum program, thus implementing a plurality of successive and repeating interval boundary iterations being the same at each node facilitating the one or more quantum tasks.

Furthermore, the described subject matter, by employing the disclosed interval boundary 942, can create a reduction in employed processing power by associated classical nodes (e.g., classical control nodes). This is at least in part because calculation and implementation of such separate timing can be avoided during execution of the quantum program. As such, the non-limiting system 900/900E (e.g., including the quantum program implementation system 902 and/or interval boundary implementation component 914) can thereby facilitate improved performance, improved efficiency and/or reduced computational cost associated with one or more classical processing units (CPUs) of the non-limiting system 900/900E.

Additionally, where there is high demand for execution of an increased quantity of quantum programs employing the quantum system 901, it can follow that use of the non-limiting system 900/900E (e.g., including the quantum program implementation system 902 and/or interval boundary implementation component 914) can facilitate scaled execution of quantum programs. That is, by reducing and/or eliminating variable latencies and thus reducing error incurred during performance of one or more quantum tasks to operate a quantum circuit on one or more qubits, slower occurrence of decoherence of the one or more qubits can allow for additional quantum programs to be executed on the qubits. This in turn can lead to a related reduction in provision of new qubits by a quantum system comprising the one or more qubits, and consequently, increased availability of processing capabilities of a quantum processor of a quantum system due, at least in part, to the decreased provision of new qubits.

Figure 14:
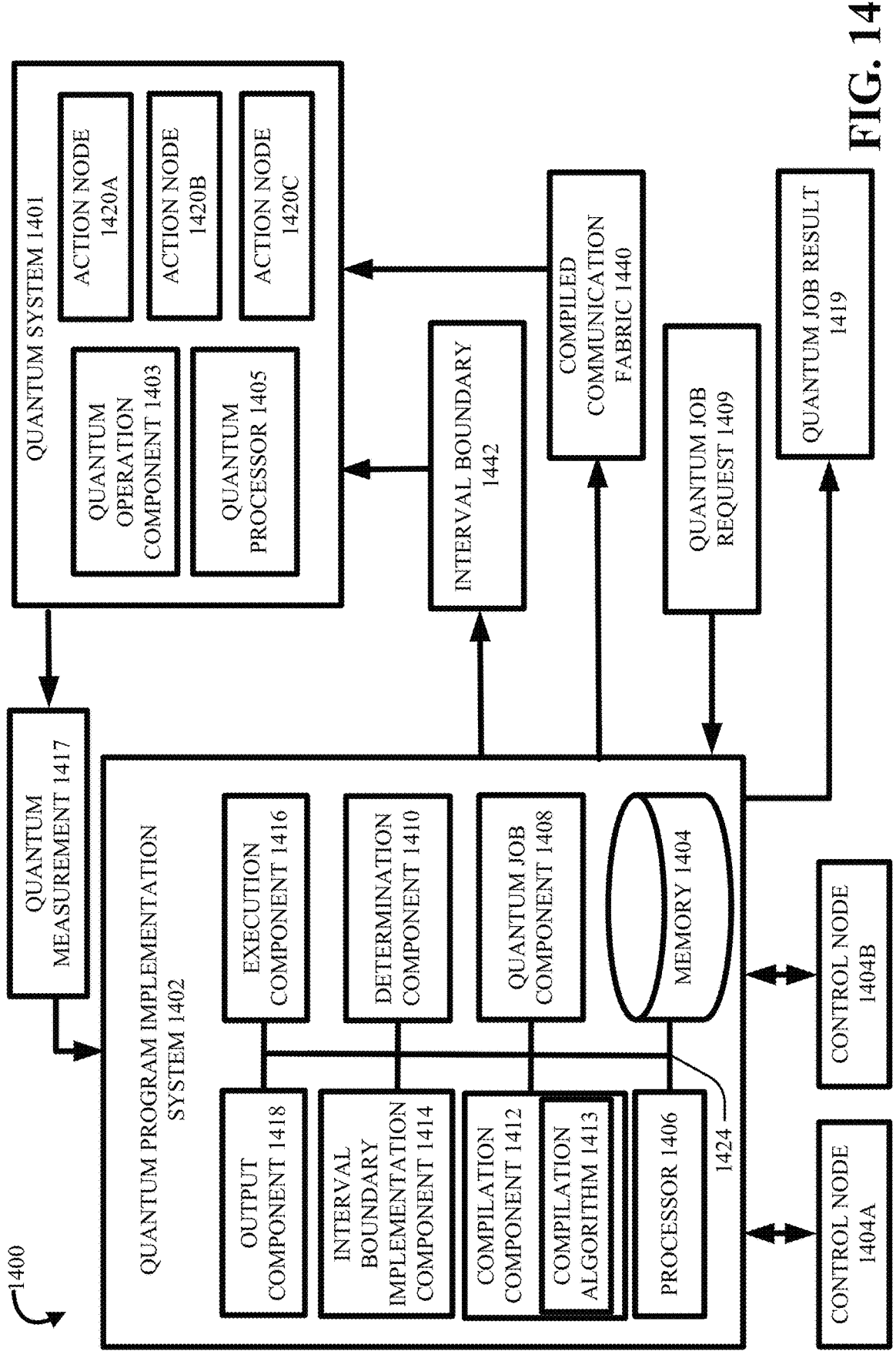
FIG. 14 illustrates a block diagram of an example, non-limiting system that can facilitate operation of a quantum program on a set of qubits via compiling and employing compiled communication instructions, and via employing a universal time interval, in accordance with one or more embodiments described herein.

Turning now to FIG. 14, another embodiment of a non-limiting system is illustrated at 1400. Like numbers are utilized where suitable to refer to like elements of the non-limiting system 100 of FIG. 1 and/or the non-limiting system 900 of FIG. 9. Repetitive description of like elements and/or processes employed in the embodiments of the non-limiting system 100 of FIG. 1 and/or the non-limiting system 900 of FIG. 9 is omitted for sake of brevity.

Referring to FIG. 14 (and also to FIGS. 15-18), one or more embodiments described herein can include one or more systems, computer-implemented methods, apparatuses and/or computer program products that can facilitate compiling communication instructions to enhance execution of a quantum job and that can facilitate implementing a universal time interval to enhance execution of the quantum job on one or more qubits. For example, FIG. 14 illustrates a block diagram of an example, non-limiting system 1400 that can facilitate compiling communication instructions to enhance execution of a quantum job and that can facilitate implementing a universal time interval to enhance execution of the quantum job on one or more qubits.

It will be appreciated that the following description(s) refer(s) to the operation of a single quantum program from a single quantum job request. However, it also will be appreciated that one or more of the processes described herein can be scalable. For example, as will be appreciated below, the quantum program implementation system 1402 can implement one or more communication fabrics 1440, can implement one or more interval boundaries 1442 and/or can execute one or more quantum programs, to each be described below in detail. These various levels of scaling can enable faster, more efficient, and/or less-error-prone executions of quantum programs, at least in part due to the correlated reduced decoherence and/or decoherence time of one or more qubits being employed to execute the quantum programs. As used above, an interval boundary refers to a successively repeating universal interval of time implemented at two or more nodes (e.g., control nodes and/or action nodes).

As used herein, a node (e.g., control or action node) can include one or more machines. The one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

In one or more embodiments, the non-limiting system 1400 can be a hybrid system and thus can include one or more classical systems, such as a quantum program implementation system 1402, and one or more quantum systems, such as a quantum system 1401. In one or more other embodiments, the quantum system 1401 can be separate from, but function in combination with, the non-limiting system 1400. In one or more embodiments, the quantum system 1401 can comprise one or more quantum components, such as a quantum operation component 1403 and a quantum processor 1405. Description provided above with respect to the quantum system 101 can apply to the quantum system 1401. Likewise, description provided above with respect to the quantum operation component 103 and the quantum processor 105 also can apply, respectively, to the quantum operation component 1403 and the quantum processor 1405.

Turning to the classical portion of the non-limiting system 1400, description provided above with respect to general aspects of the quantum program implementation system 102 and/or the quantum program implementation system 902 can apply to the quantum program implementation system 1402. In one or more embodiments, the quantum program implementation system 1402 can comprise a processor 1406 and/or a computer-readable memory 1404 that is operably connected to the processor 1406. Description provided above with respect to the processor 106 and computer-readable memory 104 also can apply, respectively, to the processor 1406 and computer-readable memory 1404. Quantum program implementation system 1402 and/or a component thereof as described herein, can be communicatively, electrically, operatively, optically and/or otherwise coupled to one another via a bus 1424 to perform functions of non-limiting system 1400, quantum program implementation system 1402 and/or any components thereof and/or coupled therewith.

Generally, the quantum program implementation system 1402 can facilitate compiling communication instructions to enhance execution of a quantum program on multiple qubits and also synchronization during execution of the quantum program on the multiple qubits via implementation of a universal interval boundary. Generally, the quantum program implementation system 1402 also can facilitate executing a quantum job request. That is, an execution component can direct data transfers and operations of quantum tasks via a compiled communication fabric and relative to a quantum circuit on two or more qubits according to the universal interval boundary. An output component can output one or more quantum job results in response to the quantum job request.

Turning now to the quantum program implementation system 1402 in greater detail, in one or more embodiments, quantum program implementation system 1402 can comprise a quantum job component 1408, determination component 1410, compilation component 1412, interval boundary implementation component 1414, execution component 1416 and/or output component 1418.

The quantum job component 1408 can obtain, such as receive, download, stream and/or otherwise obtain, a quantum job request 1409 from a requesting entity. Employing the quantum program implementation system 1402 and the quantum system 1401, the non-limiting system 1400 can execute one or more quantum programs requested to be implemented in the quantum job request 1409. In one or more cases the quantum rob request 1409 can include one or more instructions pertaining to one or more particular quantum circuits to employ.

Relative to the one or more quantum programs requested, the determination component 1410 can determine one or more quantum circuits for implementing the one or more quantum programs. The determination can include searching one or more databases internal and/or external to the quantum program implementation system 1402 and/or to the non-limiting system 1400. In one or more cases, the determination component 1410 can include a database portion for storing one or more compiled quantum circuits.

Referring now to the compilation component 1412, description herein turns first to one or more general descriptions of one or more functions that can be performed by the compilation component 1412, prior to describing in detail the one or more functions.

Generally, the compilation component 1412 can compile communication instructions for scheduled transfer of yet-undetermined data among one or more control nodes and/or one or more action nodes, to be described below in detail. The compiling can include identifying of one or more communication paths and/or of one or more data parameters, to be discussed below in detail. The compiling additionally and/or alternatively can include scheduling one or more data transfers along the one or more identified communication paths. The scheduling can be based at least in part on the one or more data parameters identified.

The data can be yet-undetermined in that one or more quantum program aspects, such as particular instructions, measurement results, variational quantum parameters and/or the like, have not yet been determined, such as calculated, when the one or more communication paths are identified, generated and/or scheduled. Indeed these quantum program aspects can be determined during execution of a quantum program. In one example, instructions cannot be pre-established for operating one or more physical actions, such as a physical pulse, on one or more qubits until previous quantum measurements can be analyzed and subsequent instructions and/or quantum parameters (e.g., variational quantum parameters) can be determined for continuing the quantum program. That is, while actual data bits cannot be determined by the compilation component 1412, information including data transfer path (communication path), number of data units, total quantity of data per transfer and/or schedule of transfers can be determined by the compilation component 1412, to be described below.

In one or more embodiments, the non-limiting system 1400 can include one or more classical resources, such as the control nodes 1404A and 1404B depicted at FIG. 14, in addition to the quantum program implementation system 1402. The quantum program implementation system 1402 is depicted separate from the control nodes 1404A and 1404B. In one or more alternative embodiments, the quantum program implementation system 1402 can be included in one or more control nodes embodied by and/or embodying such classical resources. Control nodes can be classical resources that can provide scheduling, instructions, data analysis, measurement analysis, quantum parameter optimization and/or the like. These control nodes can be locally and/or non-centrally distributed relative to one another, and/or any two or more control nodes can be communicatively connected with one another. It will be appreciated that one or more control nodes can be quantum resources and/or can include one or more quantum components in one or more other embodiments.

Additionally, in one or more embodiments, the non-limiting system 1400 can include one or more quantum resources, such as action nodes 1420A, 1420B and 1420C. As depicted, the quantum system 1401 can include the action nodes 1420A, 1420B and 1420C. In one or more other embodiments, the action nodes 1420A, 1420B and 1420C can be separate from, but communicatively connected to, the quantum system 1401. An action node can be a quantum resource that can perform one or more quantum tasks such as pulse generation, waveform generation, quantum measurement and/or other function related and/or involving one or more qubits. Action nodes can be locally and/or non-centrally distributed relative to one another, and/or any two or more action nodes can be communicatively connected with one another. It will be appreciated that one or more action nodes can be quantum resources and/or can include one or more quantum components in one or more other embodiments. Additionally and/or alternatively, it will be appreciated that one or more action nodes can provide one or more of the above-listed control node functions and/or one or more control nodes can provide one or more of the above-listed action node functions.

In current systems, delay of transfer of the example information between the control nodes and action nodes and/or transfer of the resultant measured qubit values between the action nodes and the control nodes can be typical. This is particularly the case when many data aspects, such as the example information and qubit vales, are being passed back and forth to implement control of a plurality of qubits. Bottlenecks, choke points and/or data collection points (e.g., via software and/or hardware) between nodes (e.g., control and/or action nodes) can limit speed of data transfer. That is, traditional multi-CPU communication and management techniques can fail to transfer, analyze and/or determine data on a scale that can account for typical qubit decoherence. This problem is exacerbated when scaling to quantum programs acting on large numbers of qubits.

In view of the one or more delays, transfer of data regarding one or more quantum tasks operating on multiple qubits can be delayed to at least one action node, such as where coordination between multiple action nodes is utilized to implement a multi-qubit gate. These one or more delays can in turn cause further delays at action nodes that are ready to implement the multi-qubit gates but instead are delayed until all such action nodes also are ready (e.g., affecting one or more downstream execution times). This can further compound decoherence and/or other errors (e.g., quantum noise) present in the quantum system 1401 during execution of a quantum program. Furthermore, it is to be appreciated that a plurality of quantum tasks can be performed in sequence to execute the quantum program, thus even further compounding the aforementioned delay, decoherence and/or error introduced into the respective quantum, classical and/or hybrid system.

To account for one or more of these problems, one or more embodiments herein (e.g., via the quantum program implementation system 1402 and/or the compilation component 1412) can compile a communication infrastructure of communication paths, collectively referred to herein as a compiled communication fabric 1440, for scheduling of data transfer between the various control nodes and action nodes of a system, such as the non-limiting system 1400. That is, the compilation component 1412 can compile, including identifying and scheduling, data transfers relative to one or more communication paths for transfer of data throughout the non-limiting system 1400. Via the compiled communication fabric 1440, the compilation component 1412 can facilitate communication of the control nodes with one another and/or of the control nodes with one or more of the action nodes, via the one or more communication paths. This compilation (e.g., identification and/or scheduling) is described below in detail.

A communication fabric 1440 can, in one or more instances, be specifically compiled for execution of one or more particular quantum programs. Relative to one or more other quantum programs, the same communication fabric 1440 and/or a different communication fabric can be compiled.

First, generally, the compilation component 1412 can identify the one or more communication paths prior to execution of a quantum program, such as after the non-limiting system 1400 receives a respective quantum job request (e.g., the quantum job request 1409). Additionally and/or alternatively, one or more communication paths, and/or segments thereof, can be identified by the compilation component 1412 after initialization of execution of a respective quantum program, but before execution of a particular quantum task (of the quantum program) employing the one or more communication paths.

The compilation component 1412 can identify one or more communication paths, such as by searching for one or more such paths identified through and/or utilized by one or more other programs, databases, applications and/or the like communicatively coupled to the compilation component 1412. In one or more embodiments, the compilation component 1412 can trigger one or more signals, such as pings, among the various control nodes and/or action nodes of the non-limiting system 1400. Based on one or more signals, pings, metadata and/or other results received, the compilation component 1412 can identify communication paths. Likewise, the compilation component 1412 can identify communication paths that minimize and/or avoid data collection points, such as data collection routers, between the various control nodes and/or action nodes.

Regarding the one or more communication paths of the communication fabric 1440, description provided above with respect to the various functions and/or abilities of the communication fabric 140 also can apply to the communication fabric 1440. Accordingly, for sake of brevity, one or more functions and/or abilities of the communication fabric 1440 can be discussed below in an abbreviated manner.

It also will be appreciated that in one or more embodiments the compilation component 1412 can identify and/or can generate one or more path aspects of one or more communication paths. These path aspects can include one or more end points, fabric port interfaces and/or routing blocks. Generally, the compilation component 1412 can identify the one or more path aspects prior to execution of a quantum program, such as after the non-limiting system 1400 receives a respective quantum job request (e.g., the quantum job request 1409). Additionally and/or alternatively, one or more path aspects and/or portions thereof can be identified by the compilation component 1412 after initialization of execution of a respective quantum program, but before execution of a particular quantum task (of the quantum program) employing the one or more path aspects and/or portions thereof.

The compilation component 1412 can identify as at least a part of a path aspect one or more physical aspects, such as any suitable hardware, such as including a server, router, cabling and/or physical communication nexus. Additionally or alternatively, the compilation component 1412 can identify as at least a part of a path aspect one or more software aspects and/or can generate one or more software aspects. In one or more embodiments, a software aspect can include or be a part of a cloud network. Accordingly, it will be appreciated that the communication fabric 1440 as compiled by the compilation component 1412, and as provided for the non-limiting system 1400, can be realized by software, hardware and/or a combination of hardware and software.

To facilitate an identification and/or generation of one or more software aspects of the communication fabric 1440 by the compilation component 1412, one or more software applications, programs and/or code can be installed and/or otherwise input relative to one or more control nodes, action nodes, quantum program implementation systems 1402 and/or other classical and/or quantum systems communicatively coupled to the non-limiting system 1400. That is, an entity can facilitate compilation of the communication fabric 1440 by providing one or more software applications, programs and/or code to be employed by the compilation component 1412. Additionally and/or alternatively, the compilation component 1412 can facilitate provision of one or more software applications, programs and/or code to be employed by the compilation component 1412.

Additionally and/or alternatively, to facilitate an identification and/or generation of one or more hardware aspects of the communication fabric 1440 by the compilation component 1412, one or more physical hardware components, such as routers, servers, cables, routing boxes and/or the like can be provided and/or installed disposed between one or more control nodes, action nodes, quantum program implementation systems 1402 and/or other classical and/or quantum systems communicatively coupled to the non-limiting system 1400. That is, an entity can facilitate compilation of the communication fabric 1440 by providing ad/or installing the one or more hardware components to be employed by the compilation component 1412. Additionally and/or alternatively, the compilation component 1412 can facilitate provision and/or installation of one or more hardware components to be employed by the compilation component 1412.

A connection topology of the aforementioned software and/or hardware path aspects can take various different forms. As discussed above, a connection topology can be realized as hardware and/or software. For example, a connection topology can depend on the quantum program to be executed and/or the hardware and/or software aspects accessible to the control nodes and/or action nodes (e.g., connecting the one or more control nodes and the one or more action nodes). One or more connection topologies can be intertwined in a single communication fabric and/or different communication fabrics can include different connection topologies.

Regarding additional detail of the one or more path aspects of the communication fabric 1440, description provided above with respect to the various functions and/or abilities of the communication fabric 140 also can apply to the communication fabric 1440. Accordingly, for sake of brevity, one or more functions and/or abilities of the communication fabric 1440 can be discussed below in an abbreviated manner.

To provide a communication fabric 1440 that is even more efficient, the compilation component 1412 also can compile one or more data parameters for the yet-undetermined data to be transferred along the identified communication paths. The compiled one or more data parameters can include a particular quantity of data units (e.g., per data transfer), a maximum size of data (e.g., sum of the bits or other unit comprised by the quantity of data units) to be moved between node pairs (e.g., control nodes and/or action nodes) and/or a combination thereof. The maximum size of data can be determined as the maximum that is transferred at each communication path at any one instant and/or at any one clock cycle and/or per any one quantum task during the full execution of the quantum program. The compilation component 1412 can compile the one or more data parameters for different quantum tasks and/or clock cycles of a quantum program.

Indeed, in view of the one or more data parameters, the number of data units does not change during execution of a quantum program, but rather only the values (e.g., comprised by the bits) held in the data units vary, depending on what data is to be transferred. For example, data values can be determined during a run of the quantum program, such as by qubit measurements and/or decision information from the control nodes, such as regarding quantum gate implementations.

The compilation component 1412 also can compile scheduling instructions as to the destination of the yet-undetermined data that will have the data unit quantities and maximum data sizes (e.g., utilizing the one or more data parameters). Put another way, the compilation component 1412 can compile one or more data parameters for data movement including data unit quantity, maximum data size and/or data transfer destinations which can all thus be static during execution of a quantum program while only data contents can change during the execution. That is, what information to pass, where the information is to go, and how to pass the data can be determined prior to execution of a quantum program, but the contents (e.g., values) of the data (e.g., data bits) to be transferred can change dynamically as the quantum program is being executed.

For example, a quantum program can comprise a plurality of quantum tasks performed at a plurality of action nodes. The quantum tasks can have a particular order in which the quantum tasks are to be performed. One or more quantum tasks can take longer than others. One or more quantum tasks can be performed in parallel with others. One or more quantum tasks cannot be performed until one or more other quantum tasks are first performed and/or initiated. This order of the quantum tasks to be performed at each action node can be scheduled by the compilation component 1412 prior to execution of the quantum program, such as after the non-limiting system 1400 receives a respective quantum job request (e.g., the quantum job request 1409). Additionally and/or alternatively, one or more quantum tasks can be scheduled by the compilation component 1412 after initialization of execution of a respective quantum program, but before execution of the one or more particular quantum tasks.

It will be understood that scheduling of one or more quantum tasks can include scheduling, by the compilation component 14412, of one or more data routes (e.g., along the one or more communication paths) for the yet-undetermined data to be employed by the one or more quantum tasks. Scheduling of one or more quantum tasks also can include scheduling one or more data parameters for the yet-undetermined data to be transferred along the one or more data routes. These operations can be completed jointly and or concurrently. It will be appreciated that the one or more data parameters can be utilized by the compilation component 1412 to schedule the one or more data routes and/or vice versa.

Further, to realize the scheduling and thus to determine the associated send data block and associated receive data block for each quantity of data transferred during each quantum task and/or clock cycle of the quantum program, the compilation component 1412 also can compile a data transfer list. The data transfer list can comprise a list of destination blocks with representative data for FPI number (FPN), length of transfer (LEN) in number of data units, source identifier (SID) and source offset (SOFF) into the FPI send data block array of the respective communication fabric, and destination identifier (DID) and destination offset into the FPI receive data block array of the respective communication fabric.

As used herein, the send data block array can include all send data blocks of all FPIs of a respective communication fabric. Likewise, as used herein, the receive data block array can include all receive data blocks of all FPIs of the respective communication fabric. In one or more other embodiments, the send data block array and/or receive data block array can include less than all send data blocks or receive data blocks, respectively, of all FPIs of a respective communication fabric. Further, it will be appreciated that description provided above with respect to the data transfer list at Table I also can apply to the description herein regarding the compilation component 1412.

Moreover, in one or more instances, broadcast capability can be added to the communication fabric 1440. In such instances, where entries of a respective data transfer list include identical FPNs, LENs SIDs and SOFFs, such identical entries can be lumped together as broadcast operations.

Still referring to FIG. 14, the compilation component 1412 also can employ a compiling algorithm 1413 including one or more instructions for compiling the one or more communication instructions discussed above (e.g., to compile the communication fabric). Operations performed, instructed and/or directed via the compiling algorithm 1413 can include compiling the one or more communication paths, compiling the one or more data parameters and/or scheduling the one or more data movements for the one or more quantum tasks. It will be appreciated that the compilation algorithm 4113 and/or instructions for implementing the compilation algorithm 1413 can be stored at the compilation component 1412, memory 1404 and/or an external memory/storage and/or can be accessible to the compilation component 1412 and/or the non-limiting system 1400 via an associated cloud computing environment, WAN, LAN and/or the like. Further, it will be appreciated that description provided above with respect to the compilation algorithms 113 and 113A also can apply to the description herein regarding the compilation algorithm 1413.

For example, the compilation algorithm 1413 can employ the one or more data parameters and the one or more aforementioned signals, metadata and/or other results received (e.g., during identification of the one or more communication paths). In this way, the compilation component 1412 can, via one or more instructions provided via the compilation algorithm 1413, determine transfer times for one or more different quantities of data in one or both directions along one or more communication paths.

Referring now to the interval boundary implementation component 1414, and still to FIG. 14, further function of the quantum program implementation system 1402 will be described.

In current systems executing a quantum program, such as hybrid classical/quantum systems, a plurality of such data transfers and/or quantum tasks typically can be initiated and/or performed during operation of one or more quantum circuits. These data transfers and/or quantum tasks each can take a variable and/or different amount of time to complete. Accordingly, delay of completion of one quantum task and/or transfer of data relative to one or more other quantum task completions and/or data transfers can reduce and/or altogether cause synchronization loss between two or more nodes (e.g., classical and/or action nodes) that are utilizing and/or performing the quantum tasks and/or data transfers. In one or more cases, synchronization loss can be caused by bottlenecks, choke points and/or data collection points (e.g., via software and/or hardware) between nodes (e.g., control and/or action nodes), thereby limiting speed of data transfer.

Indeed, in that CPUs typically can be classical resources, data transfers can happen at varying times, employing complicated scheduling during execution of a quantum program. Further, traditional multi-CPU communication and management techniques can fail to transfer, analyze and/or determine data on a scale that can account for typical qubit decoherence. Additionally, when current systems schedule one or more data transfers and/or quantum tasks during execution of a quantum program, data and/or metadata related to the scheduling is provided along with a transfer of data and/or communication instructions, complicating matters. That is, the timing data and/or meta data can increase data transfer size and/or can slow down an associated data transfer. Moreover, where synchronization is lost between nodes and timing is not aligned, quantum tasks can fail to be implemented properly, such as introducing error and/or failing or causing experiment collapse altogether. These problems can be compounded when scaling to quantum programs acting on large numbers of qubits.

To account for one or more of these problems, one or more embodiments herein (e.g., via the quantum program implementation system 1402 and/or the interval boundary implementation component 1414) can implement an interval boundary 1442 that can enable alignment of data transfers, quantum tasks and/or multi-car operations (e.g., DAC measurement tone, ADC capture window and/or the like) to the implemented interval boundary 1442. That is, the interval boundary 1442 can be employed by the non-limiting system 1400 (e.g., by the execution component 1416) for scheduling transfer of data and/or for implementing such data, such as implementing a multi-qubit gate at more than one action node (e.g., action node 1420A, 1420B and/or 1420C). Put another way, node synchronization can be facilitated by the interval boundary implementation component 1414 during execution of a quantum program on two or more qubits.

Indeed, synchronization points (e.g., at successive and repeating interval boundary iterations) for the control nodes 1404A and 1404B and/or for the action nodes 1420A, 1420B and 1420C can thus be provided, such as absent employing overhead during execution of the associated quantum program. Further, one or more imprecisions can be allowed in CPU execution within an interval (e.g., between a pair of interval boundary iterations) in that the next interval boundary iteration can provide for alignment. With respect to initial scheduling of quantum tasks of a respective program, the interval boundary iterations can provide "natural" locations for a scheduler/compiler to align "barrier" gates. As used herein, "barrier" gates are time instances where the quantum program can entail alignment between individual or sub-sequences of quantum operations so that the individual or sub-sequences can be executed in a time-coordinated manner across two or more different qubit controllers. In addition, in one or more embodiments, an expanded non-limiting system 1400 (not particularly illustrated) can include one or more processors having a hardware sequencer instead of a programmable CPU to control quantum gate operation.

Relative to implementing the interval boundary 1442, discussion herein first refers only generally to the interval boundary implementation component 1414. Initially, the interval boundary implementation component 1414 can facilitate determination of one or more time periods that can lapse during transfer of data and/or operation of one or more quantum tasks. Employing this time period information, the interval boundary implementation component 1414 can implement a successively repeating universal interval boundary 1442 at two or more nodes of the non-limiting system 1400 (e.g., control nodes 1404A and/or 1404B and/or action nodes 1420A, 1420B and/or 1420C). Detailed description will be provided below with respect to one or more functions performed by the interval boundary implementation component 1414, to the interval boundary 1442 that can be implemented, and to the control nodes and/or action nodes with regards to which the interval boundary 1442 can be implemented.

To implement an interval boundary (e.g., interval boundary 1442), the interval boundary implementation component 1414 can first determine a probable, estimated and/or calculated longest time period for being successively repeated at two or more nodes. That is, one or more determination parameters can be defaultly and/or selectively implemented at the interval boundary implementation component 1414 for determining upon what criteria the longest timer period is to be based. Where one or more determination parameters are selectively implemented, such selective implementation can be provided by an entity. In one embodiment, an entity can implement one or more determination parameters via a communication device and/or any suitable communicative connection to the quantum program implementation system 1402.

As indicated, the longest time period can have one or more various criteria. In one or more embodiments, the longest time period can be based upon a longest data transfer time in any direction between any two (or more) nodes (e.g., classical and/or action nodes). In one or more embodiments, the longest time period can be based upon a longest data transfer and return data transfer between any two (or more) nodes (e.g., classical and/or action nodes). In one or more embodiments, the longest time period can be based upon a longest task completion time of a control node-based task (e.g., scheduling, instructions, data analysis, measurement analysis, quantum parameter optimization and/or the like). In one or more embodiments, longest time period can be based upon a longest task completion time of an action node-based task (e.g., pulse generation, waveform generation, quantum measurement and/or other function related and/or involving one or more qubits). In one or more embodiments, the longest time period can be based upon two or more of these criteria, such as being based upon a longest time period over any combination of two or more of these criteria.

When basing the longest time period upon one or more of the aforementioned various criteria, the "basing" performed by the interval boundary implementation component 1414 can include one or more of calculating and/or estimating an actual time period, estimated time period, and/or a time period having one or more accuracy probabilities provided therewith.

Moreover, in one or more embodiments, the interval boundary implementation component 1414 can employ the compilation component 1412 and/or the communication fabric 1440 to determine the longest time period. For example, as determined by the compilation component 1412, the worst case propagation time through the communication fabric 1440 can be implemented as the minimum interval boundary time length.

That is, the longest time period can be utilized as a minimum time length between interval boundary iterations. Where suitable for a quantum program to be executed, the quantum program implementation system 1402 and/or the interval boundary implementation component 1414 can employ a time length between interval boundary iterations that is longer than the longest time period. For example, a longer time interval can better fit a quantum program to be executed based on prior history of executing the quantum program and/or one or more quantum tasks comprised by the quantum program.

Upon determining the longest time period (e.g., worst case propagation time through the communication fabric 1440), the interval boundary implementation component 1414 can commonly set and trigger an interval boundary 1442 having the determined longest time period at two or more nodes (e.g., control nodes and/or action nodes) of the non-limiting system 1400 (and/or of the expanded non-limiting system). In this way, performance of a multi-qubit quantum operation and/or a data transfer at the two or more nodes can be aligned.

The interval boundary implementation component 1414 can employ a same clock source and/or runtime to implement the interval boundary 1442. For example, the interval boundary implementation component 1414 can universally set and trigger a same interval boundary 1442 at each node to be synchronized with one another. In one or more embodiments, the interval boundary implementation component 1414 can set and trigger the interval boundary 1442 at more than one node at the same instant. In one or more other embodiments, in view of utilization of the single clock source and/or runtime, the interval boundary 1442 can be set and/or triggered at one or more nodes at a different instant from one or more other nodes, though still have the same implemented and synchronized interval boundary 1442.

The interval boundary 1442 can implemented at each of the action and control nodes of the non-limiting system 1400 in a plurality of successively repeating and common time points, referred to herein as interval boundary iterations. Each adjacent pair of interval boundary iterations can bound a single time interval absent one or more other latencies, intercessions and/or other time periods. That is, one time interval can start where the next time interval begins (e.g., at a common interval boundary iteration or time point) with each time interval having the same time length.

Referring now first briefly again to FIGS. 6, 10 and 11, it will be appreciated that any of the functions and/or abilities of the communication fabric 140 and/or interval boundary 942 provided above also can apply to the communication fabric 1440 and/or to the interval boundary 1442, respectively. Such functions and/or abilities are not again discussed herein with respect to FIG. 14 for sake of brevity.

Turning again briefly to FIG. 14, one or more additional functions of the quantum program implementation system 1402 and or of the non-limiting system 1400 will be discussed, such as relative to one or more additional components thereof.

Once established, the interval boundary implementation component 1414 can provide the interval boundary 1442, and the compilation component 1412 can provide the communication fabric 1440, to the execution component 1416 for implementing the determined quantum circuit relative to one or more qubits. The interval boundary implementation component 1414 and the compilation component 1412 can be communicatively coupled, directly and/or indirectly, with the execution component 1416 for facilitating the provision of the interval boundary 1442 and of the communication fabric 1440. The execution component 1416 can direct initialization, instruction and/or implementation of the quantum job request 1409 employing the interval boundary 1442 and the communication fabric 1440 at the quantum system 1401 (e.g., at the action nodes thereof).

That is, it will be appreciated that the communication fabric 1440 and the interval boundary 1442 can function in combination with one another. For example, the execution component 1416 can employ the various communication instructions and communication fabric 1440 compiled by the compilation component 1412. The various communication instructions can include one or more communication paths, one or more data transfer schedulings and/or one or more quantum task schedulings. Likewise, the execution component 1416 can employ the successively repeating interval boundary iterations (e.g., successively repeating time points) of the interval boundary 1492 to align the one or more data transfer schedulings and/or one or more quantum task schedulings provided by the compilation component 1412. In one or more cases, one or more of such quantum tasks can be multi-qubit quantum tasks. The execution component 1416 can cause simultaneously initiated quantum operations, such as a multi-qubit quantum task, on two or more qubits at numerous instances (e.g., two or more instances) of the successively repeating time point.

The quantum system 1401 (e.g., the one or more action nodes) can execute the quantum job request 1409 on qubits at the quantum system 1401 based upon one or more compiled communication instructions of the communication fabric 1440, as compiled by the non-limiting system 1400 and/or the compilation component 1412, and based at least in part on the interval boundary 1442. The quantum system 1401 can provide one or more quantum measurements 1417 to the quantum program implementation system 1402 and/or to the classical portion of the non-limiting system 1400 (e.g., to one or more control nodes). After operation of a complete quantum program, the non-limiting system 1400 can receive, download, stream and/or otherwise obtain one or more final quantum measurements 1417 from the quantum system 1401.

The quantum program implementation system 1402 also can comprise an output component 1418. One or more quantum job results 1419 can be output from the non-limiting system 1400 via the output component 1418. The one or more quantum job results 1419 can comprise and/or can be based at least in part on the one or more quantum measurements 1417, and/or can be responsive to the quantum job request 1409 from the requesting entity.

Figure 15:
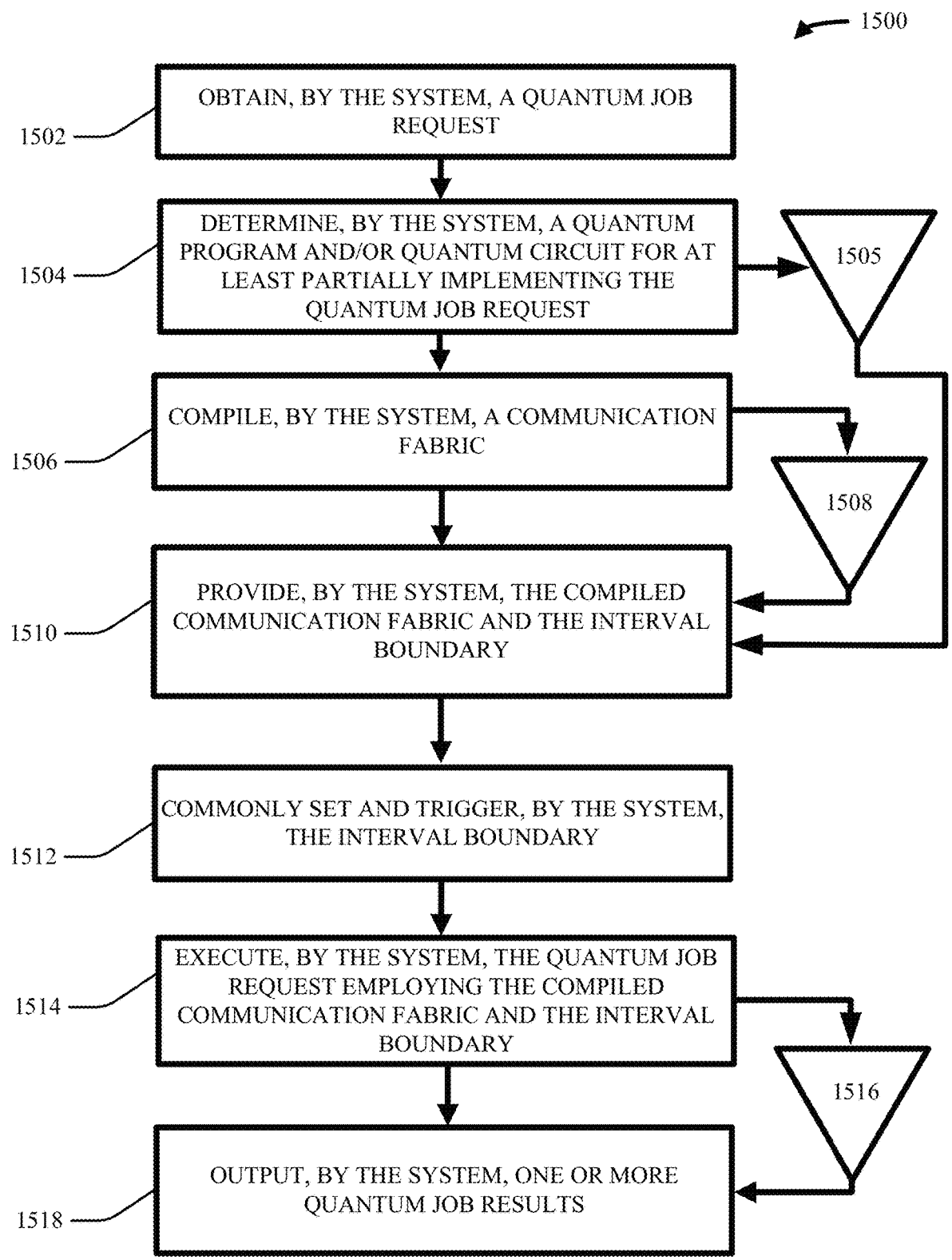
FIG. 15 illustrates a flow diagram of an example, non-limiting computer-implemented method that can facilitate operation of a quantum program on a set of qubits via compiling and employing compiled communication instructions, and via employing a universal time interval, in accordance with one or more embodiments described herein.
Figure 16:
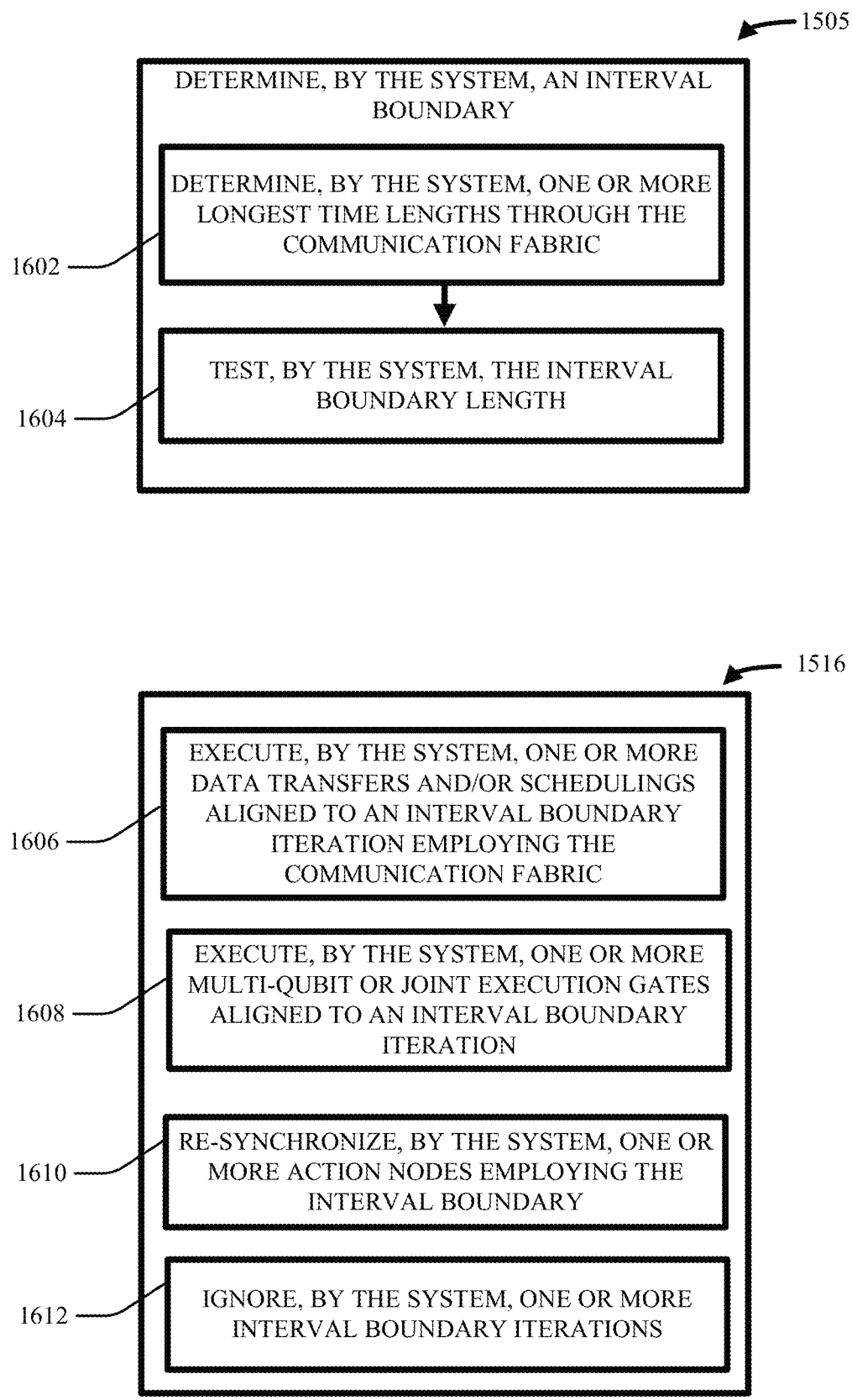
FIG. 16 illustrates continuations of the flow diagram of FIG. 15, of an example, non-limiting computer-implemented method that can facilitate operation of a quantum program on a set of qubits via compiling and employing compiled communication instructions, and via employing a universal time interval, in accordance with one or more embodiments described herein.
Figure 17:
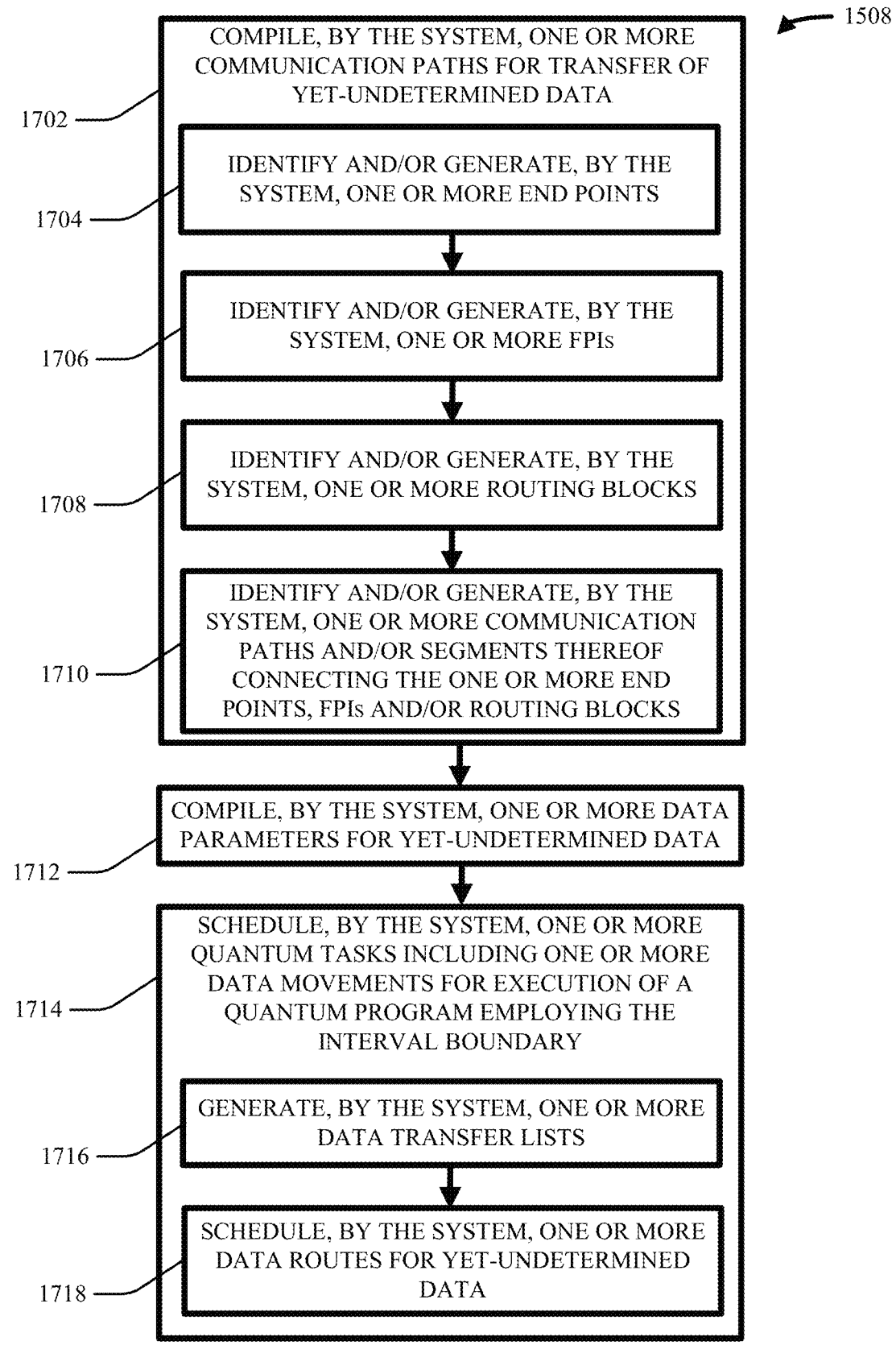
FIG. 17 illustrates another continuation of the flow diagram of FIG. 15, of an example, non-limiting computer-implemented method that can facilitate operation of a quantum program on a set of qubits via compiling and employing compiled communication instructions, and via employing a universal time interval, in accordance with one or more embodiments described herein.

Turning now to FIGS. 15 to 17, these figures together illustrate a flow diagram of an example, non-limiting computer-implemented method 1500 that can facilitate operation of a quantum circuit on a set of qubits via compiling one or more communication instructions, in accordance with one or more embodiments described herein. Repetitive description of like elements and/or processes employed in respective embodiments is omitted for sake of brevity.

Looking first to 1502 at FIG. 15, the computer-implemented method 700 can comprise obtaining, by a system (e.g., via non-limiting system 1400, quantum program implementation system 1402 and/or quantum job request component 1408) operatively coupled to a processor (e.g., processor 1406, a quantum processor and/or like processor), a quantum job request (e.g., quantum job request 1409).

At 1504, the computer-implemented method 1500 can comprise determining, by the system (e.g., via non-limiting system 1400, quantum program implementation system 1402 and/or determination component 1410), a quantum program and/or a quantum circuit for at least partially implementing the quantum job request (e.g., quantum job request 1409).

From block 1504, processes represented by block 1506 and continuation triangle 1505 each can continue at least partially in parallel.

At continuation triangle 1505, particular process related to determination of an interval boundary (e.g., interval boundary 1492) are provided at FIG. 16 for sake of clarity. Continuation triangle 1505 leads to block 1510, bypassing (e.g., continuing at least partially in parallel to) block 1506 and continuation triangle 1508.

That is, turning briefly to FIG. 16, at 1505, the computer-implemented method 1500 can comprise determining, by the system (e.g., via non-limiting system 1400, quantum program implementation system 1402 and/or interval boundary implementation component 1414), an interval boundary (e.g., interval boundary 1442).

It will be appreciated that one or more processes can be included in the determining of the interval boundary (e.g., interval boundary 1492), as illustrated at blocks 1602 and 1604.

At 1602, the computer-implemented method 1500 can comprise determining, by the system (e.g., via non-limiting system 1400, quantum program implementation system 1402 and/or interval boundary implementation component 1414), one or more time periods (e.g., that can lapse during transfer of data and/or operation of one or more quantum tasks to be performed during the quantum program execution). For example, the compilation component (e.g. compilation component 1412) can provide the worst-case propagation time through the communication fabric (e.g., communication fabric 1440), such as at block 1506. The system (e.g., non-limiting system 1400, quantum program implementation system 1402 and/or interval boundary implementation component 1414), can employ the worst case propagation time as the time length of each of the successively repeating interval boundary iterations of the interval boundary (e.g., interval boundary 942) to be implemented.

At 1604, the computer-implemented method 1500 can comprise testing, by the system (e.g., via non-limiting system 1400, quantum program implementation system 1402, interval boundary implementation component 1414 and/or quantum system 1401), the determined interval boundary length. For example, one or more errors can be detected regarding one or more data transfers and/or quantum tasks to be completed during execution of the quantum program. The one or more errors can relate to variable time for completion of, and/or completion near an interval boundary iteration of, the one or more data transfers and/or quantum tasks to be completed during execution of the quantum program.

Turning again to FIG. 15, at 1506, the computer-implemented method 1500 can comprise determining, by the system (e.g., via non-limiting system 1400, quantum program implementation system 1402 and/or compilation component 1412), a communication fabric (e.g., communication fabric 1440), such as including one or more communication instructions. This compilation can include employing a compilation algorithm (e.g., compilation algorithm 1413).

Particular processes comprised by this compilation are denoted as occurring at continuation triangle 1508 and are illustrated at FIG. 17 for sake of clarity. Continuation triangle 1508 leads to block 1510. In one or more embodiments, all processes embodied by triangle 1508 (e.g., as illustrated at FIG. 17) can be performed. In one or more other embodiments, one or more of the processes embodied by continuation triangle 1508 can be bypassed and/or omitted.

That is, turning briefly to FIG. 17, this figure illustrates an extension of the computer-implemented method 1500 of FIG. 15. FIG. 17 particularly illustrates aspects that can occur at continuation triangle 1508 of FIG. 15, such as particular processes of the compilation of a communication fabric (e.g., communication fabric 1440), such as including compilation of one or more communication instructions. One or more communication instructions can include one or more communication paths, one or more data transfer schedulings and/or one or more quantum task schedulings.

At 1702, the computer-implemented method 1500 can comprise compiling, by the system (e.g., via non-limiting system 1400, quantum program implementation system 1402 and/or compilation component 1412) one or more communication paths for transfer of yet-undetermined data. That is, the communication fabric (e.g., communication fabric 1440) can comprise one or more, such as a plurality of, communication paths. The compiling at 1702 can comprise one or more operations, such as provided next at blocks 1704, 1706, 1708 and 1710. The data can be yet-undetermined in that one or more quantum program aspects, such as particular instructions, measurement results, variational quantum parameters and/or the like, have not yet been determined, such as calculated, when the one or more communication paths are identified, generated and/or scheduled.

At 1704, the computer-implemented method 1500 can comprise identifying and/or generating, by the system (e.g., via non-limiting system 1400, quantum program implementation system 1402 and/or compilation component 1412) one or more end points. The end points can be realized via hardware and/or software.

At 1706, the computer-implemented method 1500 can comprise identifying and/or generating, by the system (e.g., via non-limiting system 1400, quantum program implementation system 1402 and/or compilation component 1412) one or more FPIs. The FPIs can be realized via hardware and/or software.

At 1708, the computer-implemented method 1500 can comprise identifying and/or generating, by the system (e.g., via non-limiting system 1400, quantum program implementation system 1402 and/or compilation component 1412) one or more routing blocks. The routing blocks can be realized via hardware and/or software.

At 1710, the computer-implemented method 1500 can comprise identifying and/or generating, by the system (e.g., via non-limiting system 1400, quantum program implementation system 1402 and/or compilation component 1412) one or more communication paths, such as employing and/or connecting the one or more end points, FPIs and/or routing blocks. The communication paths can be realized via hardware and/or software.

Next, at 1712, the computer-implemented method 1500 can comprise compiling, by the system (e.g., via non-limiting system 1400, quantum program implementation system 1402 and/or compilation component 1412) one or more data parameters (e.g., one or more data parameters for data movement including data unit quantity, maximum data size and/or data transfer destinations) for the yet-undetermined data. The data can be yet-undetermined in that one or more quantum program aspects, such as particular instructions, measurement results, variational quantum parameters and/or the like, have not yet been determined, such as calculated, when the one or more communication paths are identified, generated and/or scheduled.

At 1714, the computer-implemented method 1500 can comprise scheduling, by the system (e.g., via non-limiting system 1400, quantum program implementation system 1402 and/or compilation component 1412) one or more quantum tasks (e.g., of an associated quantum program). The quantum tasks can include one or more data movements for execution of the quantum program. The scheduling at 1714 can comprise one or more processes, such as provided next at blocks 1716 and 1718.

At 1716, the computer-implemented method 1500 can comprise generating, by the system (e.g., via non-limiting system 1400, quantum program implementation system 1402 and/or compilation component 1412) one or more data transfer lists.

At 1718, the computer-implemented method 1500 can comprise scheduling, by the system (e.g., via non-limiting system 1400, quantum program implementation system 1402 and/or compilation component 1412) one or more data routes (e.g., along the one or more communication paths and/or one or more segments thereof) for the yet-undetermined data.

In one or more embodiments, execution at block 1714 can additionally and/or alternatively include outputting, by the system (e.g., via quantum system 1401, quantum operation component 1403 and/or quantum processor 1405) one or more quantum measurements (e.g., quantum measurements 1417).

Turning again to FIG. 15, at 1510, the computer-implemented method 1500 can comprise providing, by the system (e.g., via non-limiting system 1400, quantum program implementation system 1402 and/or compilation component 1412), the communication fabric (e.g., communication fabric 1440), such as for execution (e.g., such as to the non-limiting system 1400, quantum program implementation system 1402 and/or execution component 1416) of the quantum program. Also at 1510, the computer-implemented method 1500 can comprise providing, by the system (e.g., via non-limiting system 1400, quantum program implementation system 1402 and/or interval boundary implementation component 1414), the interval boundary (e.g., interval boundary 1442), such as for execution (e.g., such as to the non-limiting system 1400, quantum program implementation system 1402 and/or execution component 1416) of the quantum program.

At 1512, the computer-implemented method 1500 can comprise commonly setting and triggering, by the system (e.g., via non-limiting system 1400, quantum program implementation system 1402, interval boundary implementation component 1414 and/or execution component 1416), the interval boundary (e.g., interval boundary 1492).

At 1514, the computer-implemented method 1500 can comprise executing, by the system (e.g., via non-limiting system 1400, quantum program implementation system 1402, execution component 1416, quantum system 1401, quantum operation component 1403 and/or quantum processor 1405), a quantum job request (e.g., quantum job request 1409) employing a communication fabric (e.g., communication fabric 140) and the interval boundary (e.g., interval boundary 1442).

Particular processes comprised by this execution are denoted as occurring at continuation triangle 1516 and are more particularly illustrated at FIG. 16. Continuation triangle 1516 leads to block 1518. In one or more embodiments, all processes embodied by continuation triangle 1516 (e.g., as illustrated at FIG. 16) can be performed. In one or more other embodiments, one or more of the processes embodied by continuation triangle 1516 can be bypassed and/or omitted.

Turning briefly again to FIG. 16, it will be appreciated that two or more of the processes embodied by the blocks 1606, 1608, 1610 and 1612 can occur in succession. Additionally and/or alternatively, one or more of the processes embodied by the blocks 1606, 1608, 1610 and 1612 can occur at least partially in parallel with others of the processes embodied by the blocks 1606, 1608, 1610 and 1612.

At 1606, the computer-implemented method 1500 can comprise executing, by the system (e.g., via non-limiting system 1400, quantum program implementation system 1402, compilation component 1412 and/or execution component 1416), one or more data transfers (e.g., communication instructions, quantum measurements, quantum gate parameters and/or the like) and/or schedulings (e.g., of one or more quantum tasks) aligned to an interval boundary iteration. For example, the one or more data transfers and/or schedulings can be received, sent and/or operated at an interval boundary iteration.

At 1608, the computer-implemented method 1500 can comprise executing, by the system (e.g., via non-limiting system 1400, quantum program implementation system 1402, compilation component 1412 and/or execution component 1416), one or more multi-qubit or joint execution gates (e.g., of one or more quantum tasks) aligned to an interval boundary iteration (e.g., of the interval boundary 1442).

At 1610, the computer-implemented method 1500 can comprise re-synchronizing, by the system (e.g., via non-limiting system 1400, quantum program implementation system 1402, compilation component 1412 and/or execution component 1416), one or more control and/or action nodes employing the interval boundary (e.g., interval boundary 942).

At 1612, the computer-implemented method 1500 can comprise ignoring, by the system (e.g., via non-limiting system 1400, quantum program implementation system 1402, compilation component 1412 and/or execution component 1416), one or more interval boundary iterations of the implemented interval boundary (e.g., interval boundary 942). For example, one or more action nodes having a sequence of single-qubit quantum gates to be operated can ignore one or more interval boundary iterations.

Turning again to FIG. 15, at 1518, the computer-implemented method 1500 can comprise outputting, by the system (e.g., via non-limiting system 1400, quantum program implementation system 502 and/or output component 1518), one or more quantum job results (e.g., quantum job results 1517), such as to an entity, such as to a user entity.

Figure 18:
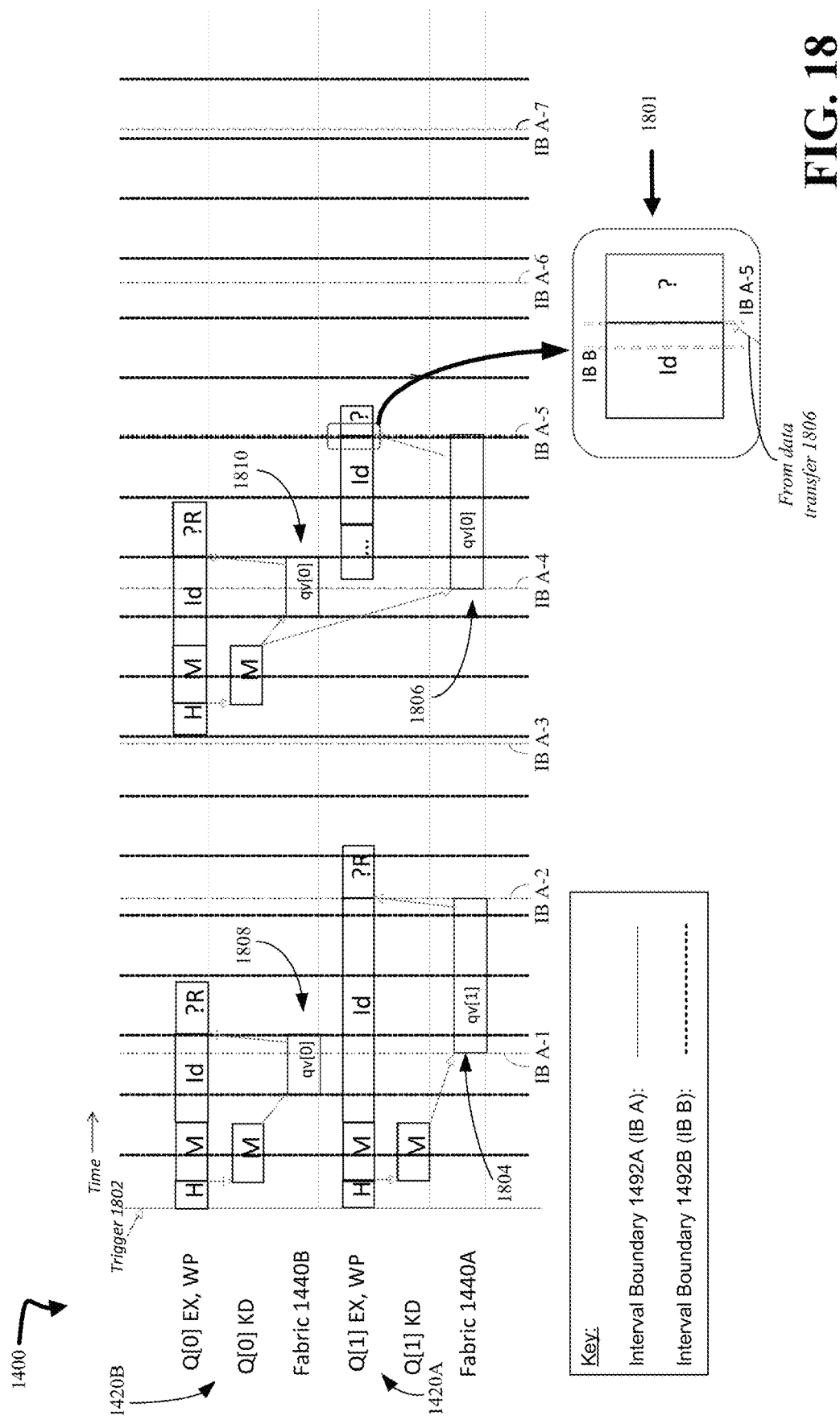
FIG. 18 illustrates a block diagram of an exemplary implementation of a pair of communication fabrics and a pair of universal time intervals, in accordance with one or more embodiments described herein.

Turning now to FIG. 18, an alternative implementation of the combined performance of the compilation component 1412 and of the interval boundary implementation component 1414 will be described with respect to a quantum program schedule 1800. A section 1801 of the quantum program schedule 1800 is enlarged for the sake of clarity.

Generally, it will be appreciated that the quantum program implementation system 1402 can provide and implement more than one communication fabric and/or more than one interval boundary that can function synchronously to execute a quantum program. In one or more embodiments, the interval boundaries 1492A and 1492B can be implemented by different interval boundary implementation components and/or the communication fabrics 1440A and 1440B can be generated and/or implemented by different compilation components.

Additionally, in connection with FIG. 18, it will be appreciated that any of the functions and/or abilities of the communication fabric 140 and/or interval boundary 942 provided above also can apply to the communication fabrics 1440A and/or 1440B and/or interval boundaries 1492A and/or 1492B discussed with respect to FIG. 18.

Turning now to one or more particular aspects illustrated at the quantum program schedule 1800, FIG. 18 includes implementation of a pair of interval boundaries 1492A (also referred to as IB A at FIG. 18) and 1492B (also referred to as IB B at FIG. 18) and of a pair of communication fabrics 1440A and 1440B. Each of these aspects can be used for execution of the quantum program schedule 1800 for a single quantum program.

As illustrated at FIG. 18, the employed interval boundaries 1492A and 1492B each can be universally implemented at a plurality of nodes, such as at the action nodes 1420A and 1420B, in a plurality of successively repeating and common time points, referred to herein as interval boundary iterations. Each adjacent pair of interval boundary iterations can bound a single time interval absent one or more other latencies, intercessions and/or other time periods. That is, one time interval can start where the next time interval begins (e.g., at a common interval boundary iteration or time point) with each time interval of the respective interval boundary having the same time length. Additional or fewer iterations can be employed in one or more other embodiments. As shown at FIG. 18, interval boundary 1492A has a longer time interval than interval boundary 1492B.

The time length of each interval boundary 1492A and 1492B can be determined by the interval boundary implementation component 1414, such as relative to a longest time period of data transfer and/or quantum task operation. This longest time period can be utilized as a minimum time length between interval boundary iterations. Where suitable for a quantum program to be executed, the quantum program implementation system 1402 and/or the interval boundary implementation component 1414 can employ a time length between interval boundary iterations that is longer than the longest time period. For example, a longer time interval can better fit a quantum program to be executed based on prior history of executing the quantum program and/or one or more quantum tasks comprised by the quantum program.

Both interval boundaries 1492A and 1492B can have a common trigger at 1802. Although, separate triggers can be used in other embodiments.

Each interval boundary can support a different communication fabric and can manage a different clock domain, such as DAC and ADC. In the illustrated configuration, the communication fabric 1440A utilizes the interval boundary 1492A (also referred to as IB A at FIG. 18). See, for example the data transfer 1804 at interval boundary iteration IB A-1 and the data transfer 1806 at the interval boundary iteration IB A-4 Also in the illustrated configuration, the communication fabric 1440B utilizes the interval boundary 1492B (also referred to as IB B at FIG. 18). See, for example the data transfers 1808 and 1810.

In the illustration of FIG. 18, action node 1420A controls qubit Q[1] and action node 1420B controls qubit Q[0]. It will be appreciated that either communication fabric 1440A and/or 1440B can be utilized for one or both of the depicted action nodes 1420A and 1420B. For example, data transfer 1808 from action node 1420B utilizes communication fabric 1440B, while data transfer 1806 from the same action node 1420B utilizes communication fabric 1440A.

The quantum program schedule 1800 includes a plurality of quantum tasks, such as quantum gate operations, to be executed by the action nodes 1420A and 1420B, respectively, at qubits Q[1] and Q[0]. One or more of these quantum gate operations can be a multi-gate operation, although not particularly shown at FIG. 18.

The use of multiple communication fabrics can provide the advantage of further streamlining data transfers during the quantum program execution. For example, one communication fabric can have a greater average latency than another communication fabric. In one embodiment, one communication fabric can have a greater number of local hardware and/or software aspects. The other communication fabric can have a greater number of globally-disposed hardware and/or software aspects.

Turning now to the FIGS. 14-18 in combination, one or more embodiments as described herein can integrate the disclosed teachings into a practical application. Indeed, as described herein, one or more embodiments, which can take the form of systems, computer-implemented methods, and/ or computer program products can be considered as a computerized tool that can facilitate enhanced operation of a quantum circuit on one or more qubits. In general, the one or more embodiments described herein can reduce the processing power employed and/or time and/or error incurred by execution of a quantum program employing the quantum circuit. This is a useful and practical application of computers, especially in view of the effect of time and error on decoherence of employed qubits, and thus can facilitate enhanced (e.g., improved and/or optimized) operation of the employed qubits. These enhancements can include increased accuracy of quantum results and/or increased availability of the employed qubits. Overall, such computerized tools can constitute a concrete and tangible technical improvement in the field of quantum computing.

Furthermore, one or more embodiments described herein can control real-world devices based on the disclosed teachings. For example, one or more embodiments described herein can receive as input a quantum job request and can generate as a first output a compiled communication fabric including one or more compiled communication instructions for controlling implementation of a quantum program as one or more physical operations, such as real-world physical pulses, on one or more qubits of a quantum system. Additionally, one or more embodiments described herein can generate as a second output an interval boundary for guiding implementation of the one or more compiled communication instructions. The one or more embodiments described herein can generate as a third output one or more quantum results in response to the performance of the one or more physical operations on the real-world qubits of the quantum system.

As particularly related to the compilation component, in one or more embodiments, the non-limiting system 1400, employing the quantum program implementation system 1402 and compilation component 1412, can enhance (e.g., improve and/or optimize) execution of a quantum program by compiling communication instructions. Thus fast data transfer during execution of the quantum program can be facilitated. That is, the compilation component 1412 can minimize and/or avoid a complex and/or time consuming quantum program implementation problem of collection and distribution of data to/from a single concentrated point and/or global shared memory. In this way, the compilation component 1412 can facilitate a hybrid classical/quantum system to minimize and/or avoid latencies that can accompany such single concentrated point and/or global shared memory, even in instances of overlapping and/or parallel transfers of data. This is at least in part due to the compilation component 1412 compiling one or more communication paths, data parameters and/or quantum task schedulings, prior to execution of a quantum program.

Accordingly, the described subject matter, by employing the compilation component 1412, can create an improvement in speed of execution of jobs by the hybrid classical/ quantum non-limiting system 1400. For example, where there is high demand for execution of an increased quantity of quantum programs employing the quantum system 1401, it can follow that use of the non-limiting system 1400 (e.g., including the quantum program implementation system 1402 and/or compilation component 1412) can facilitate scaled execution of quantum programs. That is, by reducing time and/or error incurred during performance of one or more quantum tasks to operate a quantum circuit on one or more qubits, slower occurrence of decoherence of the one or more qubits can allow for additional quantum programs to be executed on the qubits. This in turn can lead to a related reduction in provision of new qubits by a quantum system comprising the one or more qubits, and consequently, increased availability of processing capabilities of a quantum processor of a quantum system due, at least in part, to the decreased provision of new qubits.

Additionally, processing speed of both classical and quantum resources of the respective hybrid classical/quantum system (e.g., non-limiting system 1400) can further be improved absent interleaving and scheduling of cycle-to-cycle data movement with transfer and analysis of quantum results, quantum gate instructions and/or quantum parameters, for example. As such, the non-limiting system 1400 (e.g., including the quantum program implementation system 1402 and/or compilation component 1412) can thereby facilitate improved performance, improved efficiency and/or reduced computational cost associated with a quantum processing unit (e.g., quantum processor 1405 of the quantum system 1401) performing one or more quantum tasks according to a compiled communication fabric (e.g., compiled communication fabric 1440).

Moreover, hardware and/or software at which the communication fabric 1440 is realized can be simplified. This can be because the challenge of implementing node to node communication can be separated and resolved in a way that is isolated from a more complicated challenge of planning execution of a quantum test. Constructs like FPI and data transfer lists can specify the interface and requirements of the communication fabric implementation for execution of a particular quantum program or experiment. Communication fabric implementation can thus be a separate and independent process within an overall quantum program execution and/or experiment compilation process and, in one or more cases, can be overlapped with other non-communication-fabric-related experiment compilation processes to improve overall communication propagation.

Further, as particularly related to the interval boundary implementation component 1414, in one or more embodiments, the non-limiting system 1400, employing the quantum program implementation system 1402 and interval boundary implementation component 1414, can enhance (e.g., improve and/or optimize) execution of a quantum program by implementing (e.g., commonly setting and triggering at a plurality of control and/or action nodes) an interval boundary 1442.

As one result, synchronized data transfer and/or quantum task operation during execution of the quantum program can be facilitated. That is, the interval boundary implementation component 1414 can minimize and/or avoid a complex and/or time consuming quantum program implementation problem of synchronization of such data transfers and/or quantum task operations among a plurality of control nodes and/or action nodes of the respective hybrid classical/quantum system executing the quantum program. Notably, the interval boundary implementation component 1414 can enable the hybrid classical/quantum system to implement regular synchronization points across multiple nodes (e.g., control and/or action) spanning large physical distances and/or connected in any configuration. For example, data from a CPU or control node can be loaded into and captured at an end point facing registers relative to the IB clock, while internal communication fabric transfers can instead occur on a much higher frequency communication fabric clock.

As another result, because the continued synchronization of the plurality of nodes is enabled throughout the entirety of execution of the respective quantum program by the implementation of the interval boundary 1442, loss of synchronization can be allowed. That is, additional processing power, software and/or hardware can be otherwise directed than to maintaining flawless synchronization by each control and/or action node. Instead, variable computation time for classical computation and/or data transfers can be accounted for via the common and successively repeating interval boundaries employed as a part of the interval boundary implementation. Different action nodes can receive data, such as one or more quantum parameters, for operating a multi-qubit gate at different time, and yet each action node facilitating the operation of the multi-qubit gate can be re-synchronized at a next interval boundary iteration for common operation of the multi-qubit gate. Likewise, different control nodes can receive one or more quantum measurements from a plurality of action nodes (e.g., from a plurality of qubits) at varying time and still be able to coordinate (e.g., synchronize) class computations and/or data transfers at a next interval boundary iteration.

As yet another result, communication paths facilitating data transfer can be imprecise with respect to latency. This can be a particular advantage in a multi-qubit system having packaging and/or cabling constraints and/or variations.

The interval boundary implementation component 1414 also can enable the hybrid classical/quantum to employ no, or almost no, overhead for minimizing latency during execution of the quantum program. That is, data transfer, computation times, quantum gate operation times and/or associated compounded latencies can be non-calculated and/or non-estimated during execution of the quantum program. That is, separate timings to implement joint and/or multi-qubit operations during execution of the quantum program can be avoided. Instead, the interval boundary 1442 is universally set and triggered at least prior to initialization of one or more quantum tasks of the respective quantum program, thus implementing a plurality of successive and repeating interval boundary iterations being the same at each node facilitating the one or more quantum tasks.

Furthermore, the described subject matter, by employing the disclosed interval boundary 1442, can create a reduction in employed processing power by associated classical nodes (e.g., classical control nodes). This is at least in part because such separate timings can be not calculated and implemented during execution of the quantum program. As such, the non-limiting system 1400 (e.g., including the quantum program implementation system 1402 and/or interval boundary implementation component 1414) can thereby facilitate improved performance, improved efficiency and/or reduced computational cost associated with one or more classical processing units (CPUs) of the non-limiting system 1400.

Additionally, the interval boundary component 1414, like the compilation component 1412, also can facilitate scaled execution of quantum programs. For example, by employing the interval boundary component 1414, and thus by reducing and/or eliminating variable latencies and thus reducing error incurred during performance of one or more quantum tasks to operate a quantum circuit on one or more qubits, slower occurrence of decoherence of the one or more qubits can allow for additional quantum programs to be executed on the qubits. This in turn can lead to a related reduction in provision of new qubits by a quantum system comprising the one or more qubits, and consequently, increased availability of processing capabilities of a quantum processor of a quantum system due, at least in part, to the decreased provision of new qubits.

Description now turns to that applicable to any one or more embodiments as described above with respect to FIGS. 1-18 and/or to extensions and or modifications thereof. The systems and/or devices have been (or will be further) described herein with respect to interaction between several components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

The computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

It is to be appreciated that one or more embodiments described herein are inherently and inextricably tied to computer technology and cannot be implemented outside of a hybrid classical/quantum computing environment. For example, one or more processes performed by one or more embodiments described herein can more efficiently provide these data parameters as compared to current systems and/or techniques. Systems, computer-implemented methods and/or computer program products facilitating performance of these processes are of great utility in the field of quantum computation and cannot be equally practicably implemented in a sensible way outside of a computing environment.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 19:
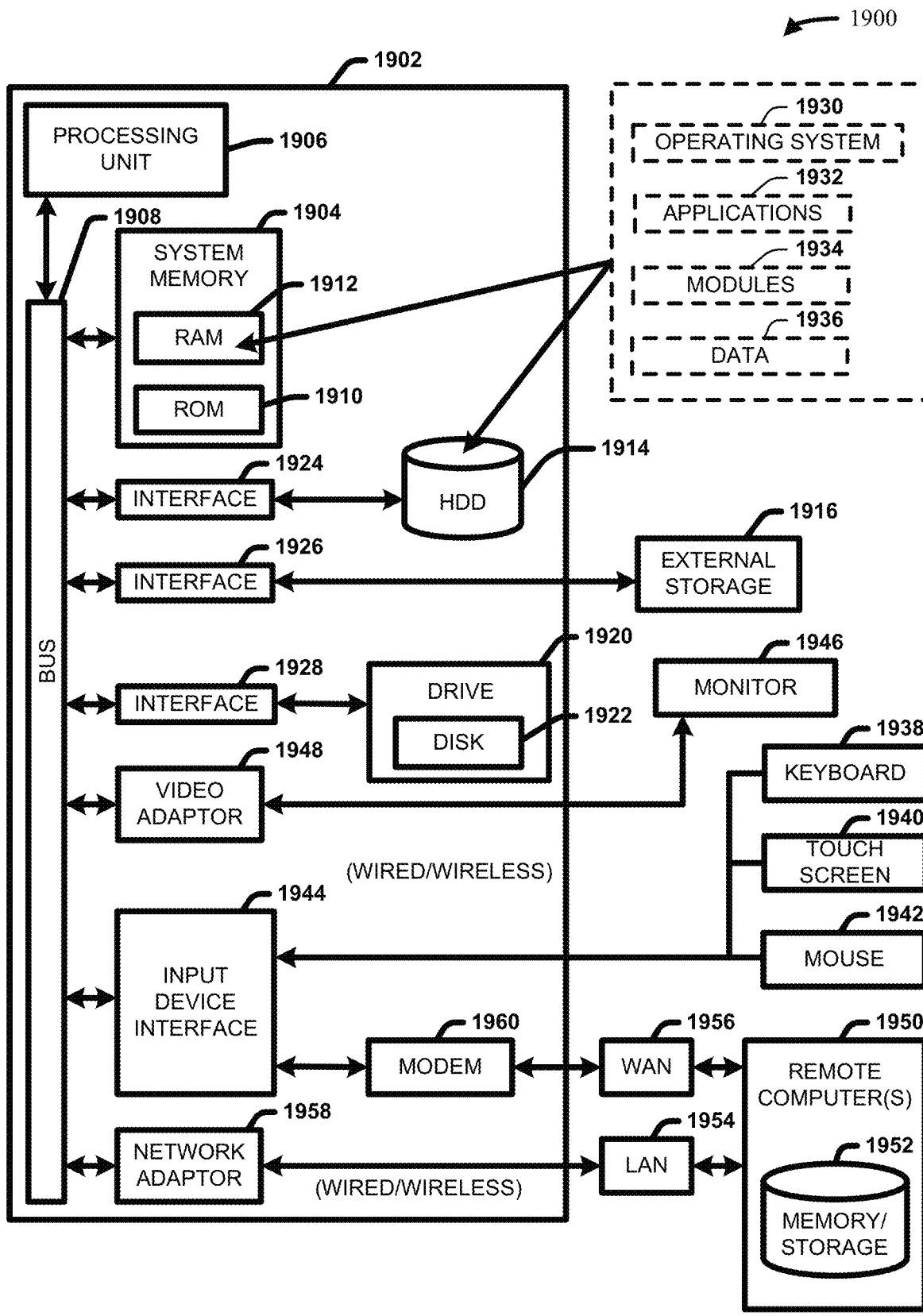
FIG. 19 illustrates a block diagram of an example, non-limiting operating environment in which one or more embodiments described herein can be facilitated.

Next, to provide additional context for one or more embodiments described herein, FIG. 19 and the following discussion are intended to provide a brief, general description of a suitable operating environment 1900 in which the one or more embodiments described herein can be implemented. For example, one or more components and/or other aspects of embodiments described herein can be implemented in or be associated with the operating environment 1900. Further, while one or more embodiments have been described above in the general context of computer-executable instructions that can run on one or more computers, those skilled in the art will recognize that the embodiments also can be implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 19, the example operating environment 1900 for implementing one or more embodiments of the aspects described herein can include a computer 1902, the computer 1902 including a processing unit 1906, a system memory 1904 and/or a system bus 1908. It will be appreciated that any aspect of the system memory 1904 or processing unit 1906 can be applied to memories 104, 904 and/or 1404 and/or to processors 106, 906 and/or 1406, respectively of the non-limiting systems 100, 900 and/or 1400. It also will be appreciated that the system memory 1904 can be implemented in combination with and/or alternatively to memories 104, 904 and/or 1404.

Likewise, it also will be appreciated that the processing unit 1906 can be implemented in combination with and/or alternatively to processors 106, 906 and/or 1406.

Memory 1904 can store one or more computer and/or machine readable, writable and/or executable components and/or instructions that, when executed by processing unit 1906 (e.g., a classical processor, a quantum processor and/or like processor), can facilitate performance of operations defined by the executable component(s) and/or instruction(s). For example, memory 1904 can store computer and/or machine readable, writable and/or executable components and/or instructions that, when executed by processing unit 1906, can facilitate execution of the one or more functions described herein relating to non-limiting systems 100/100E, 900/900E and/or 1400 and/or quantum program implementation systems 102, 902 and/or 1402, as described herein with or without reference to the one or more figures of the one or more embodiments.

Memory 1904 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1906 can comprise one or more types of processors and/or electronic circuitry (e.g., a classical processor, a quantum processor and/or like processor) that can implement one or more computer and/or machine readable, writable and/or executable components and/or instructions that can be stored at memory 1904. For example, processing unit 1906 can perform one or more operations that can be specified by computer and/or machine readable, writable and/or executable components and/or instructions including, but not limited to, logic, control, input/output (I/O), arithmetic and/or the like. In one or more embodiments, processing unit 1906 can be any of one or more commercially available processors. In one or more embodiments, processing unit 1906 can comprise one or more central processing unit, multi-core processor, microprocessor, dual microprocessors, microcontroller, System on a Chip (SOC), array processor, vector processor, quantum processor and/or another type of processor. The examples of processing unit 1906 can be employed to implement any one or more embodiments described herein.

The system bus 1908 can couple system components including, but not limited to, the system memory 1904 to the processing unit 1906. The system bus 1908 can be any of several types of bus structure that can further interconnect to a memory bus (with or without a memory controller), a peripheral bus and/or a local bus using any of a variety of commercially available bus architectures. The system memory 1904 can include ROM 1910 and/or RAM 1912. A basic input/output system (BIOS) can be stored in a non-volatile memory such as ROM, erasable programmable read only memory (EPROM) and/or EEPROM, which BIOS contains the basic routines that help to transfer information among elements within the computer 1902, such as during startup. The RAM 1912 can include a high-speed RAM, such as static RAM for caching data.

The computer 1902 can include an internal hard disk drive (HDD) 1914 (e.g., EIDE, SATA), one or more external storage devices 1916 (e.g., a magnetic floppy disk drive (FDD), a memory stick or flash drive reader, a memory card reader and/or the like) and/or a drive 1920, e.g., such as a solid state drive or an optical disk drive, which can read or write from a disk 1922, such as a CD-ROM disc, a DVD, a BD and/or the like. Additionally and/or alternatively, where a solid state drive is involved, disk 1922 could not be included, unless separate. While the internal HDD 1914 is illustrated as located within the computer 1902, the internal HDD 1914 can also be configured for external use in a suitable chassis (not shown). Additionally, while not shown in operating environment 1900, a solid state drive (SSD) can be used in addition to, or in place of, an HDD 1914. The HDD 1914, external storage device(s) 1916 and drive 1920 can be connected to the system bus 1908 by an HDD interface 1924, an external storage interface 1926 and a drive interface 1928, respectively. The HDD interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1912, including an operating system 1930, one or more applications 1932, other program modules 1934 and/or program data 1936. All or portions of the operating system, applications, modules and/or data can also be cached in the RAM 1912. The systems and/or methods described herein can be implemented utilizing one or more commercially available operating systems and/or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In a related embodiment, operating system 1930 can comprise one virtual machine (VM) of multiple VMs hosted at computer 1902. Furthermore, operating system 1930 can provide runtime environments, such as the JAVA runtime environment or the .NET framework, for applications 1932. Runtime environments are consistent execution environments that can allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and/or settings for an application.

Further, computer 1902 can be enabled with a security module, such as a trusted processing module (TPM). For instance, with a TPM, boot components hash next in time boot components and wait for a match of results to secured values before loading a next boot component. This process can take place at any layer in the code execution stack of computer 1902, e.g., applied at application execution level and/or at operating system (OS) kernel level, thereby enabling security at any level of code execution.

An entity can enter and/or transmit commands and/or information into the computer 1902 through one or more wired/wireless input devices, e.g., a keyboard 1938, a touch screen 1940 and/or a pointing device, such as a mouse 1942. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 1906 through an input device interface 1944 that can be coupled to the system bus 1908, but can be connected by other interfaces, such as a parallel port, an IEEE 1394 serial port, a game port, a USB port, an IR interface, a BLUETOOTH® interface and/or the like.

A monitor 1946 or other type of display device can be alternatively and/or additionally connected to the system bus 1908 via an interface, such as a video adapter 1948. In addition to the monitor 1946, a computer typically includes other peripheral output devices (not shown), such as speakers, printers and/or the like.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device and/or other common network node, and typically includes many or all of the elements described relative to the computer 1902, although, for purposes of brevity, only a memory/storage device 1952 is illustrated. Additionally and/or alternatively, the computer 1902 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1954 and/or larger networks, e.g., a wide area network (WAN) 1956. LAN and WAN networking environments can be commonplace in offices and companies and can facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired and/or wireless communication to the LAN 1954, which can also include a wireless access point (AP) disposed thereon for communicating with the adapter 1958 in a wireless mode.

When used in a WAN networking environment, the computer 1902 can include a modem 1960 and/or can be connected to a communications server on the WAN 1956 via other means for establishing communications over the WAN 1956, such as by way of the Internet. The modem 1960, which can be internal and/or external and a wired and/or wireless device, can be connected to the system bus 1908 via the input device interface 1944. In a networked environment, program modules depicted relative to the computer 1902 or portions thereof can be stored in the remote memory/storage device 1952. It will be appreciated that the network connections shown are merely exemplary and one or more other means of establishing a communications link among the computers can be used.

When used in either a LAN or WAN networking environment, the computer 1902 can access cloud storage systems or other network-based storage systems in addition to, and/or in place of, external storage devices 1916 as described above, such as but not limited to, a network virtual machine providing one or more aspects of storage and/or processing of information. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, such as with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be practiced in distributed computing environments (e.g., cloud computing environments), such as described below with respect to FIG. 20, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 2050 described below with reference to FIG. 20, and/or with reference to the one or more functional abstraction layers (e.g., quantum software and/or the like) described below with reference to FIG. 21, to execute one or more operations in accordance with one or more embodiments described herein. For example, cloud computing environment 2050 and/or one or more of the functional abstraction layers 2160, 2170, 2180 and/or 2190 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the provider of the service.

Broad network access: capabilities are available over a network and accessed through standard mechanisms that promote use by heterogeneous thin or thick client platforms (e.g., mobile phones, laptops, and PDAs).

Resource pooling: the computing resources of the provider are pooled to serve multiple consumers using a multi-tenant model, with different physical and virtual resources dynamically assigned and reassigned according to demand There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the applications of the provider, such as the applications running on a cloud infrastructure. The applications are accessible from various client devices through a thin client interface such as a web browser (e.g., web-based e-mail) The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting systems 100/100E, 900900E and/or 1400 and/or the example operating environment 1900 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting systems 100/100E, 900/900E and/or 1400 and/or example operating environment 1900 can be employed to use hardware and/or software to solve problems that are highly technical in nature, that are not abstract and/or that cannot be performed as a set of mental acts by a human.

Figure 20:
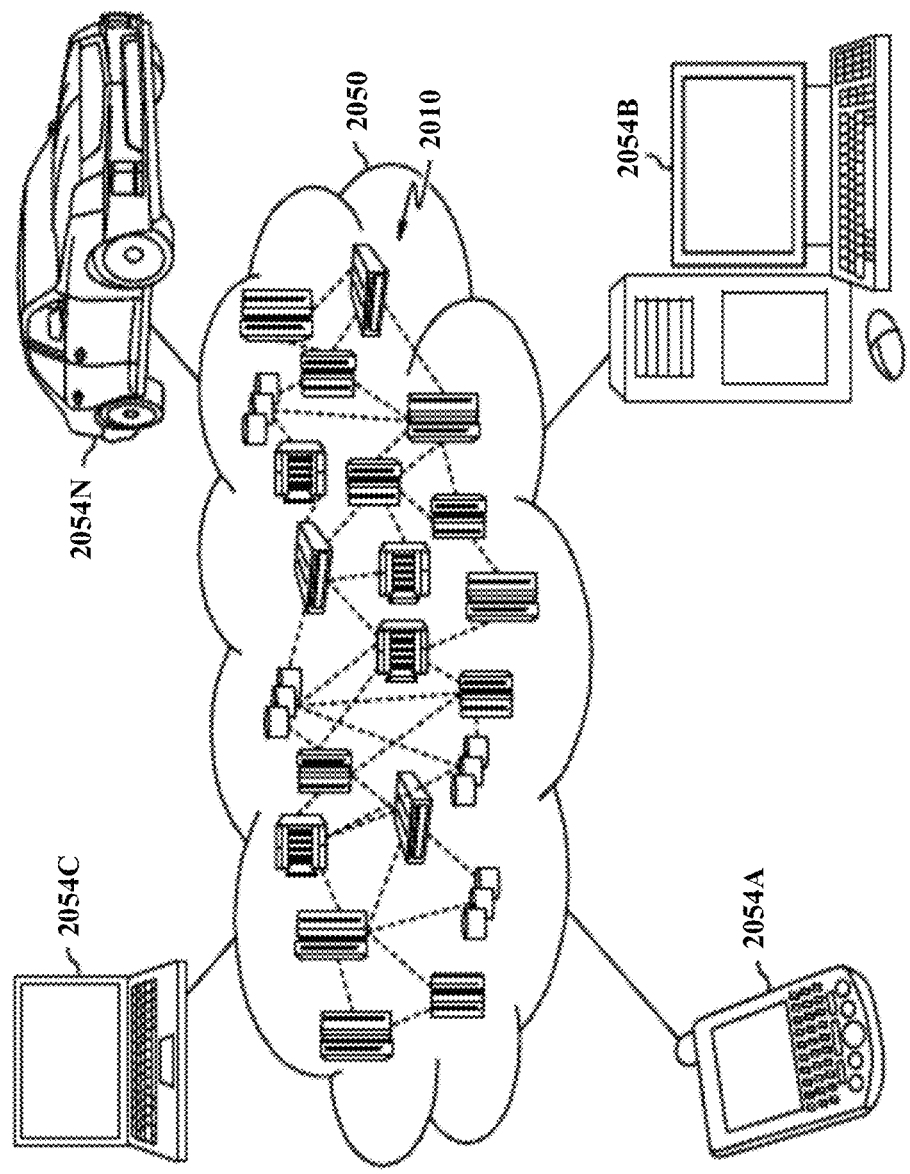
FIG. 20 illustrates a block diagram of an example, non-limiting cloud computing environment in accordance with one or more embodiments described herein.

Referring now to details of one or more aspects illustrated at FIG. 20, the illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C and/or automobile computer system 2054N can communicate. Although not illustrated in FIG. 20, cloud computing nodes 2010 can further comprise a quantum platform (e.g., quantum computer, quantum hardware, quantum software and/or the like) with which local computing devices used by cloud consumers can communicate. Cloud computing nodes 2010 can communicate with one another. They can be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 20 are intended to be illustrative only and that cloud computing nodes 2010 and cloud computing environment 2050 can communicate with any type of computerized device over any type of network and/or network addressable connection (e.g., using a web browser).

Figure 21:
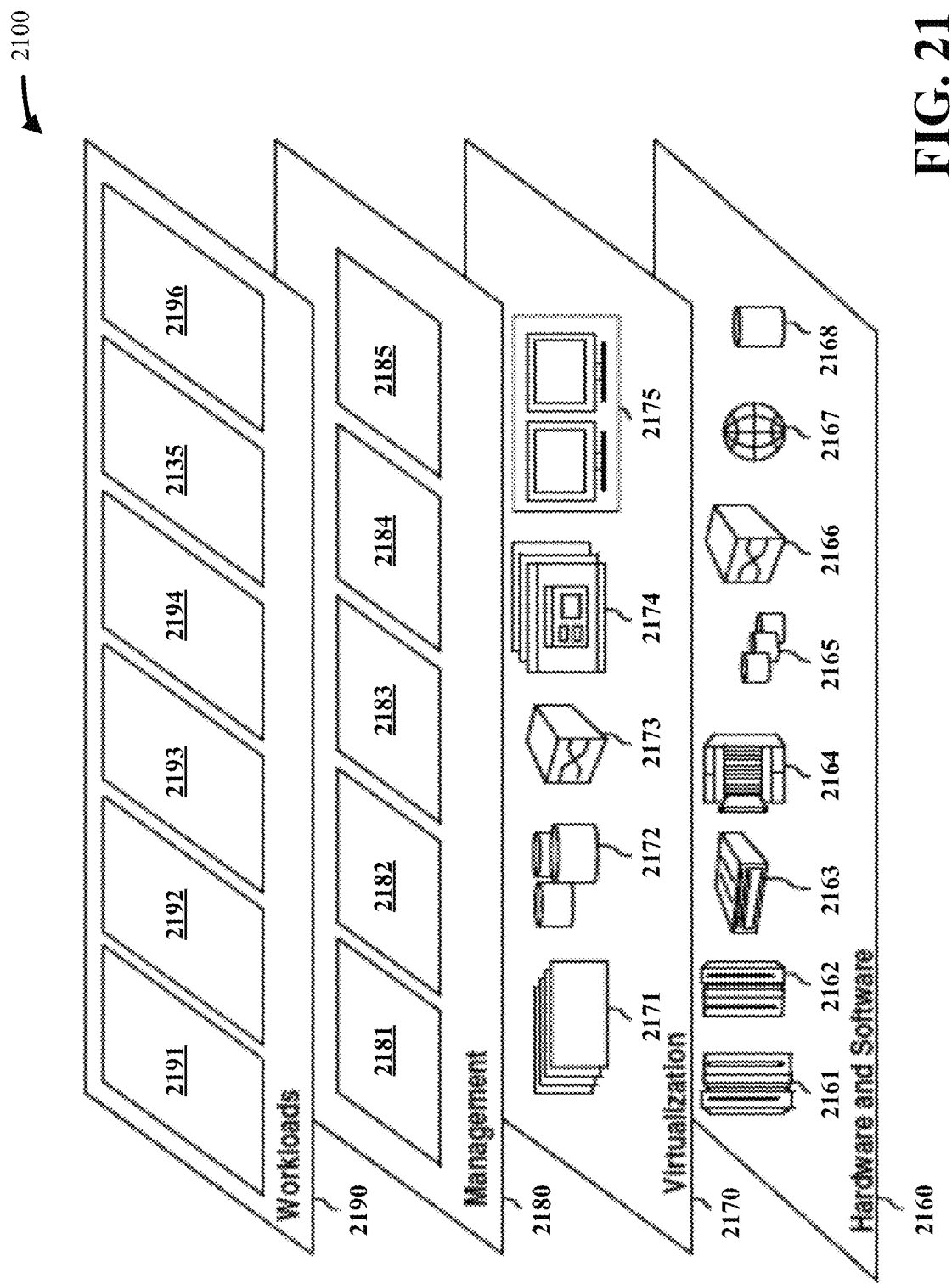
FIG. 21 illustrates a block diagram of a plurality of example, non-limiting abstraction model layers, in accordance with one or more embodiments described herein.

Referring now to details of one or more aspects illustrated at FIG. 21, a set of functional abstraction layers is shown, such as provided by cloud computing environment 2050 (FIG. 20). One or more embodiments described herein can be associated with one or more functional abstraction layers described below with reference to FIG. 21 (e.g., hardware and software layer 2160, virtualization layer 2170, management layer 2180 and/or workloads layer 2190). It should be understood in advance that the components, layers and/or functions shown in FIG. 21 are intended to be illustrative only and embodiments described herein are not limited thereto. As depicted, the following layers and/or corresponding functions are provided:

Hardware and software layer 2160 can include hardware and software components. Examples of hardware components include: mainframes 2161; RISC (Reduced Instruction Set Computer) architecture-based servers 2162; servers 2163; blade servers 2164; storage devices 2165; and/or networks and/or networking components 2166. In one or more embodiments, software components can include network application server software 2167, quantum platform routing software 2168; and/or quantum software (not illustrated in FIG. 21).

Virtualization layer 2170 can provide an abstraction layer from which the following examples of virtual entities can be provided: virtual servers 2171; virtual storage 2172; virtual networks 2173, including virtual private networks; virtual applications and/or operating systems 2174; and/or virtual clients 2175.

In one example, management layer 2180 can provide the functions described below. Resource provisioning 2181 can provide dynamic procurement of computing resources and other resources that can be utilized to perform tasks within the cloud computing environment. Metering and Pricing 2182 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 2183 can provide access to the cloud computing environment for consumers and system administrators. Service level management 2184 can provide cloud computing resource allocation and/or management such that required service levels are met. Service Level Agreement (SLA) planning and fulfillment 2185 can provide pre-arrangement for, and procurement of, cloud computing resources for which a future requirement is anticipated in accordance with an SLA.

Workloads layer 2190 can provide examples of functionality for which the cloud computing environment can be utilized. Non-limiting examples of workloads and functions which can be provided from this layer include: mapping and navigation 2191; software development and lifecycle management 2192; virtual classroom education delivery 2193; data analytics processing 2194; transaction processing 2195; and/or application transformation software 2196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor that executes at least one of the computer executable components that:
compiles a quantum program for execution on a group of nodes comprising two or more control nodes and two or more action nodes, wherein the two or more control nodes comprises respective classical computing resources, and the two or more action nodes comprise respective quantum computing resources, and wherein the compiling comprises determining a time length for a repeating interval based on a maximum predicted transfer time for transferring data along communication paths between nodes of the group of nodes; and
commonly sets and triggers a successively repeating time point corresponding to an interval boundary of the time length of the repeating interval at the group of nodes to align execution at the group of nodes of quantum tasks of the quantum program distributed across the group of nodes.

2. The system of claim 1, wherein the at least one of the computer executable components further:
employs the successively repeating time point for execution of the one or more quantum tasks on two or more qubits.

3. The system of claim 1, wherein the at least one of the computer executable components further:
causes simultaneously-initiated quantum tasks on two or more qubits at two or more instances of the successively repeating time point.

4. The system of claim 1,
wherein iterations of the successively repeating time point bound successively repeating time intervals having a same length.

5. The system of claim 1, wherein the compiling further comprises compiling one or more communication paths between the two or more nodes of the group of nodes for transfer of yet-undetermined data along the one or more compiled communication paths, and
wherein a length of a common time interval between successive ones of the successively repeating time point is at least as long as a maximum data propagation time along the one or more communication paths.

6. The system of claim 1, wherein the at least one of the computer executable components further:
executes at least one of the one or more quantum tasks in a manner non-aligned with the successively repeating time point.

7. The system of claim 1, wherein the compiling further comprises compiling one or more communication paths between the two or more nodes of the group of nodes for transfer of yet-undetermined data along the one or more compiled communication paths, and
wherein a compiled transfer or post-receipt use of the data is aligned to one or more iterations of the successively repeating time point.

8. A computer-implemented method, comprising:
compiling, by a system operatively coupled to a processor, a quantum program for execution on a group of nodes comprising two or more control nodes and two or more action nodes, wherein the two or more control nodes comprises respective classical computing resources, and the two or more action nodes comprise respective quantum computing resources, and wherein the compiling comprises determining a time length for a repeating interval based on a maximum predicted transfer time for transferring data along communication paths between nodes of the group of nodes; and
commonly setting and triggering, by the system, a successively repeating time point corresponding to an interval boundary of the time length of the repeating interval at the group of nodes to align execution at the group of nodes of quantum tasks of the quantum program distributed across the group of nodes.

9. The computer-implemented method of claim 8, further comprising:
employing, by the system, the successively repeating time point for execution of the one or more quantum tasks on two or more qubits.

10. The computer-implemented method of claim 8,
wherein iterations of the successively repeating time point bound successively repeating time intervals having a same length.

11. The computer-implemented method of claim 8, further comprising:
causing, by the system, simultaneously-initiated quantum tasks on two or more qubits at two or more instances of the successively repeating time point.

12. The computer-implemented method of claim 8, wherein the compiling further comprises compiling one or more communication paths between the two or more nodes of the group of nodes for transfer of data along the one or more compiled communication paths, and
wherein a length of a common time interval between successive ones of the successively repeating time point is at least as long as a maximum data propagation time along the one or more communication paths.

13. The computer-implemented method of claim 8, further comprising:
executing, by the system, at least one of the one or more quantum tasks in a manner non-aligned with the successively repeating time point.

14. The computer-implemented method of claim 8, wherein the compiling further comprises compiling one or more communication paths between the two or more nodes of the group of nodes for transfer of data along the one or more compiled communication paths, and
wherein a compiled transfer or post-receipt use of the data is aligned to one or more iterations of the successively repeating time point.

15. A computer program product facilitating control of quantum tasks at two or more nodes of a system, the computer program product comprising a computer readable storage medium having program instructions embodied therewith, the program instructions executable by a processor of the system to cause the processor to:
compile a quantum program for execution on a group of nodes comprising two or more control nodes and two or more action nodes, wherein the two or more control nodes comprises respective classical computing resources, and the two or more action nodes comprise respective quantum computing resources, and wherein the compiling comprises determining a time length for a repeating interval based on a maximum predicted transfer time for transferring data along communication paths between nodes of the group of nodes; and
commonly set and trigger a successively repeating time point corresponding to an interval boundary of the time length of the repeating interval at the group of nodes to align execution at the group of nodes of quantum tasks of the quantum program distributed across the group of nodes.

16. The computer program product of claim 15, wherein the program instructions are further executable to cause the processor to:
employ the successively repeating time point for execution of the one or more quantum tasks on two or more qubits.

17. The computer program product of claim 15, wherein the program instructions are further executable to cause the processor to:
cause simultaneously-initiated quantum tasks on two or more qubits at two or more instances of the successively repeating time point.

18. The computer program product of claim 15,
wherein iterations of the successively repeating time point bound successively repeating time intervals having a same length.

19. The computer program product of claim 15, wherein the further comprises one or more communication paths between the two or more nodes of the group of nodes for transfer of data along the one or more compiled communication paths, and
wherein a length of a common time interval between successive ones of the successively repeating time point is at least as long as a maximum data propagation time along the one or more communication paths.

20. The computer program product of claim 15, wherein the program instructions are further executable to cause the processor to:
execute, by the processor, at least one of the one or more quantum tasks in a manner non-aligned with the successively repeating time point.

* * * * *